(12) United States Patent
Bushong et al.

(10) Patent No.: US 11,423,788 B2
(45) Date of Patent: Aug. 23, 2022

(54) FLIGHT DECK DISPLAY CONTROL SYSTEM USER INTERFACE WINDOW MANAGEMENT

(71) Applicant: Garmin International, Inc., Olathe, KS (US)

(72) Inventors: Victor M. Bushong, Olathe, KS (US); Joseph L. Komer, Shawnee, KS (US); David E. Larson, Olathe, KS (US)

(73) Assignee: Garmin International, Inc., Olathe, KS (US)

( * ) Notice: Subject to any disclaimer, the term of this patent is extended or adjusted under 35 U.S.C. 154(b) by 367 days.

(21) Appl. No.: 16/660,213

(22) Filed: Oct. 22, 2019

(65) Prior Publication Data

US 2021/0118309 A1    Apr. 22, 2021

(51) Int. Cl.
| | |
|---|---|
| G08G 5/00 | (2006.01) |
| G06F 11/22 | (2006.01) |
| G01C 23/00 | (2006.01) |
| B64D 43/02 | (2006.01) |

(52) U.S. Cl.
CPC .......... *G08G 5/0021* (2013.01); *B64D 43/02* (2013.01); *G01C 23/005* (2013.01); *G06F 11/2257* (2013.01); *G08G 5/0013* (2013.01); *G08G 5/0039* (2013.01); *G08G 5/0052* (2013.01)

(58) Field of Classification Search
None
See application file for complete search history.

(56) References Cited

U.S. PATENT DOCUMENTS

| | | |
|---|---|---|
| 6,112,141 A | 8/2000 | Briffe et al. |
| 6,381,519 B1 | 4/2002 | Snyder |
| 8,484,576 B2 | 7/2013 | Berson et al. |

(Continued)

FOREIGN PATENT DOCUMENTS

| | | |
|---|---|---|
| WO | 2011017063 A2 | 2/2011 |

OTHER PUBLICATIONS

Printout from https://www.dummies.com/computers/operating-systems/windows-7/how-to-use-aero-snap-in-windows-7-to-resize-windows/, published prior to Oct. 22, 2019.

*Primary Examiner* — Adam D Tissot
*Assistant Examiner* — Garrett F Evans
(74) *Attorney, Agent, or Firm* — Samuel M. Korte; Max M. Ali

(57) ABSTRACT

A flight deck system for an aircraft includes a display device for providing a graphical interface for displaying flight-related information including a plurality of windows to an operator. The display device is configured for displaying the plurality of windows within a plurality of regions. The plurality of regions can each have a predefined shape and orientation on the display screen according to a regular grid layout. A touch interface is coordinated with the display device for receiving touch information from the operator and allowing the operator to interact with the graphical interface. A processor is communicatively coupled with the touch interface device and operatively coupled with the display device. The processor can be configured to dynamically recreate a selected window of flight-related information within one or more of the plurality of regions corresponding to an operator-selected icon. In such embodiments, the operator can operate the graphical interface through direct touch.

20 Claims, 32 Drawing Sheets

(56) References Cited

U.S. PATENT DOCUMENTS

| | | |
|---|---|---|
| 8,633,913 B1 | 1/2014 | Raghu et al. |
| 9,921,714 B1 * | 3/2018 | Shapiro ............... G06F 3/04817 |
| 10,761,676 B1 * | 9/2020 | Gilbert .................... G09G 5/14 |
| 2004/0210847 A1 * | 10/2004 | Berson .................... G01D 7/08 |
| | | 715/788 |

* cited by examiner

FLIGHT DECK DISPLAY CONTROL SYSTEM USER INTERFACE WINDOW MANAGEMENT

BACKGROUND

Integrated avionics systems replace mechanical and electro-mechanical instrument gauges and controls historically used in aircraft with one or more electronic displays for displaying primary flight information such as attitude, altitude, heading, vertical speed, and so forth, to the pilot, and/or receiving command inputs from the pilot for controlling aircraft systems. Integrated avionics systems may include one or more primary flight displays (PFD) and one or more multifunction displays (MFD). Further, integrated avionics systems may provide one or more controllers, such as one or more avionics control and display units (CDU), which may provide a user interface (e.g., a touch interface) to allow the aircraft's flight crew (e.g., a pilot and/or a co-pilot) to control the operation of the aircraft via the PFD and/or the MFD and to view navigation information related to the route the aircraft is traversing. Integrated avionics systems also allow the flight crew to manually control operation of the aircraft's systems via the PFD, the MFD, or other controls.

DRAWINGS

The Detailed Description is described with reference to the accompanying figures. The use of the same reference numbers in different instances in the description and the figures may indicate similar or identical items.

Figure 1:
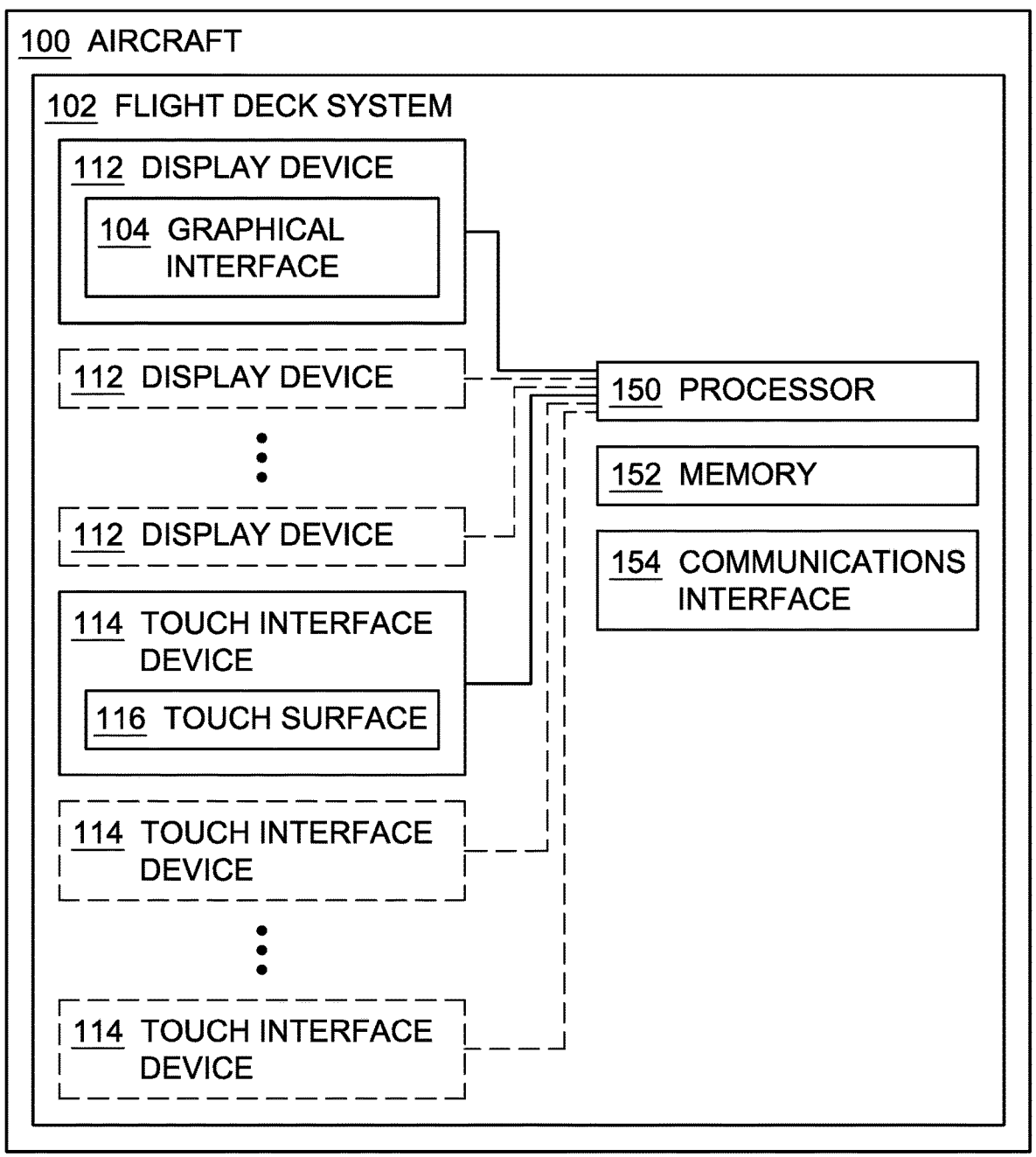
FIG. 1 is a block diagram illustrating a flight deck system for an aircraft in accordance with embodiments of the present disclosure.
Figure 14:
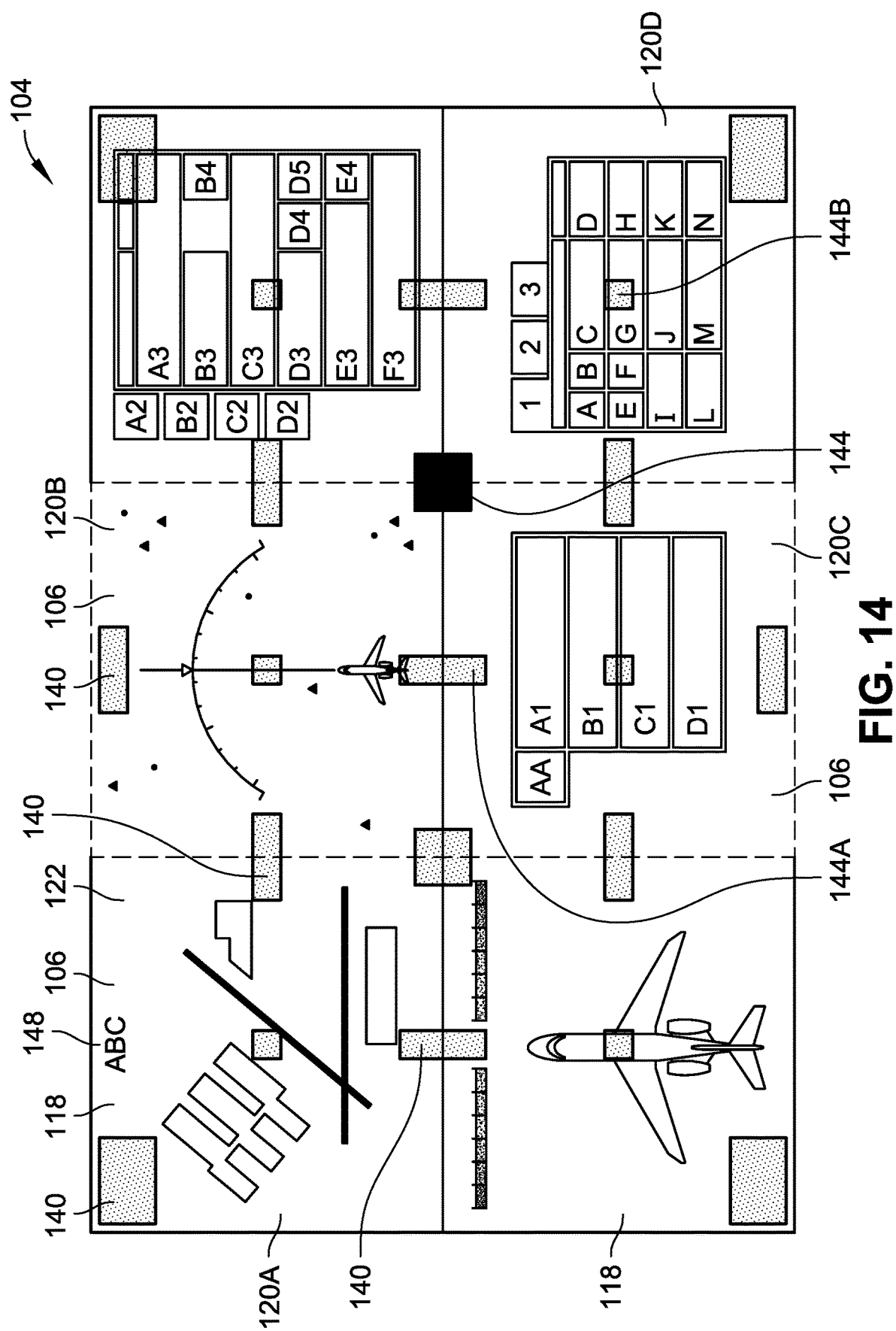
Figure 15:
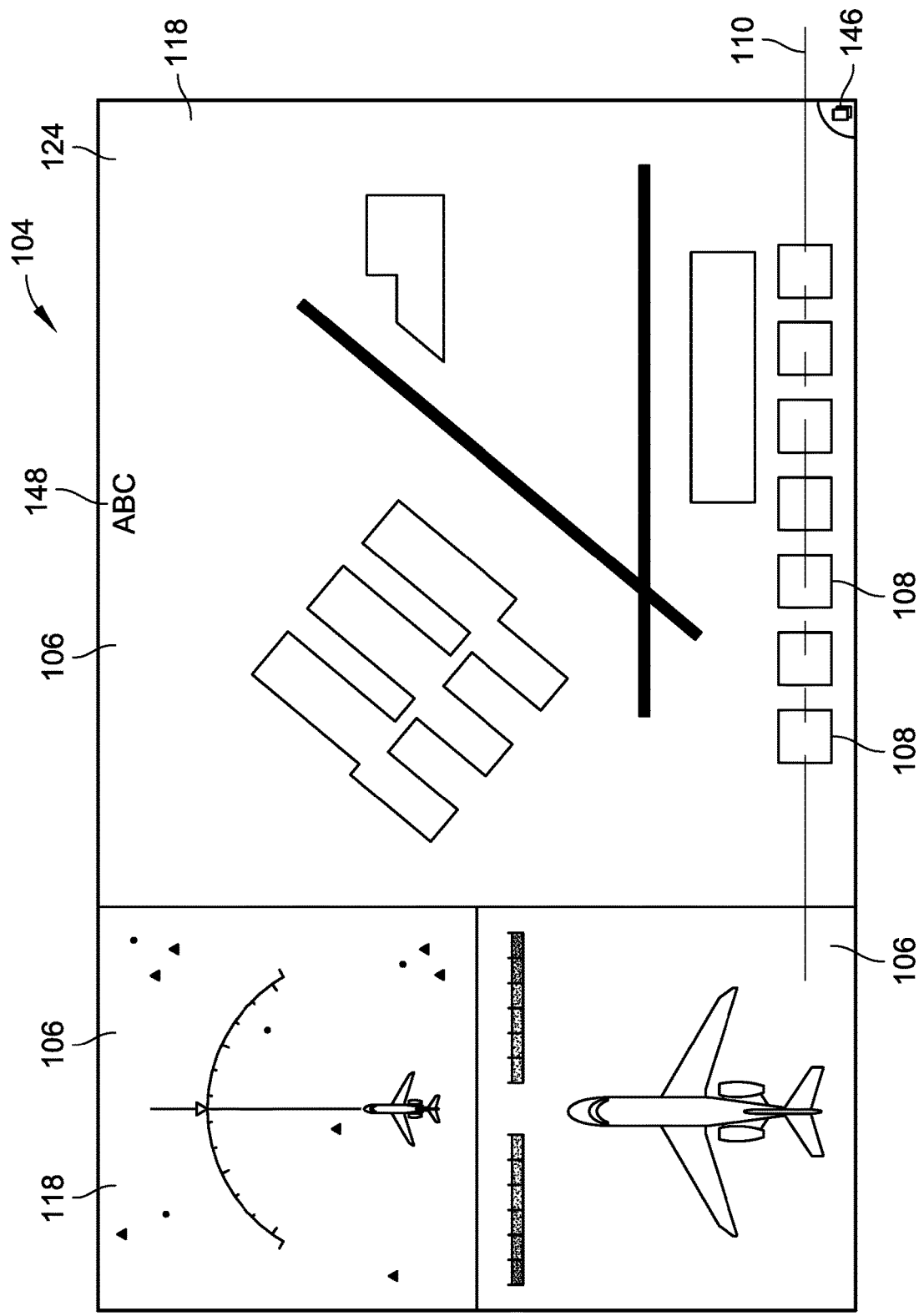

FIG. 14 is a diagrammatic view illustrating a display including a plurality of windows having regions configured for displaying flight-related information on a graphical interface of a flight deck system, such as the flight deck system illustrated in FIG. 1, in accordance with embodiments of the present disclosure FIG. 15 is a diagrammatic view illustrating a display including a plurality of windows having regions and a plurality of selectable items for displaying flight-related information on a graphical interface of a flight deck system, such as the flight deck system illustrated in FIG. 1, in accordance with embodiments of the present disclosure.

Figure 16:
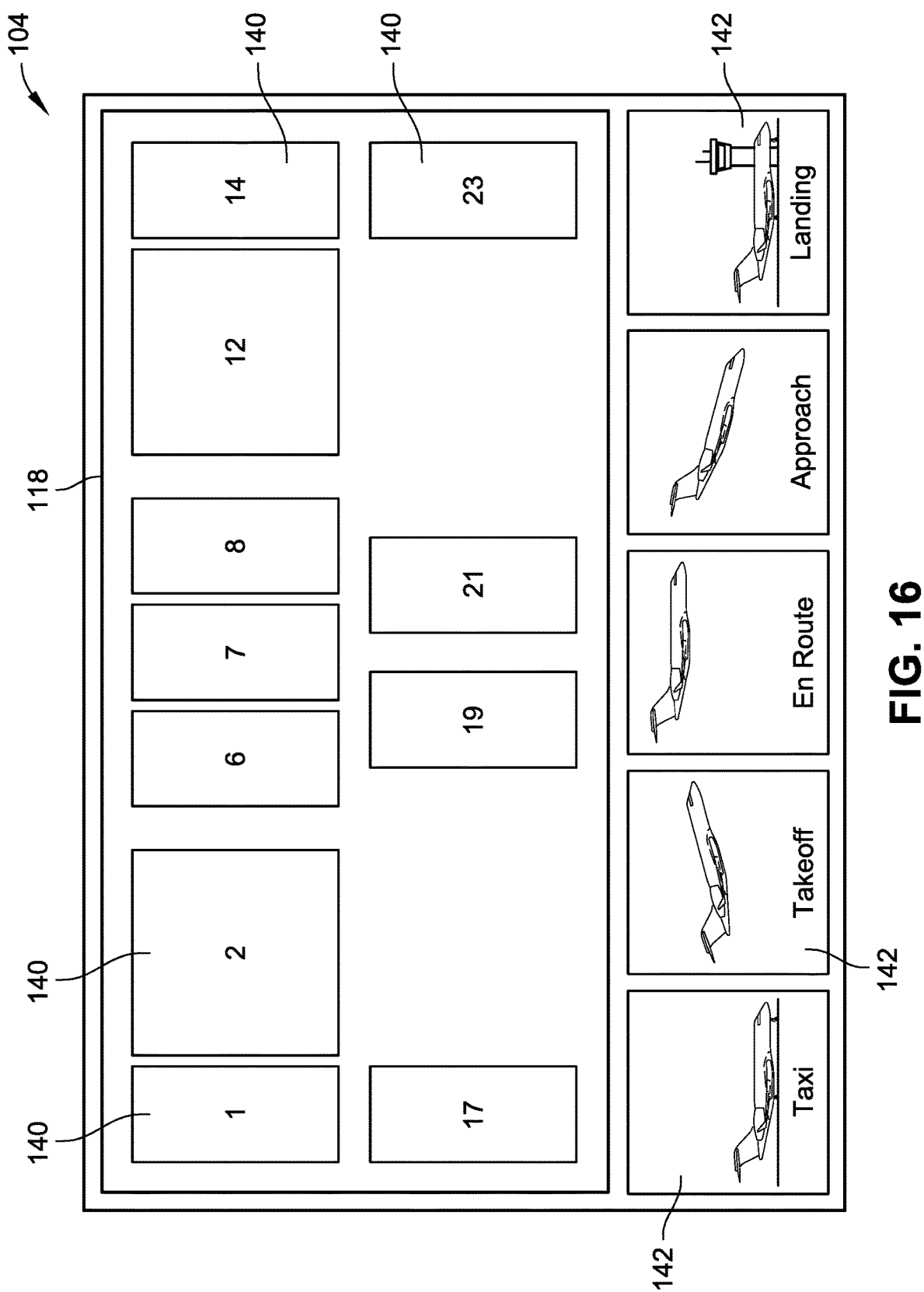

FIG. 16 is a diagrammatic view illustrating a display including a plurality of windows having regions and a flight preset for displaying on a graphical interface of a flight deck system, such as the flight deck system illustrated in FIG. 1, in accordance with embodiments of the present disclosure.

Figure 17:
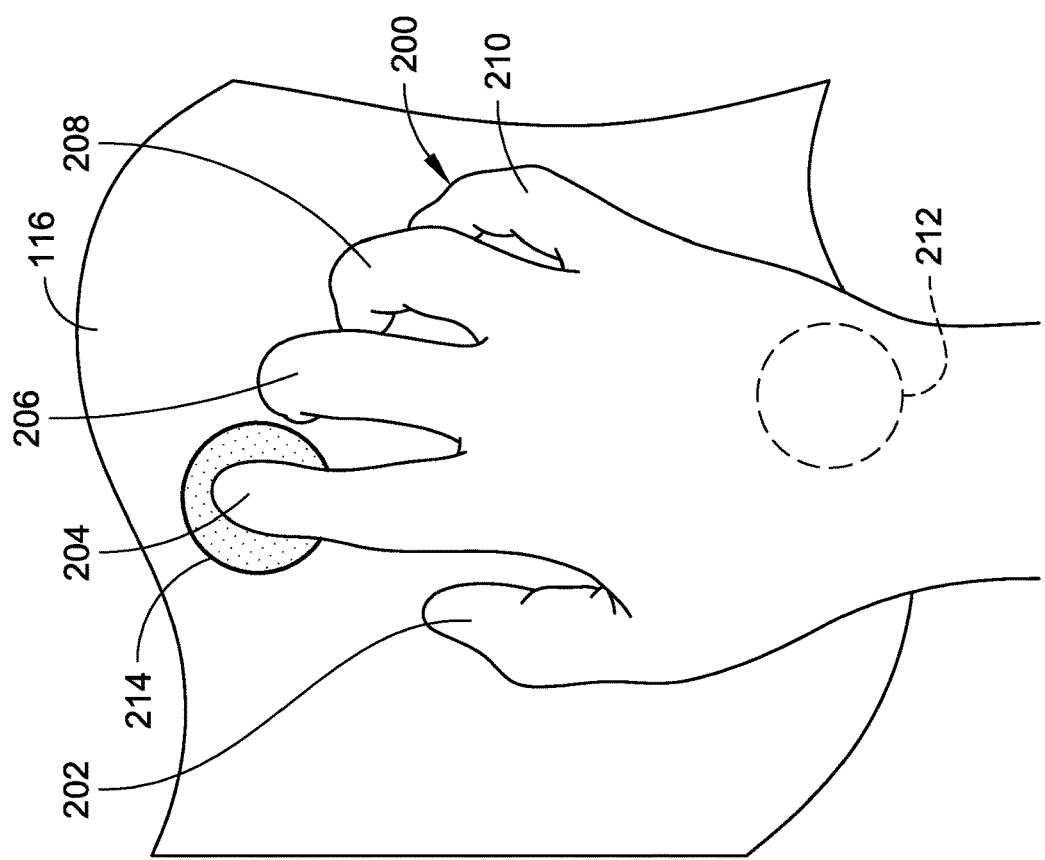

FIG. 17 is a diagrammatic view illustrating an example of touch locations of an operator's hand on a touch surface of a graphical interface of a flight deck system, such as the flight deck system illustrated in FIG. 1, in accordance with embodiments of the present disclosure.

Figure 18:
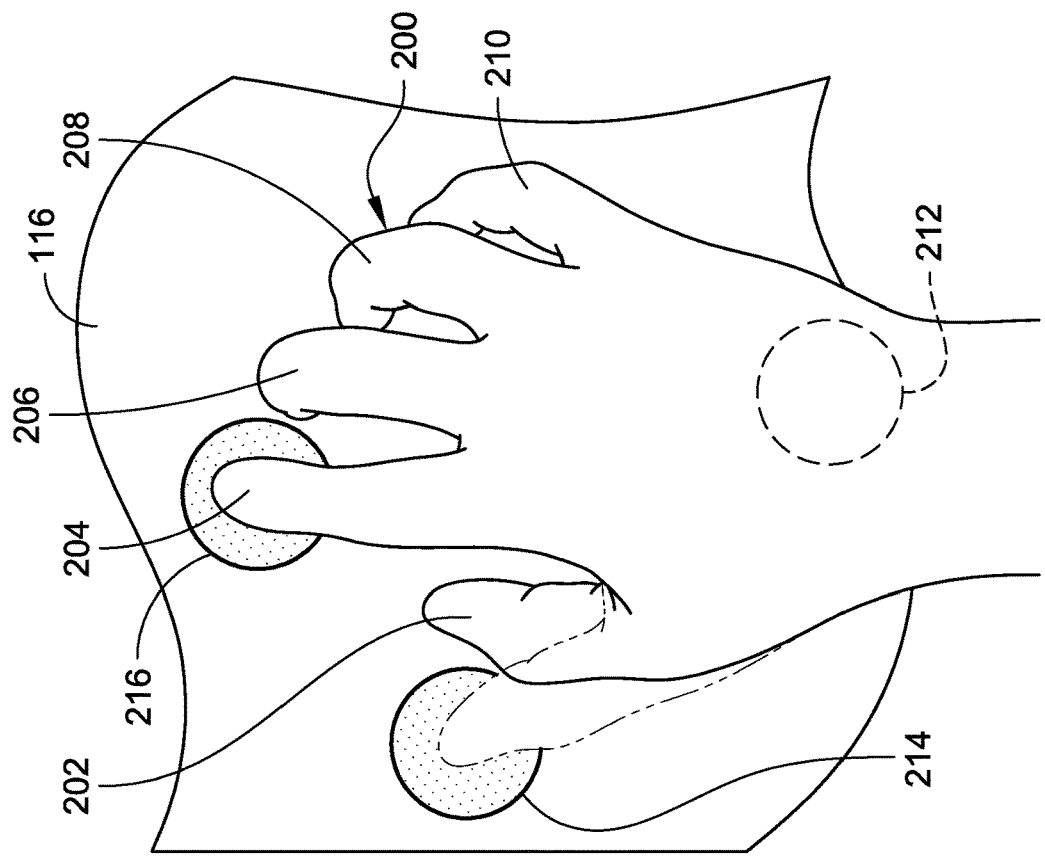

FIG. 18 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 19:
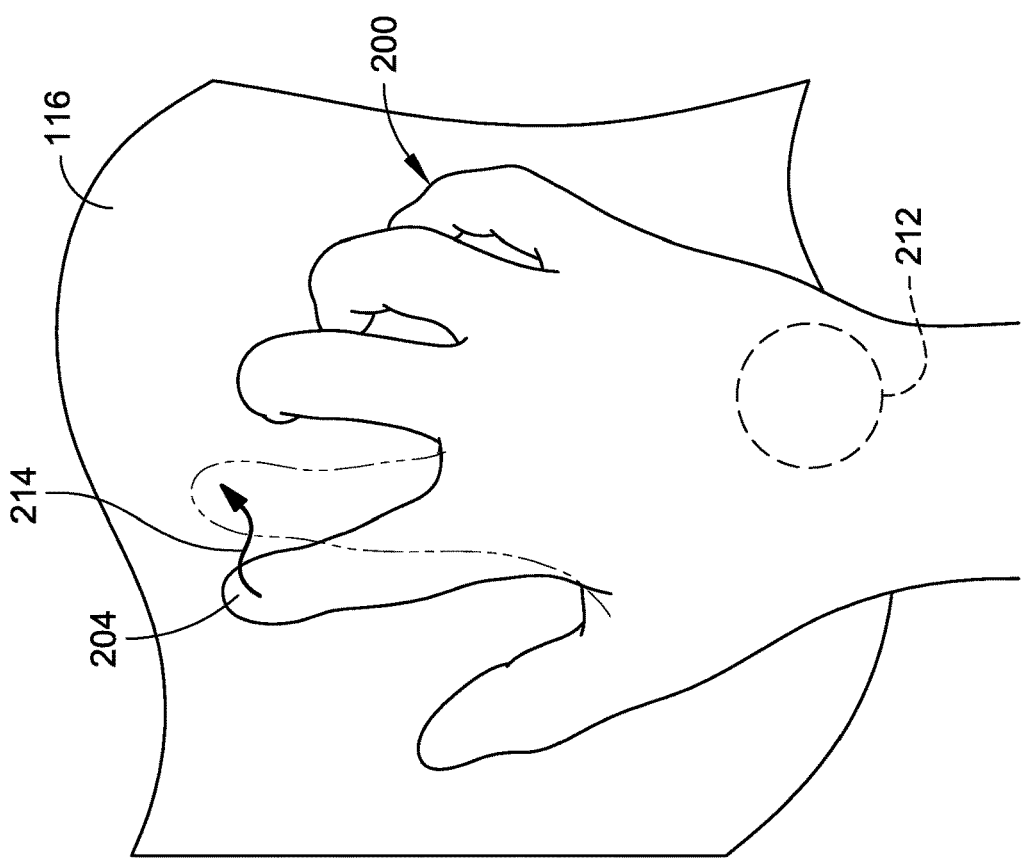

FIG. 19 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 20:
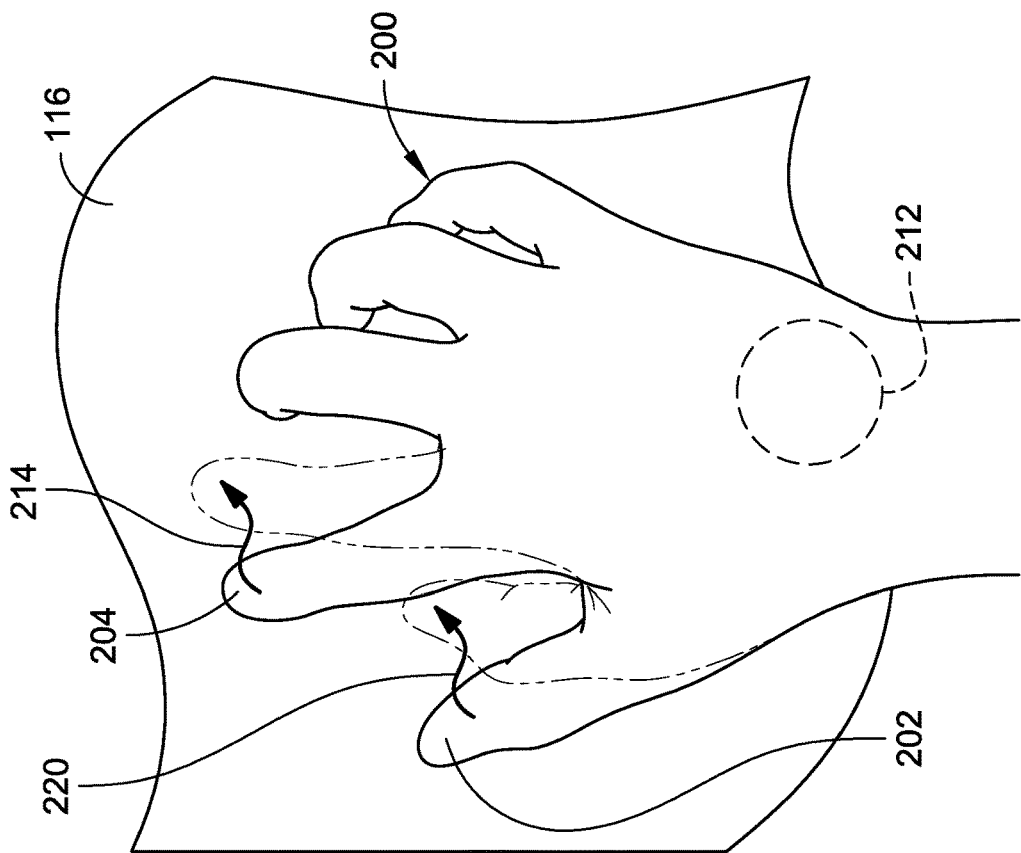

FIG. 20 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 21:
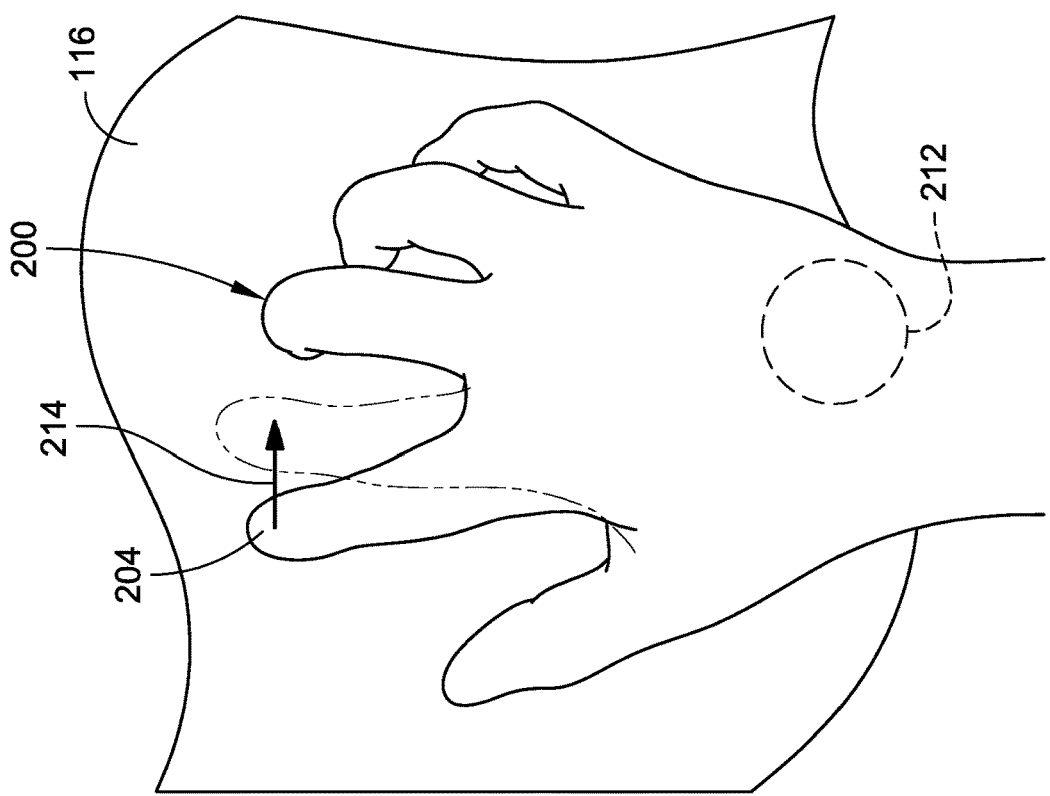

FIG. 21 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 22:
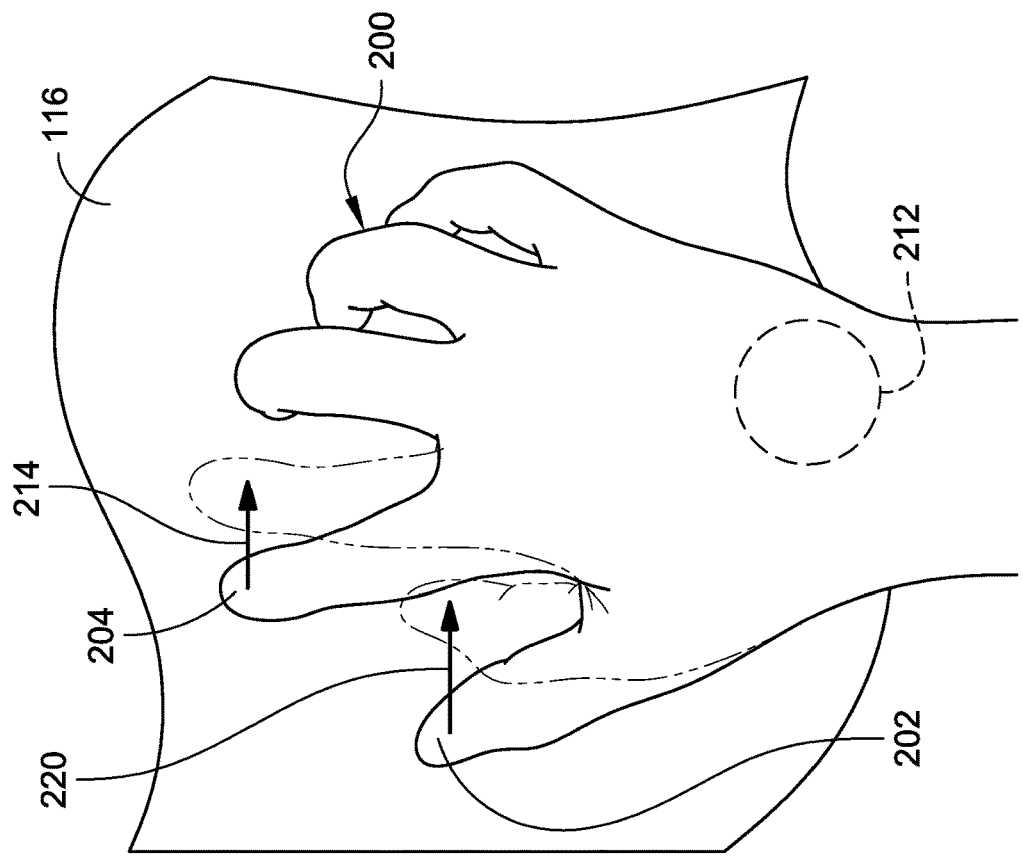

FIG. 22 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 23:
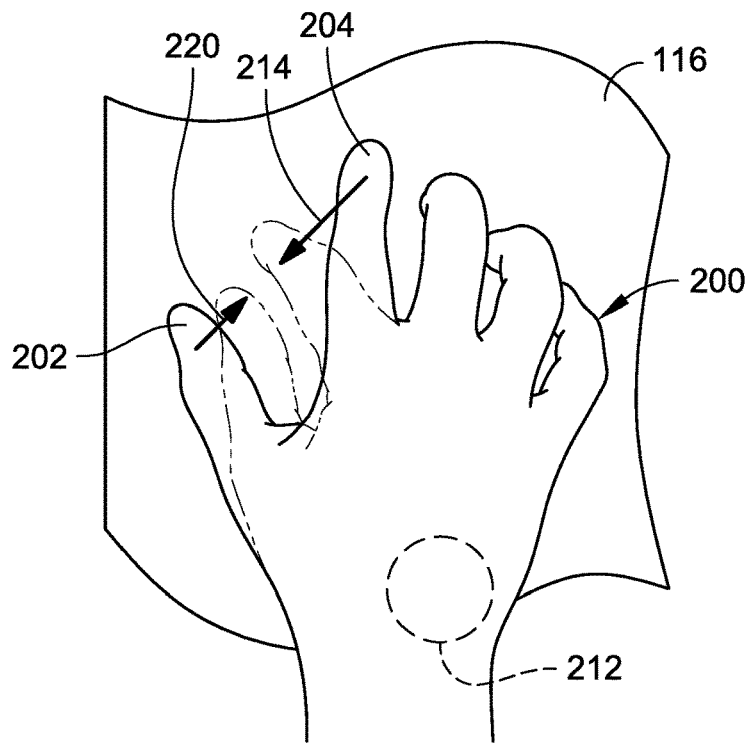

FIG. 23 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 24:
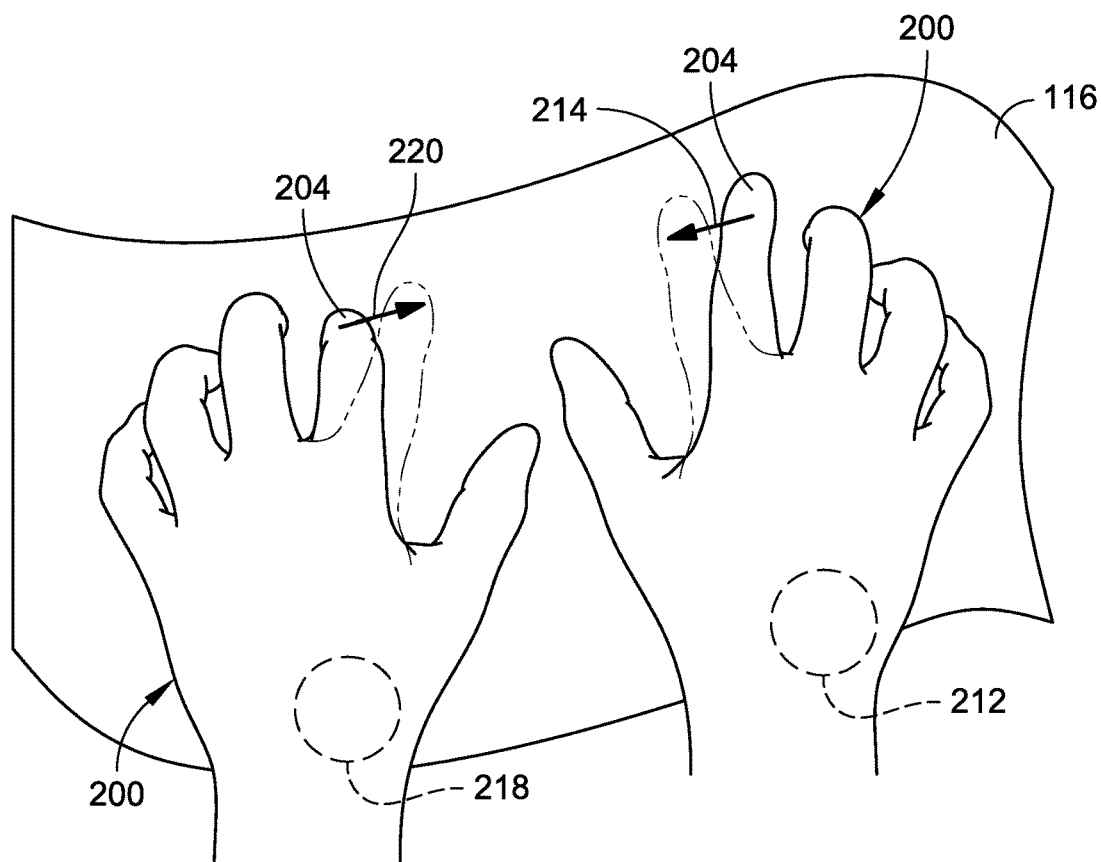

FIG. 24 is a diagrammatic view illustrating an example of touch locations of an operator's hands on a touch surface of a graphical interface of a flight deck system, such as the flight deck system illustrated in FIG. 1, in accordance with embodiments of the present disclosure.

Figure 25:
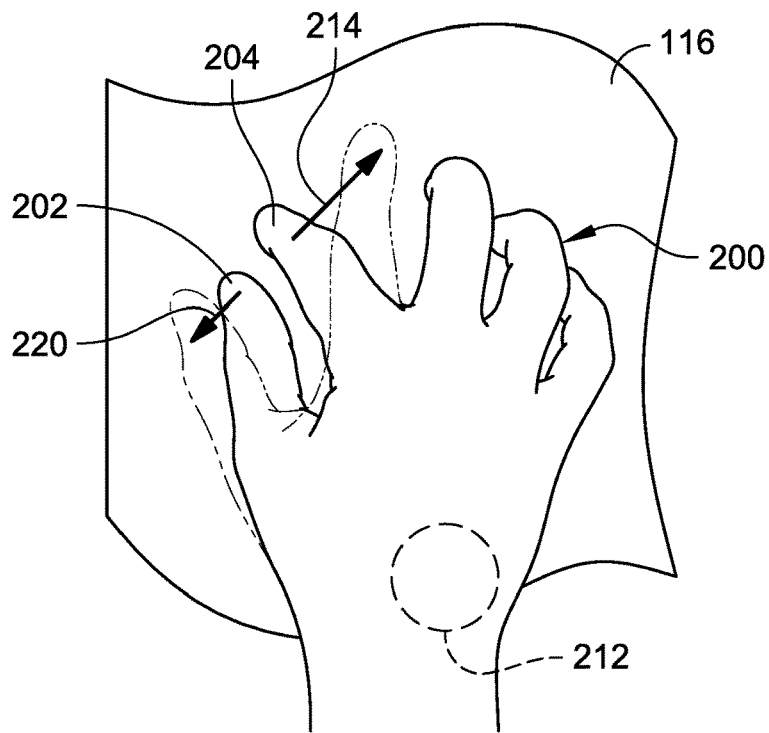

FIG. 25 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 26:
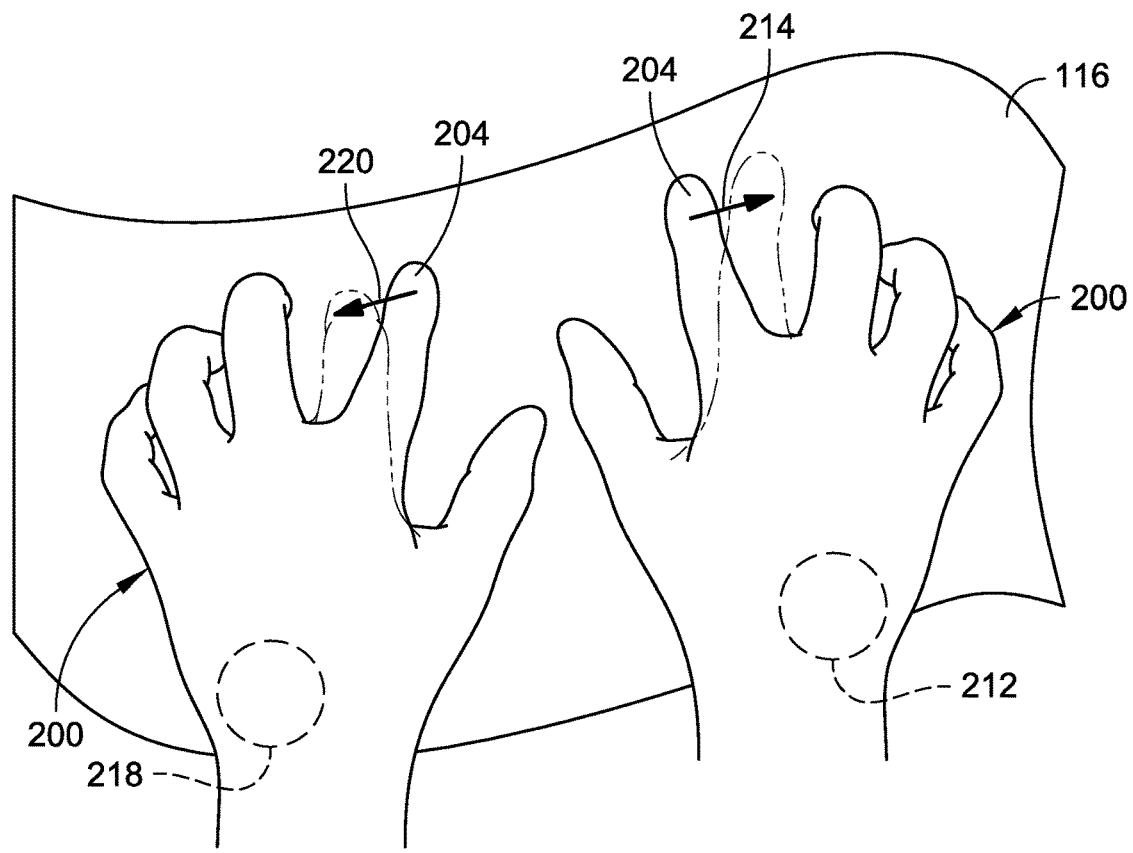

FIG. 26 is a diagrammatic view illustrating an example of touch locations of an operator's hands on a touch surface of a graphical interface of a flight deck system, such as the flight deck system illustrated in FIG. 1, in accordance with embodiments of the present disclosure.

Figure 27:
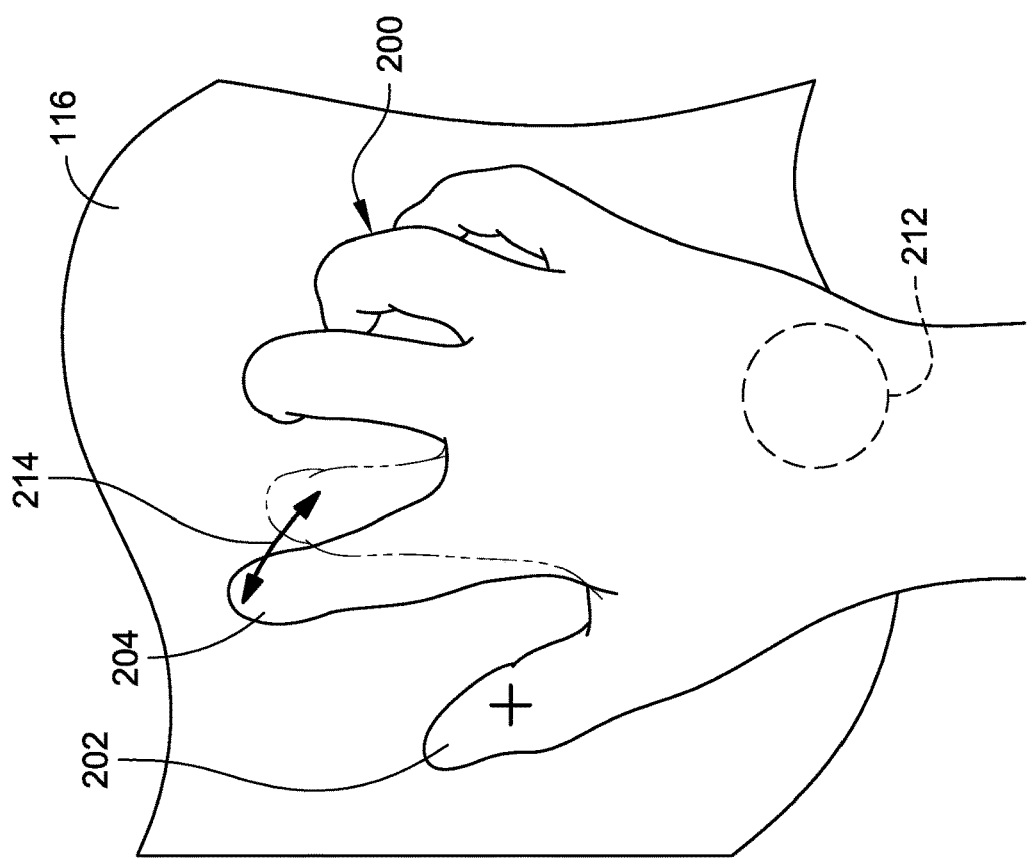

FIG. 27 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 28:
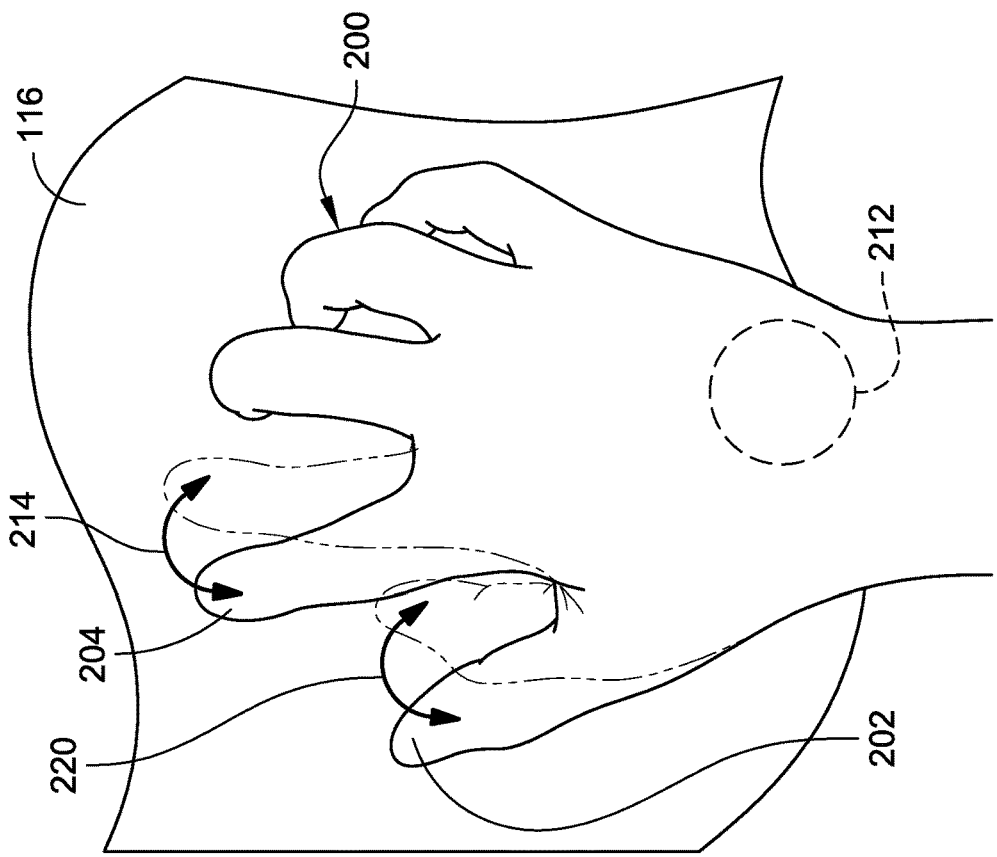

FIG. 28 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 29:
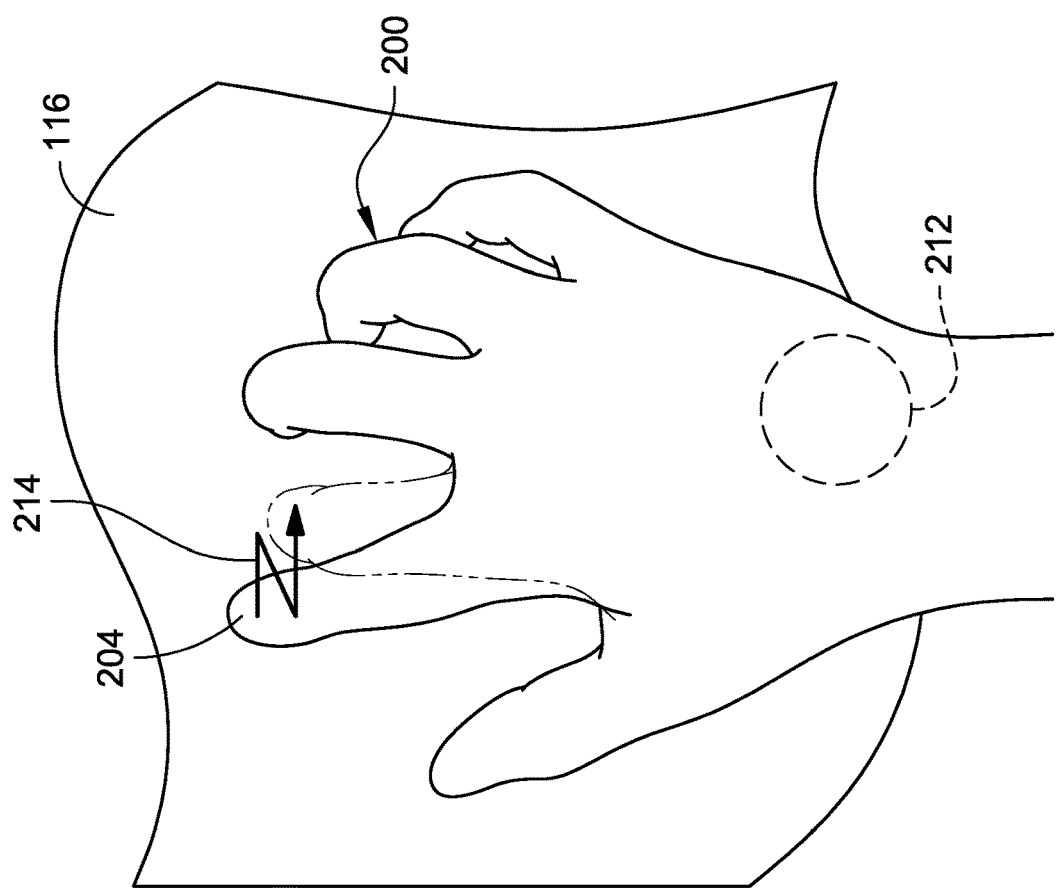

FIG. 29 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 30:
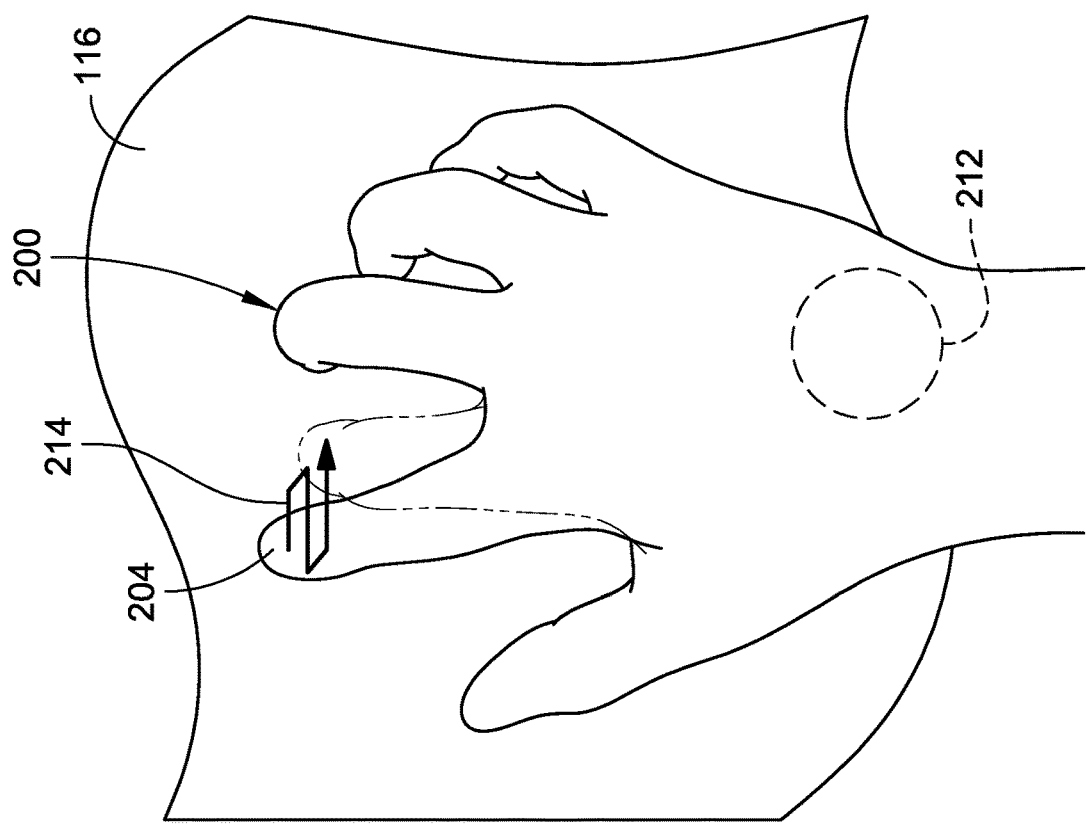

FIG. 30 is a diagrammatic view illustrating another example of touch locations of an operator's hand on a touch surface of a graphical interface of a flight deck system, such as the flight deck system illustrated in FIG. 1, in accordance with embodiments of the present disclosure.

Figure 31A:
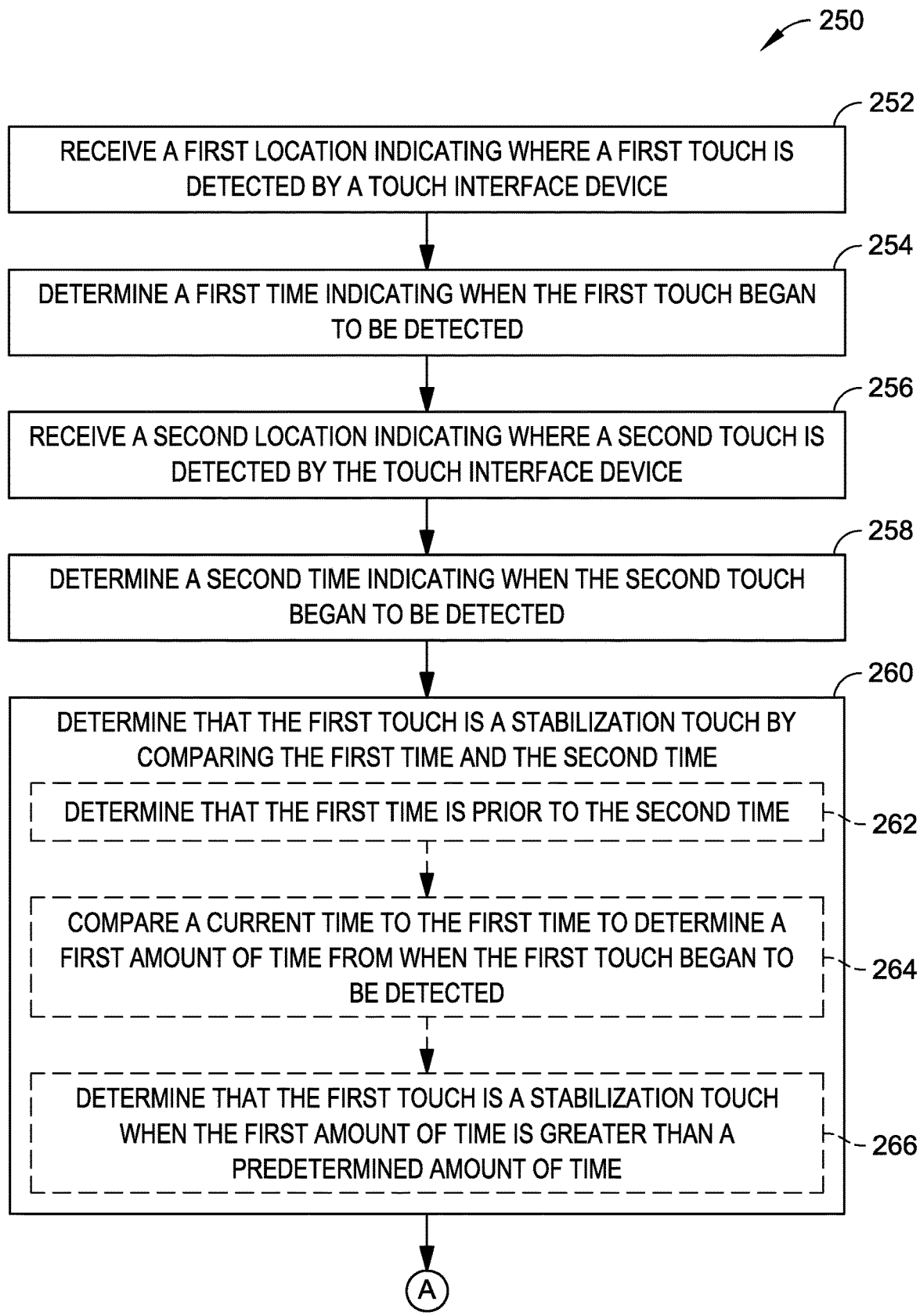

FIG. 31A is an example flow diagram illustrating an example process for operating a flight deck system of an aircraft, such as the flight deck system illustrated in FIG. 1, in accordance with an example implementation of the present disclosure.

Figure 31B:
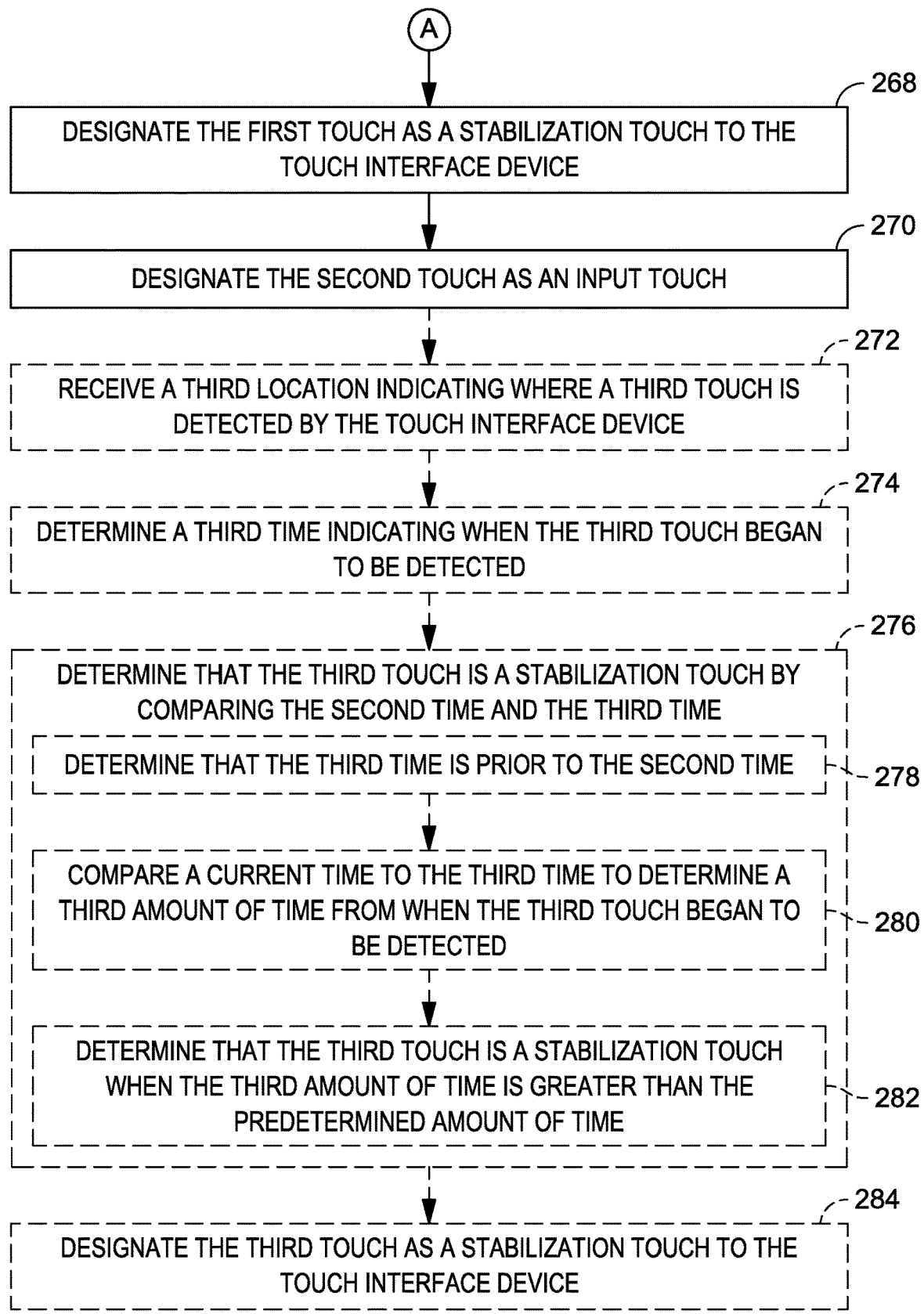

FIG. 31B is an example flow diagram illustrating another example process for operating a flight deck system of an aircraft, such as the flight deck system illustrated in FIG. 1, in accordance with an example implementation of the present disclosure.

Figure 32:
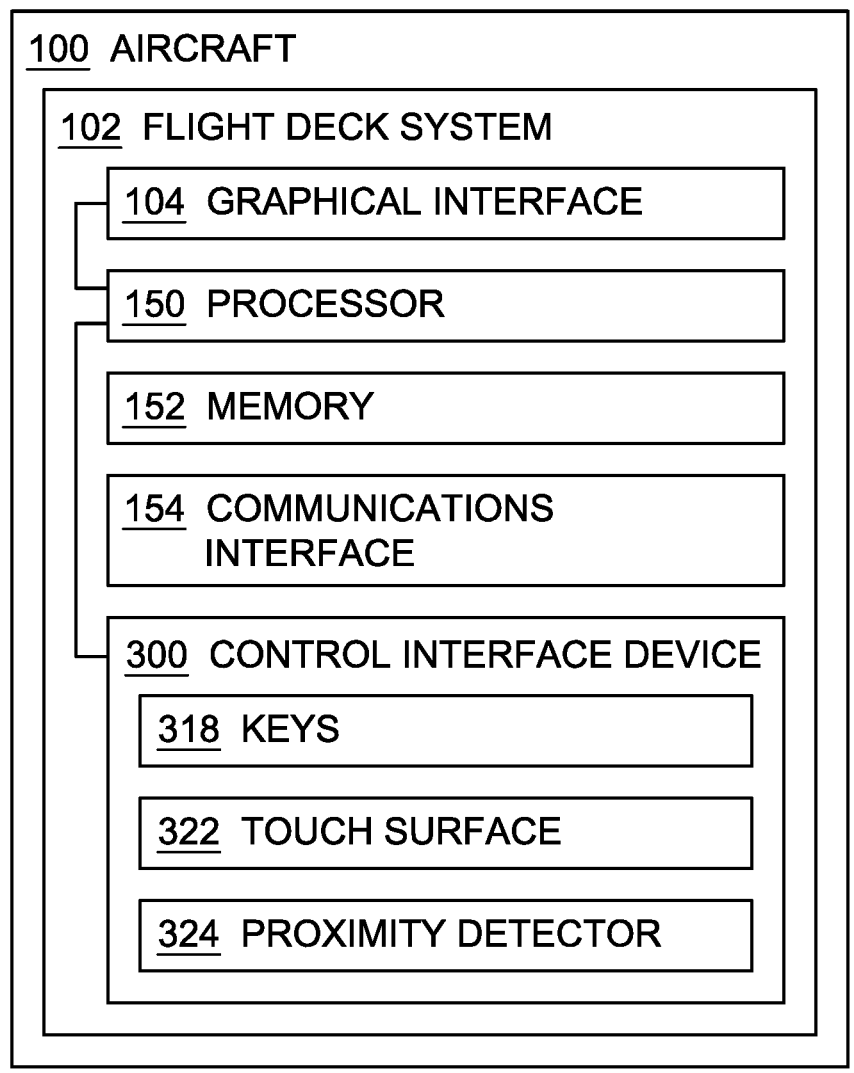

FIG. 32 is a block diagram illustrating a flight deck system, such as the flight deck system illustrated in FIG. 1, including a control interface device in accordance with embodiments of the present disclosure.

Figure 33:
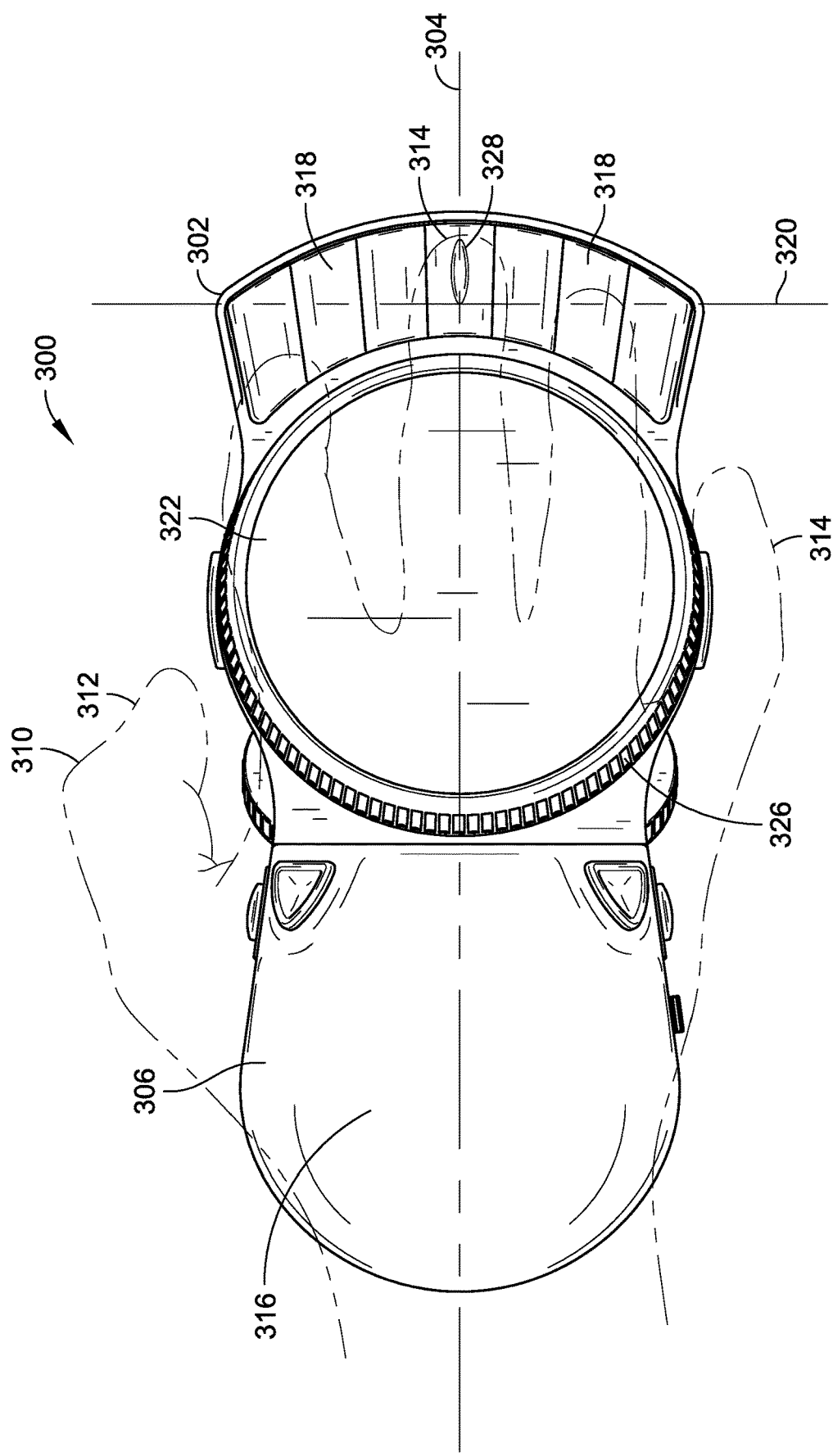

FIG. 33 is a top plan view illustrating a control interface device for a flight deck system, such as the flight deck system illustrated in FIG. 32, in accordance with embodiments of the present disclosure.

Figure 34:
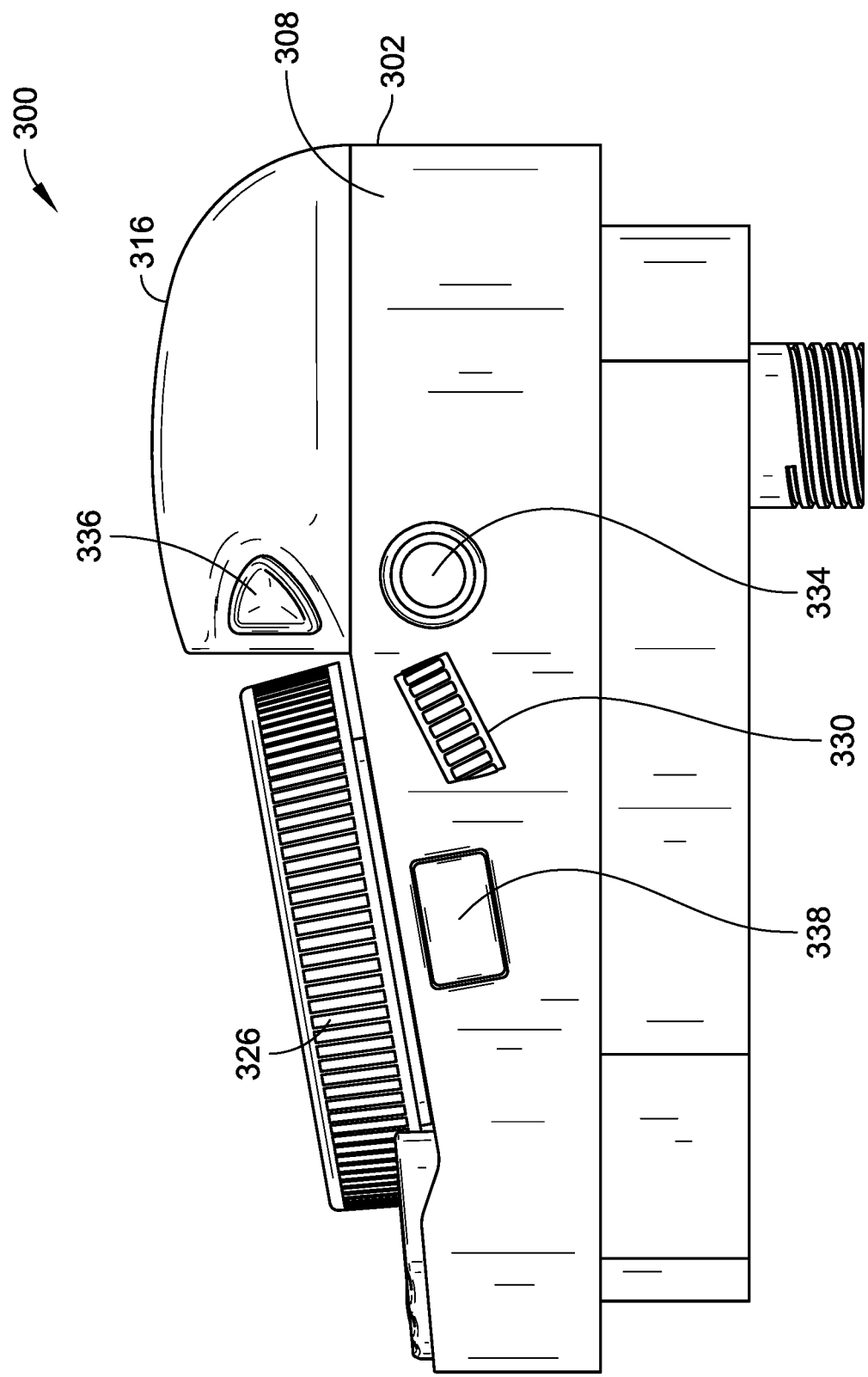

FIG. 34 is a side elevation view of the control interface device illustrated in FIG. 33.

Figure 35:
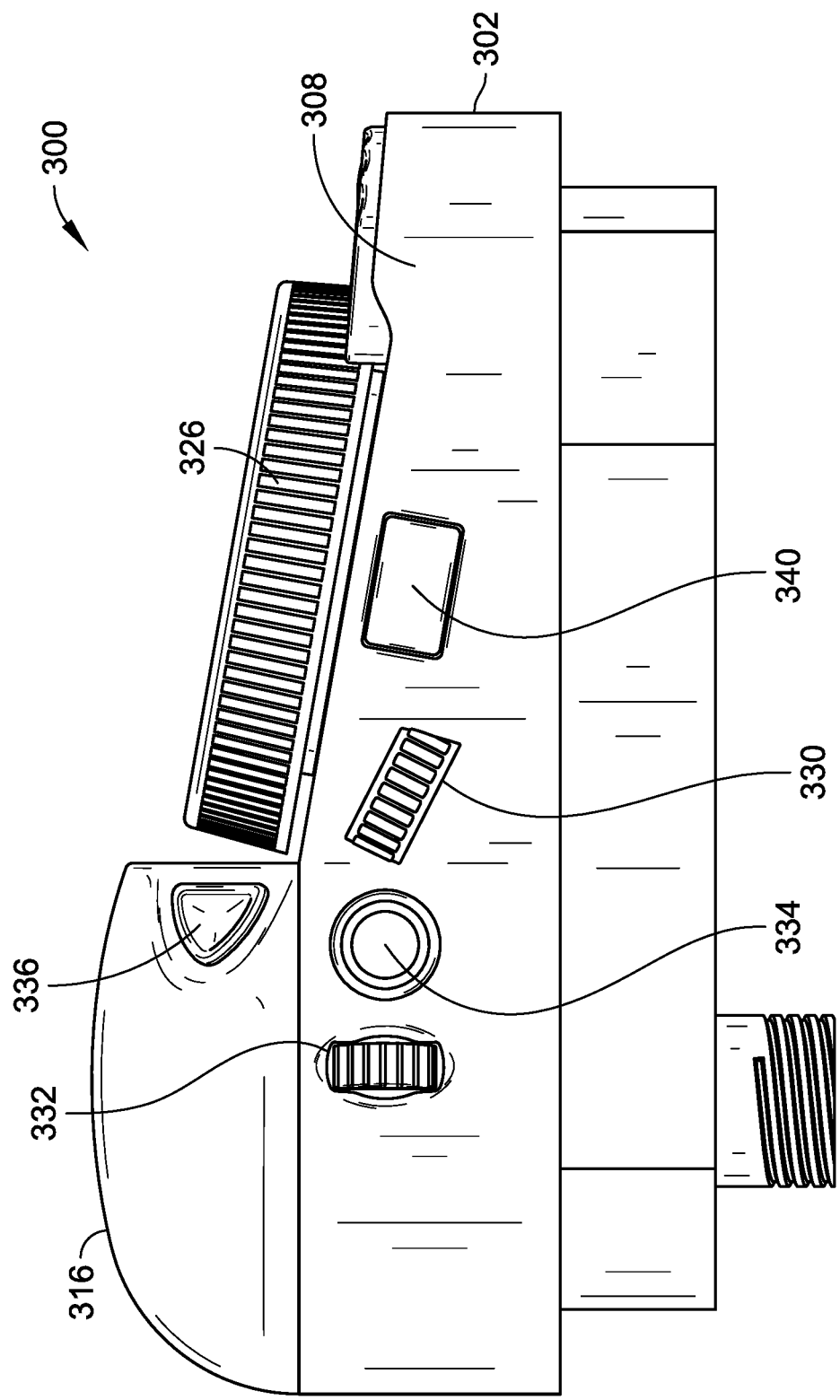

FIG. 35 is another side elevation view of the control interface device illustrated in FIG. 33.

Figure 36:
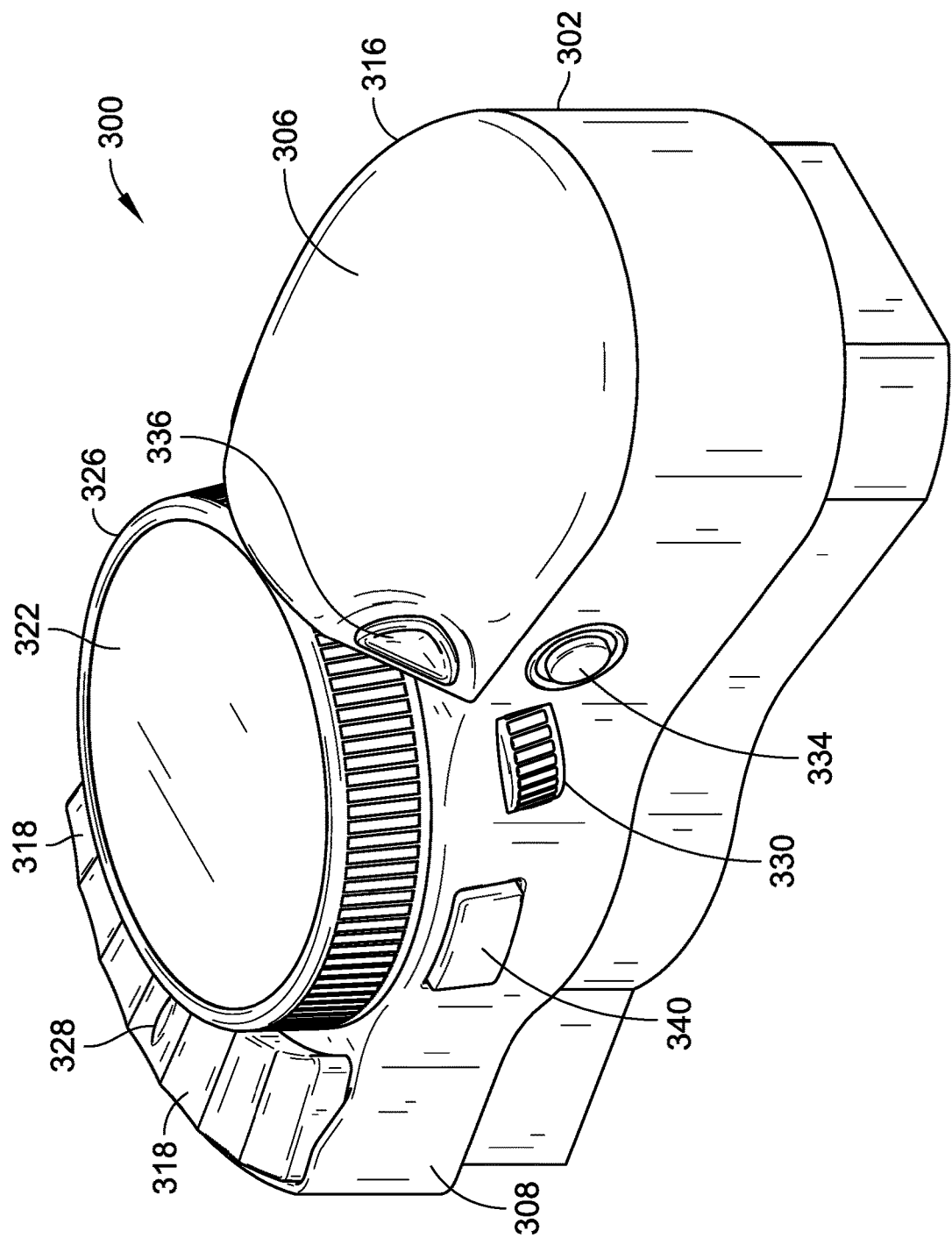

FIG. 36 is an isometric view of the control interface device illustrated in FIG. 33.

Figure 37:
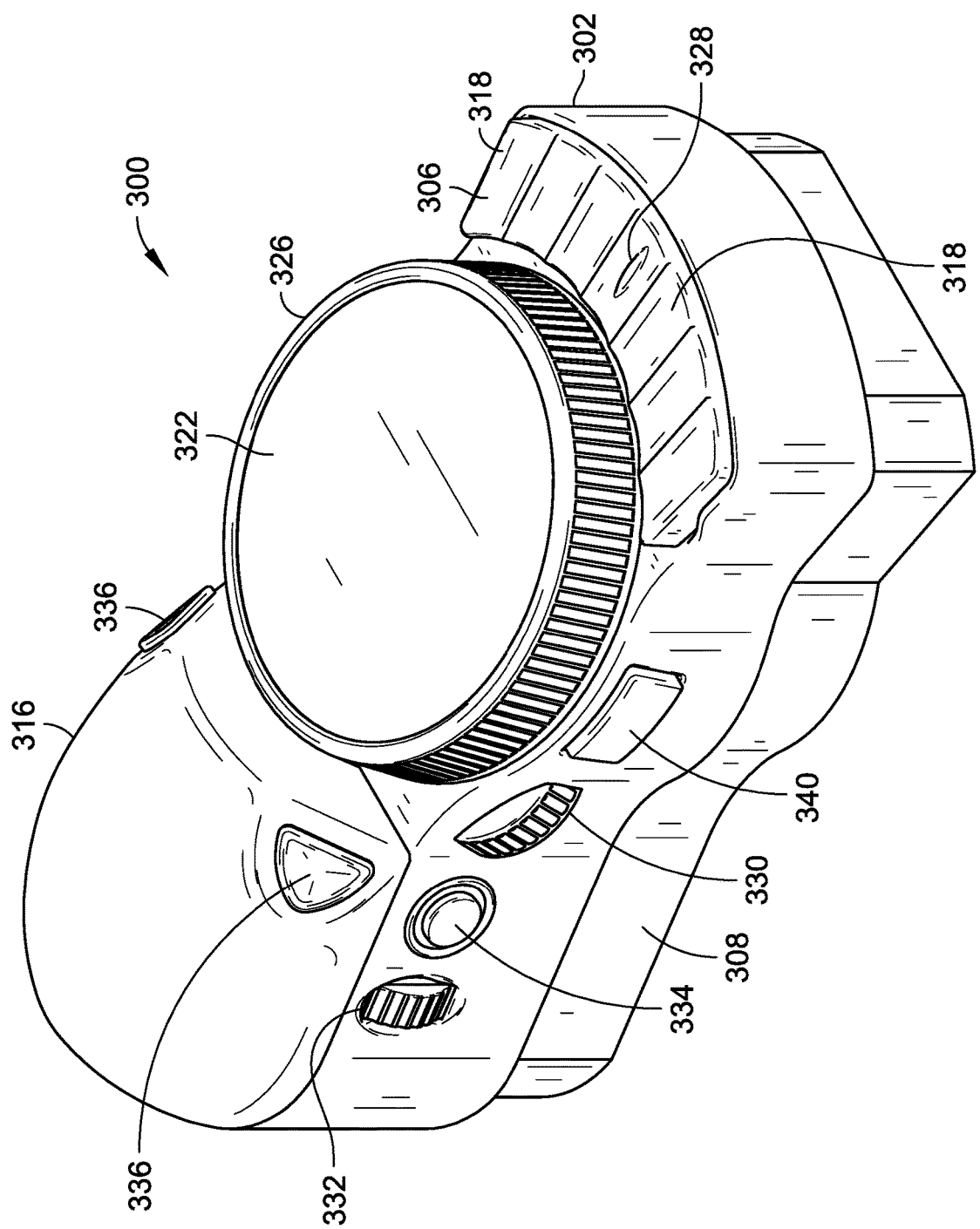

FIG. 37 is another isometric view of the control interface device illustrated in FIG. 33.

Figure 38:
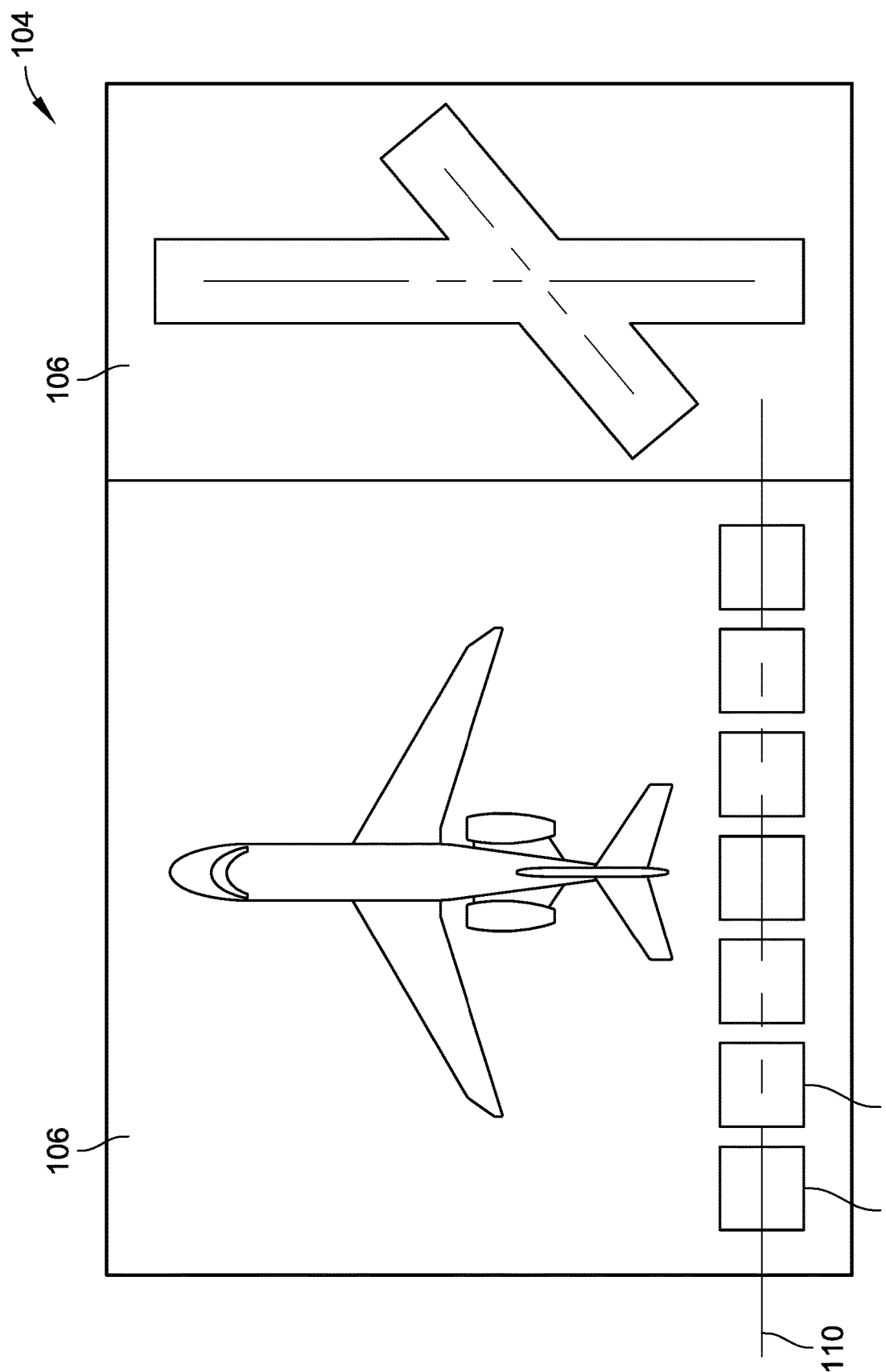

FIG. 38 is a diagrammatic view illustrating a display for displaying on a graphical interface of a flight deck system, such as the flight deck system illustrated in FIG. 32, in accordance with embodiments of the present disclosure.

Figure 39:
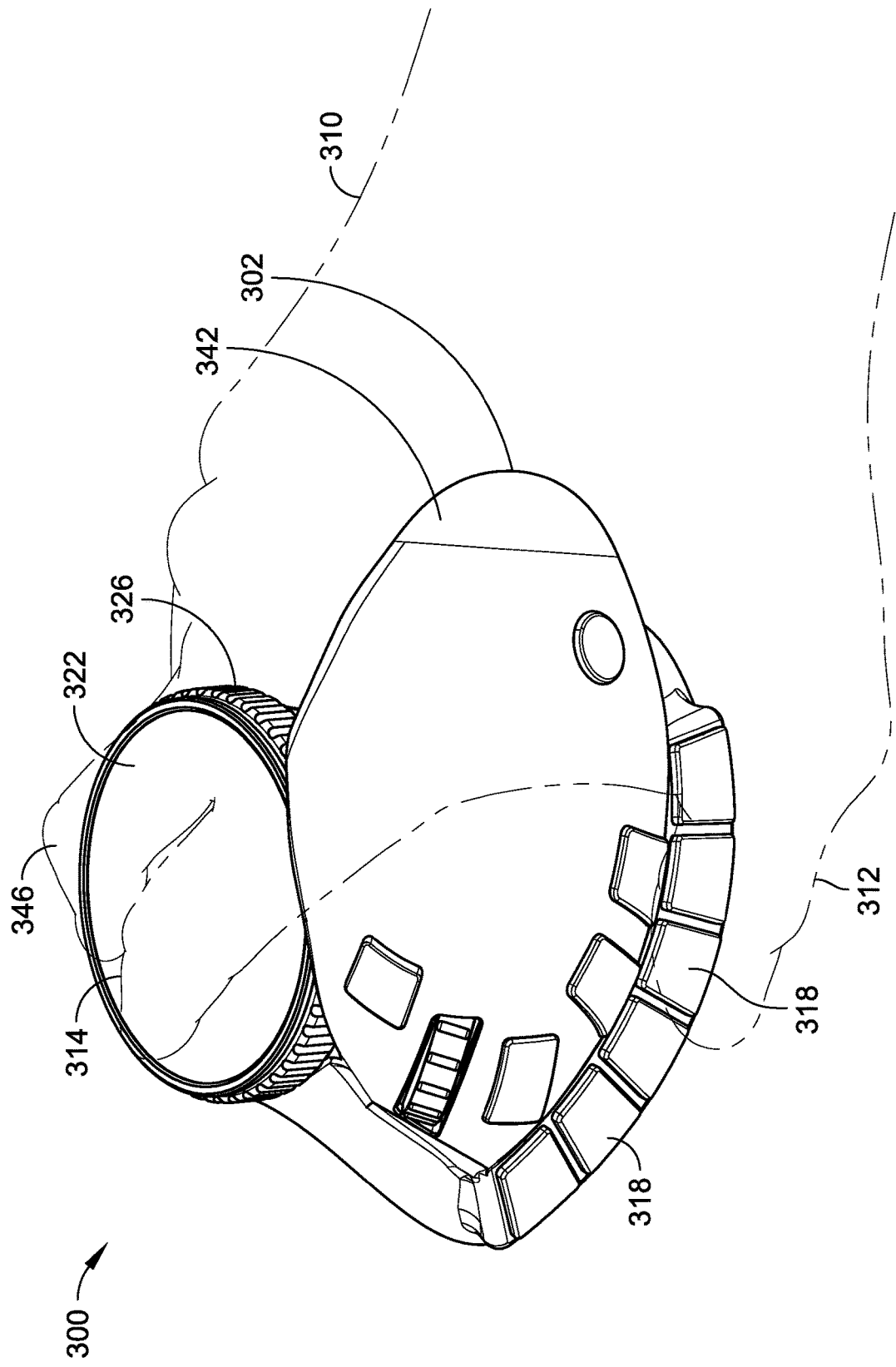

FIG. 39 is a top plan view illustrating a control interface device for a flight deck system, such as the flight deck system illustrated in FIG. 32, in accordance with embodiments of the present disclosure.

Figure 40:
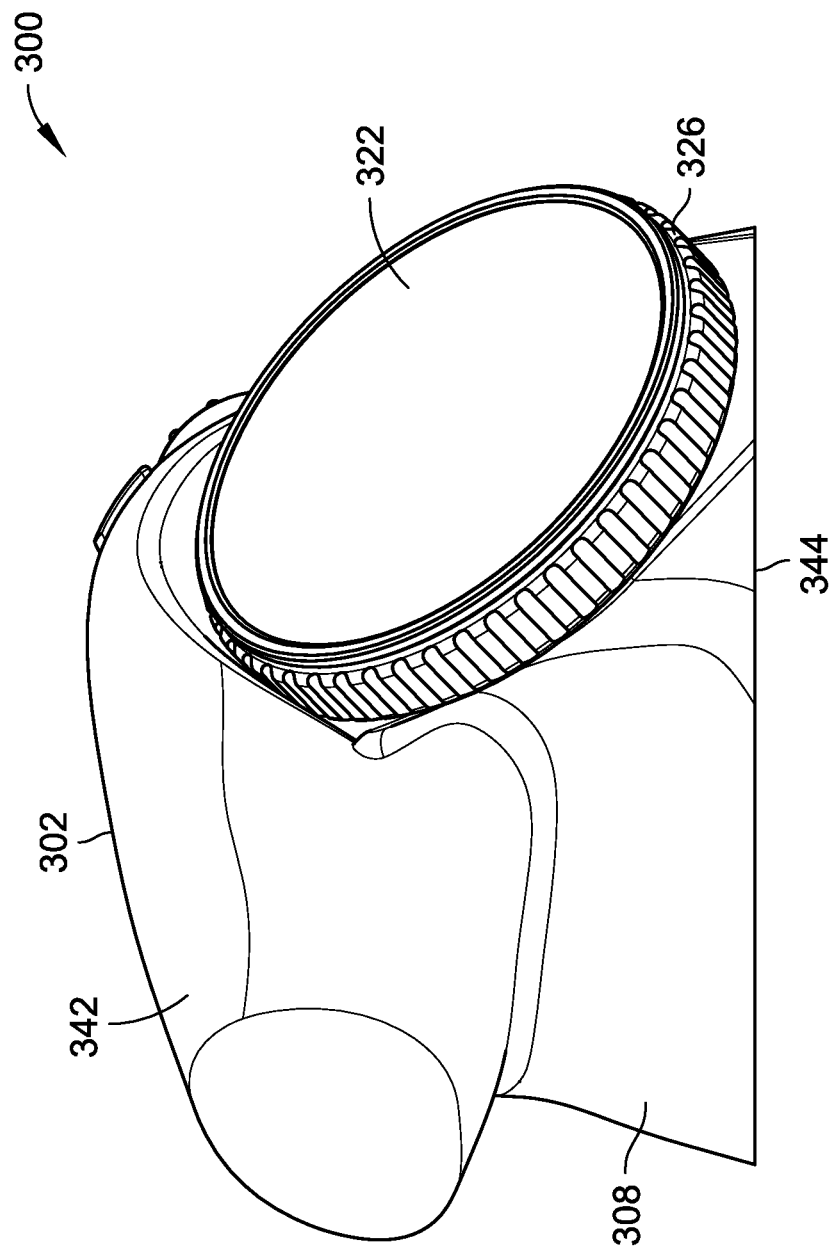

FIG. 40 is a side elevation view of the control interface device illustrated in FIG. 39.

Figure 41:
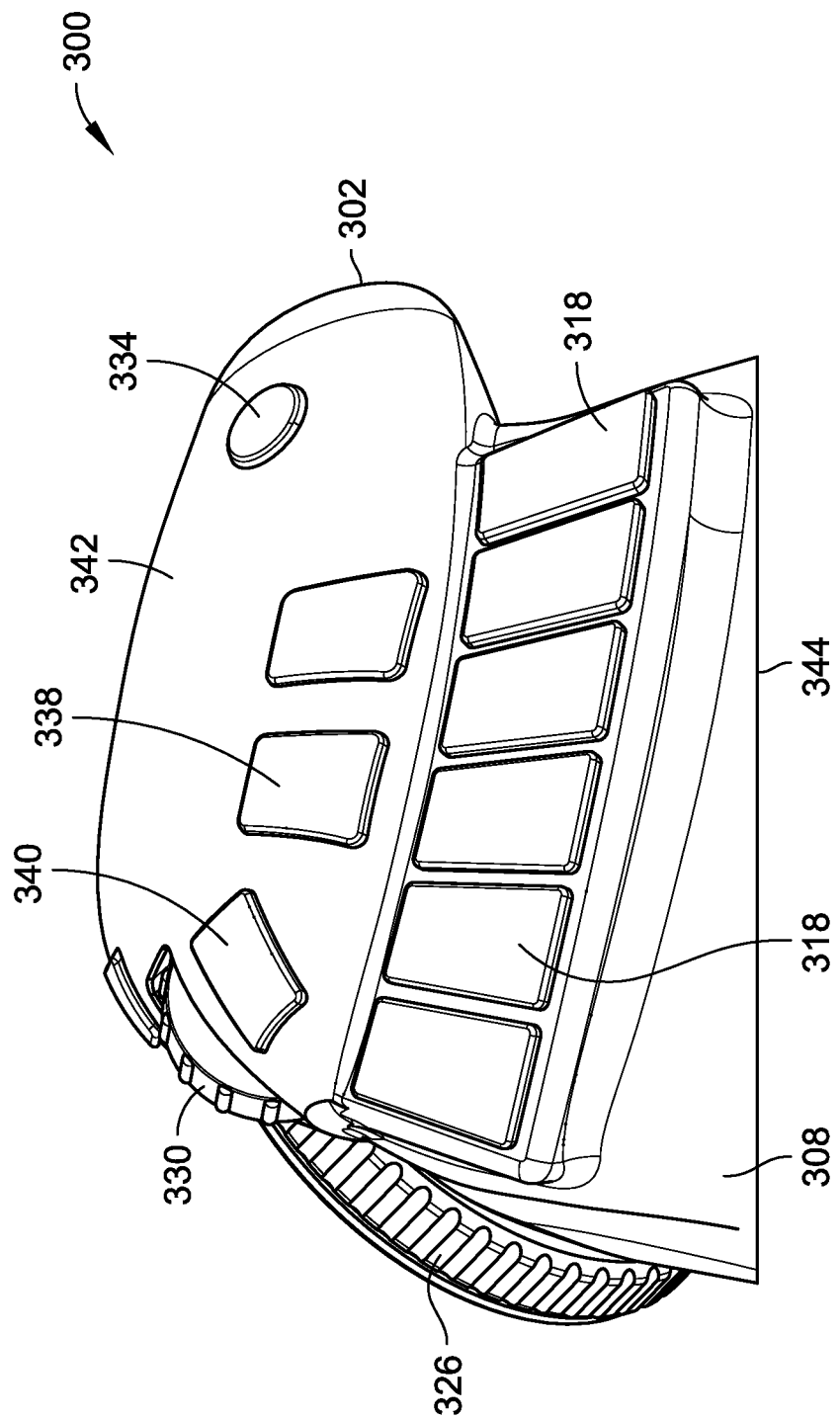

FIG. 41 is another side elevation view of the control interface device illustrated in FIG. 39.

Figure 42:
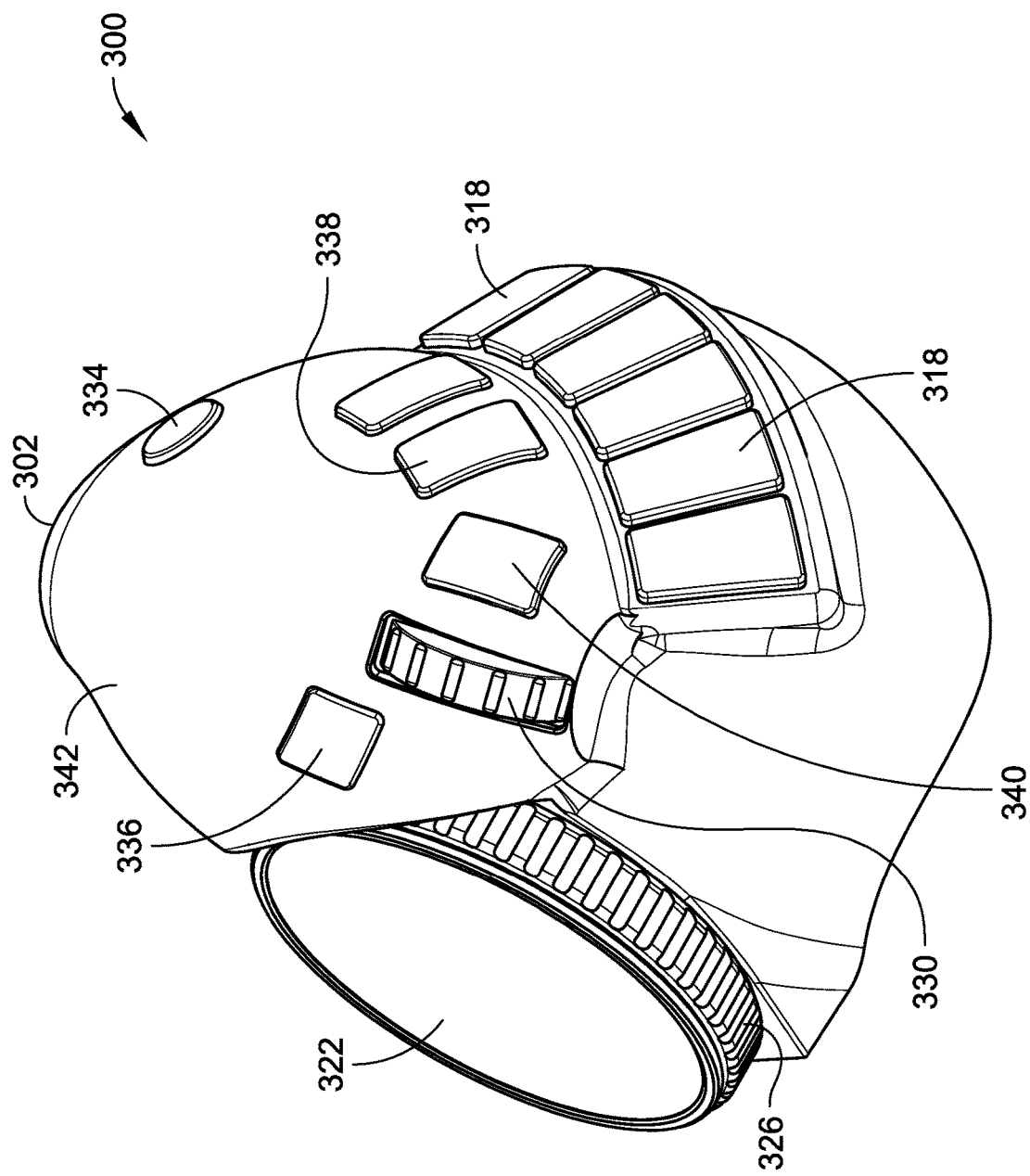

FIG. 42 is an isometric view of the control interface device illustrated in FIG. 39.

Figure 43:
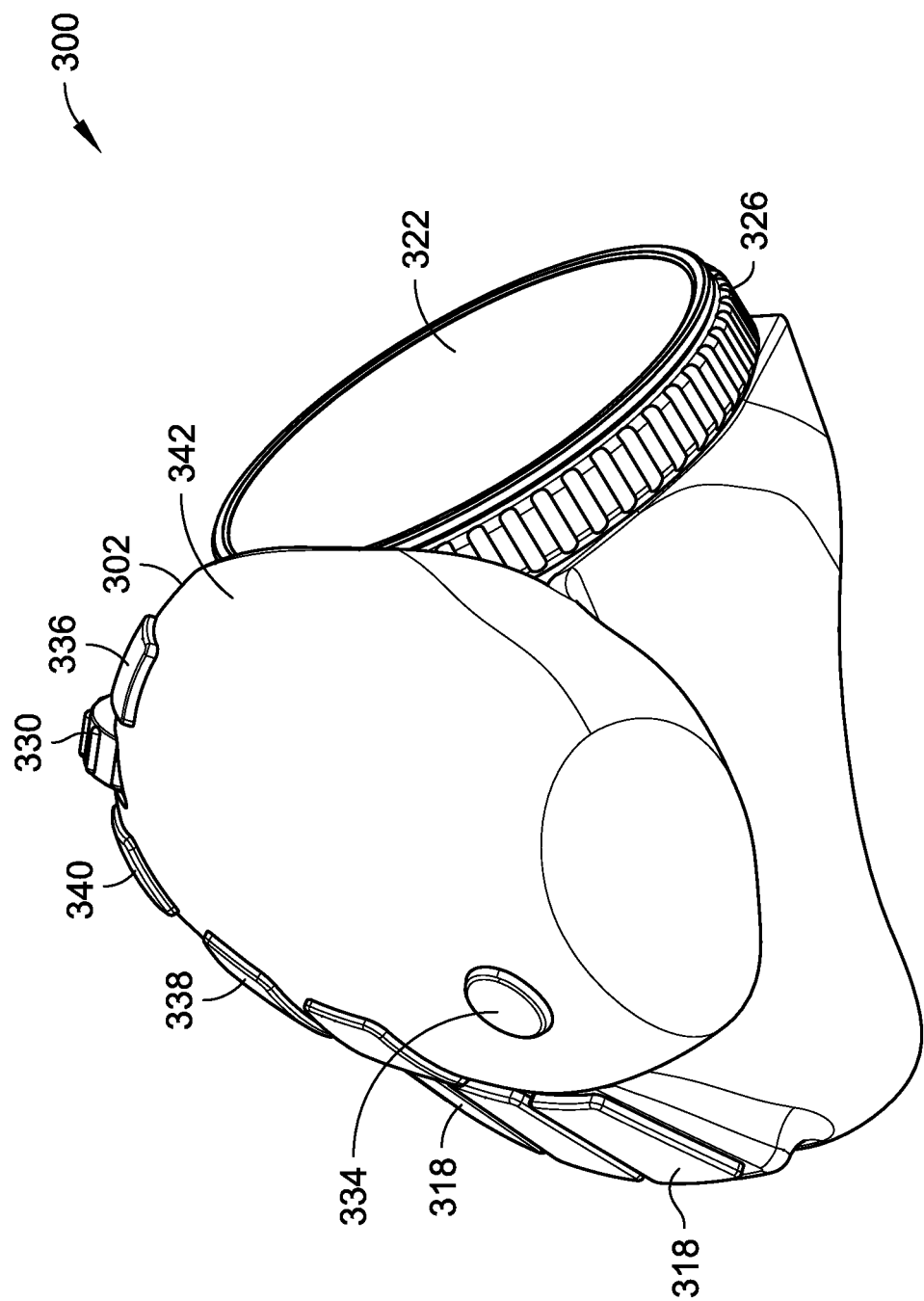

FIG. 43 is another isometric view of the control interface device illustrated in FIG. 39.

DETAILED DESCRIPTION

A flight deck system can include electronic devices, such as integrated avionics systems, which are utilized by one or more aircraft operators (e.g., a pilot and/or a co-pilot) to navigate an aircraft. Integrated avionics systems may employ primary flight display(s) (PFDs) and multifunction display(s) (MFDs) to furnish primary flight control, navigational, and other information to the flight crew of the aircraft. Additionally, the integrated avionics systems may also employ an avionics control and display unit (CDU) and/or other control devices that are configured to provide control functionality to the PFDs and/or the MFDs.

There is a recognized need to provide the operator with the ability to control the aircraft during motion-related aircraft events (e.g., turbulence events). During such turbulence events, it may be difficult for the operator to access auxiliary control devices and/or aircraft displays. In order to obtain needed flight information, an aircraft operator needs substantially unimpaired access to interact with the displays and/or control devices. For example, the operator may wish to interact with the displays and/or control devices of the integrated avionics system by transitioning between windows of flight information or executing a selectable function. To accomplish this task, the user must engage the display and/or control device with a steady hand and finger. Given the precision required for touch inputs, vibrations or sudden unexpected motions experienced during turbulence events can make such interaction with the displays and/or control devices difficult. For example, the operator may engage in non-active touch of the displays and/or control devices (e.g., for stabilization purposes) and unintentionally engage the integrated avionics system. Even under normal flight conditions (e.g., low turbulence conditions), the level of precision required for touch inputs may make data entry difficult and result in operator errors. There is also a recognized need to provide the operator with the ability to efficiently obtain flight-related information, both during turbulence events and under normal flight conditions.

For efficiency and/or safety of operation, it may be beneficial for the flight deck system to include a graphical interface that can receive and selectively identify active touch inputs (e.g., touch inputs meant to engage the graphical interface) without inadvertently detecting non-active touch(es) (e.g., stabilization touch). It may also be beneficial for the flight deck system to include a control interface device for operating the aircraft without physically touching the graphical interface device and/or other auxiliary controls, for example, in situations where the graphical interface and/or other auxiliary controls are beyond the reach of the operator. Such a control interface device may also reduce the operator's need to visually search for auxiliary control tools, minimizing heads-down time (e.g., time which an operator spends with attention diverted away from the primary visual field and towards auxiliary control tools).

Accordingly, flight deck systems, control interface devices for flight deck systems, and methods for operating flight deck systems for controlling an aircraft are described. In an embodiment, a flight deck system (e.g., integrated avionic system) includes a display device for providing a graphical interface for displaying flight-related information including a plurality of windows to an operator. The display device is configured for displaying the plurality of windows within a plurality of regions, each one of the plurality of regions having a predefined shape and orientation on the display screen according to a regular grid layout. A touch interface is coordinated with the display device for receiving touch information from the operator and allowing the operator to interact with the displayed graphical interface. A processor is communicatively and/or operatively coupled with the touch interface device and operatively coupled with the display device. The processor can be configured to receive a first selection of a window of the plurality of windows from the touch interface device. The processor can be further configured to present, via the display device, a plurality of icons to the operator, each of which corresponds to one or more of the plurality of regions of predefined shape and orientation on the display screen. The processor can be further configured to receive a second selection of an icon of the plurality of icons and dynamically recreate the selected window of flight-related information within the one or more of the plurality of regions corresponding to the selected icon. In such embodiments, the operator can operate the graphical interface through direct touch, with reduced or no use of other auxiliary control tools (e.g., joystick, touchpad, etc.). As such, the operator can efficiently operate the aircraft and can maintain focus on the primary visual field, reducing heads-down time.

In an embodiment, a flight deck system includes a display device for providing a graphical interface for displaying flight-related information to an operator (e.g., user such as a pilot and/or a co-pilot). A touch interface device is disposed on the display device for receiving touch information from the operator and allowing the operator to interact with the graphical interface displayed on the display device. A processor is communicatively coupled with the touch interface device and operatively coupled with the display device. The processor is configured to receive a first location from the touch interface device indicating where a first touch is detected by the touch interface device, and determine a first time indicating when the first touch began to be detected. The processor can be further configured to receive one or more additional locations from the touch interface device indicating where one or more additional touches is detected by the touch interface device. For example, the processor can receive at least a second location indicating where at least a second touch is detected by the touch interface device, and determine a second time indicating when the second touch began to be detected. The processor can determine, by comparing the first time and the second time, that the first touch is a stabilization touch when the first time is prior to the second time, and designate the first touch as a stabilization touch to the touch interface device, allowing the operator to brace against the display device. The processor can also designate the second touch as an input touch. In such embodiments, the operator can brace against the display without inadvertently entering touch inputs on the touch interface device, allowing the operator to stabilize themselves during a motion-related aircraft event (e.g., a turbulence event).

In an embodiment, a control interface device for a flight deck system receives spatial data input by an operator in a flight deck system. The control interface device includes a housing for being gripped by opposing digits of an operator's hand and stabilizing the operator's hand (e.g., during a turbulence event). The control interface device further includes a plurality of keys arranged along a line. The control interface device is configured to communicatively couple with a processor operatively coupled with a graphical interface for displaying flight-related information. The flight-related information can include a plurality of selectable items arrangeable along a second line when viewing the graphical interface. The spatial data from the operator is usable by the processor to manipulate the flight-related information displayed on the graphical interface by consistently mapping each one of the plurality of keys arranged along the first line to a corresponding one of the plurality of selectable items displayed along the second line of the graphical interface when a key selection is made by the operator so that the operator associates the plurality of keys with corresponding positions of the plurality of selectable items. In such embodiments, the operator can manipulate the flight-related information displayed on the graphical interface without physically interacting with the graphical interface, for example, during situations where the operator cannot physically reach or access the graphical interface such as during a motion-related aircraft event (e.g., during a turbulence event). Because the operator's hand is stabilized in one or more directions (e.g., side-to-side, upward, and/or downward), the operator has increased control of the aircraft during such turbulence events. Further, the key mapping functionality can allow the operator to control the aircraft without shifting attention away from the primary visual field, reducing heads-down time.

Example Embodiments

Figure 2:
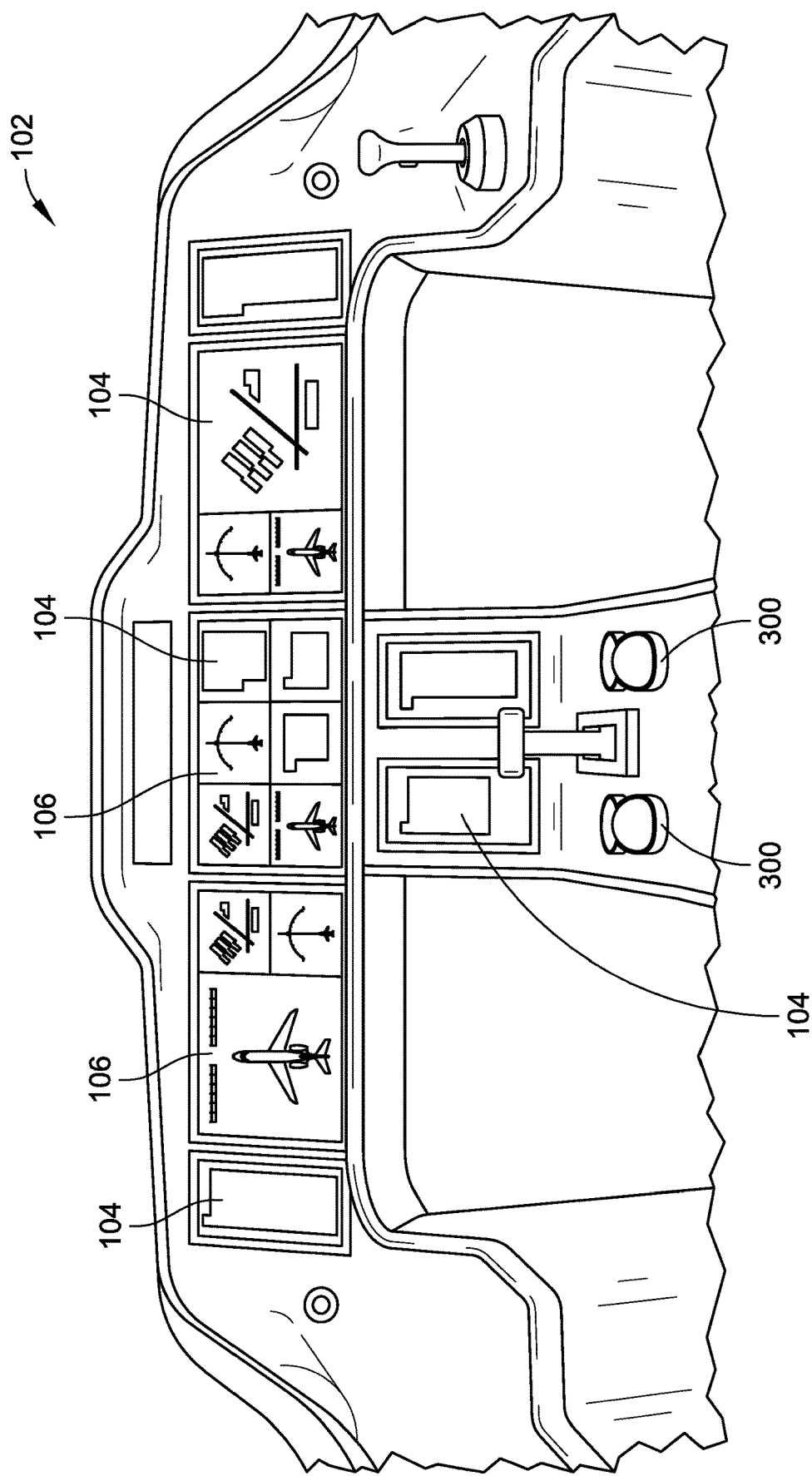
FIG. 2 is an illustration depicting a representative example instrument panel of an aircraft including a flight deck system configured in accordance with various implementations of the present disclosure.
Figure 3:
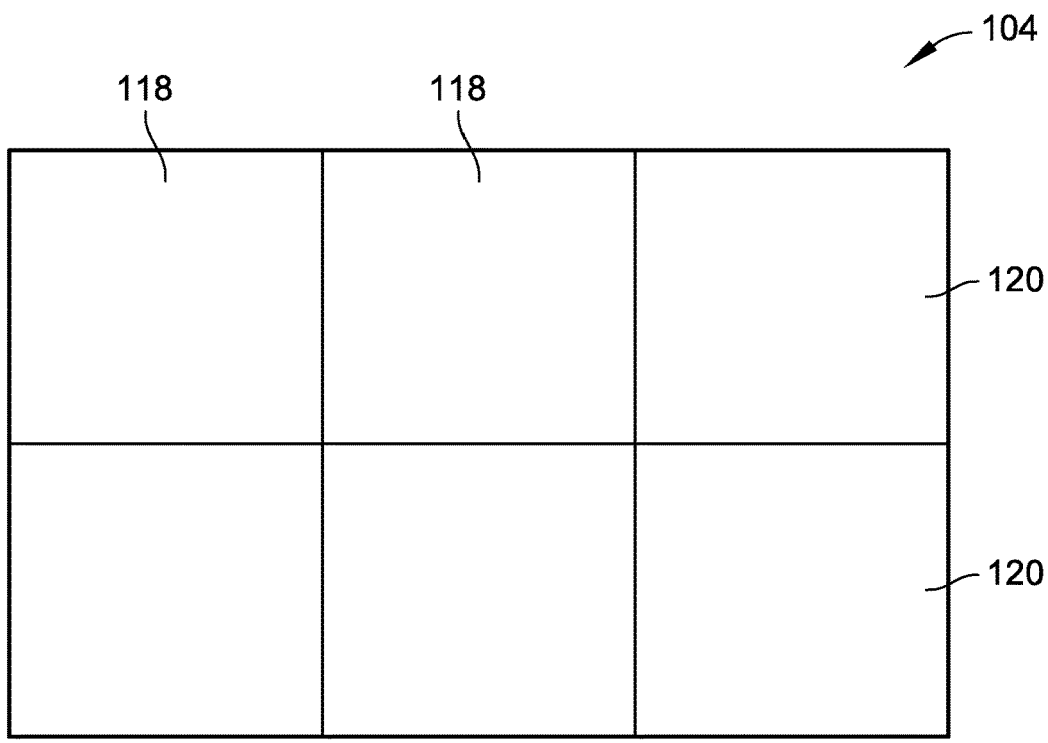
FIG. 3 is a diagrammatic view illustrating a display including a plurality of windows having regions for displaying on a graphical interface of a flight deck system, such as the flight deck system illustrated in FIG. 1, in accordance with embodiments of the present disclosure.
Figure 4:
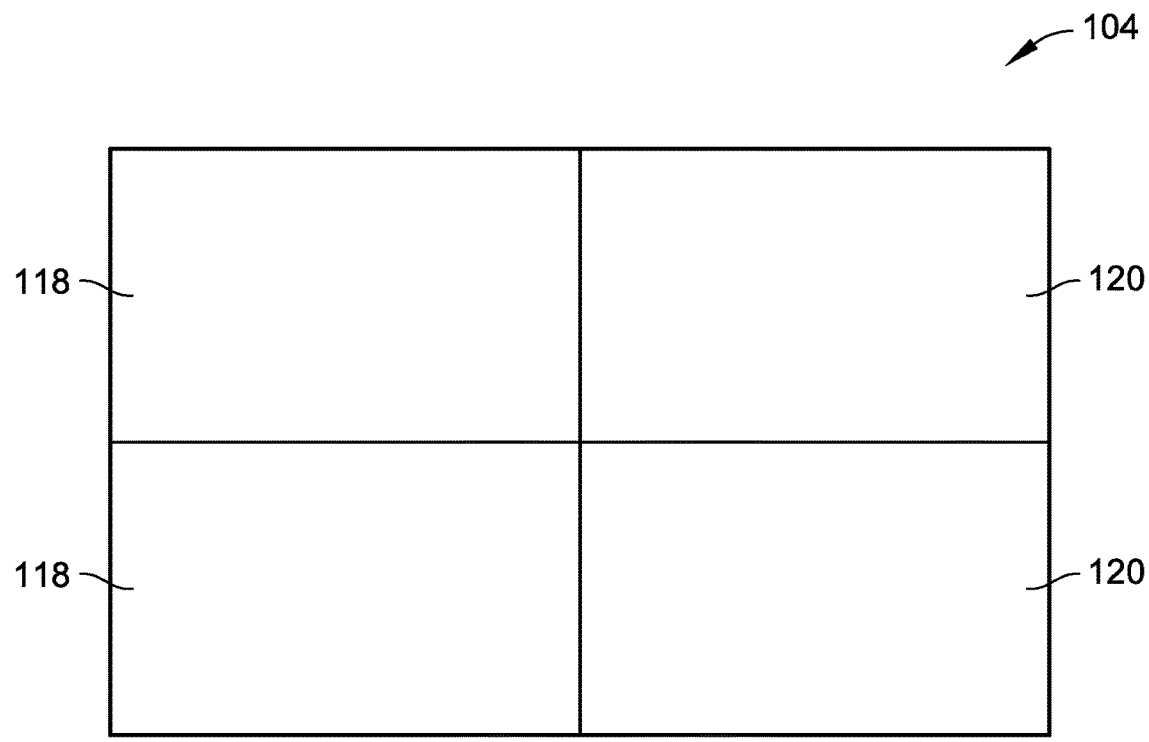
FIG. 4 is a diagrammatic view illustrating another display including a plurality of windows having regions for displaying on a graphical interface of a flight deck system, such as the flight deck system illustrated in FIG. 1, in accordance with embodiments of the present disclosure.
Figure 5:
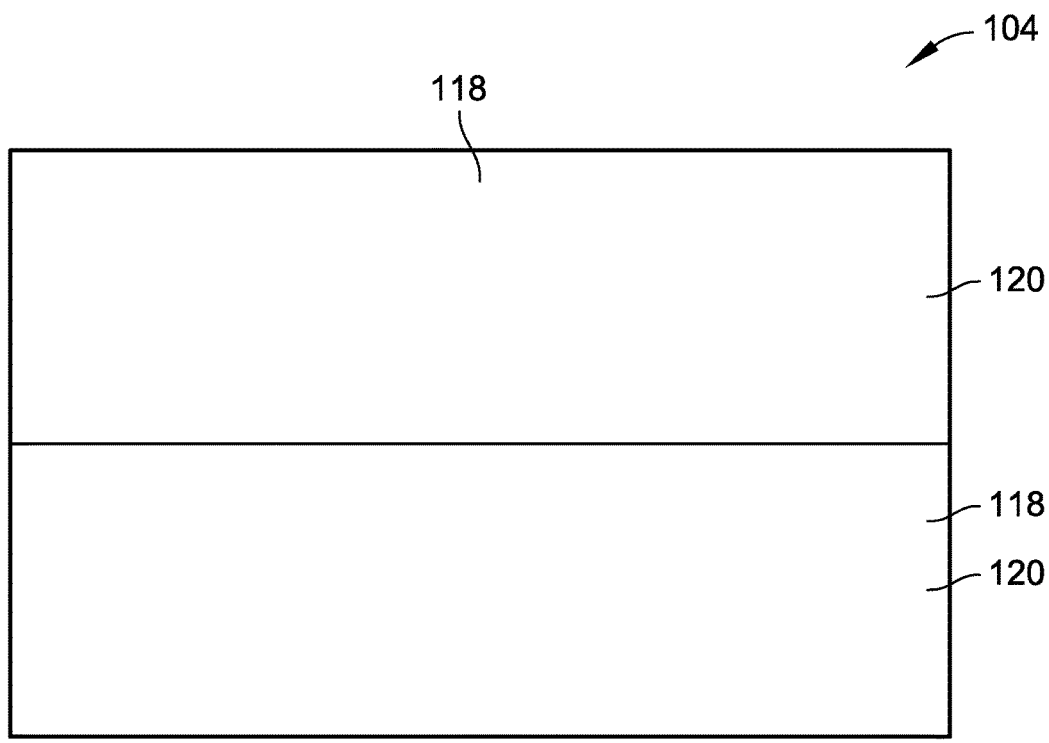
FIG. 5 is a diagrammatic view illustrating another display including a plurality of windows having regions for displaying on a graphical interface of a flight deck system, such as the flight deck system illustrated in FIG. 1, in accordance with embodiments of the present disclosure.

FIGS. 1 and 2 illustrate an example embodiment of a flight deck system (e.g., integrated avionics system 102) within an aircraft 100. The integrated avionics system 102 generally includes a touch screen interface having a graphical interface 104, a processor 150, a memory 152, a communications interface 154. In some embodiments, the integrated avionics system 102 can further include one or more control interface devices (e.g., cursor control device (CCD) 300).

The processor 150 provides functionality to the graphical interface 104 and/or the CCD 300. For example, the processor 150 can be operably and/or communicatively coupled with the graphical interface 104 and/or the CCD 300. The processor 150 can be included with or in a system 102, or with or in the CCD 300. The processor 150 can control the components and functions of the system 102 described herein using software, firmware, hardware (e.g., fixed logic circuitry), manual processing, or a combination thereof. The terms "controller," "functionality," "service," and "logic" as used herein generally represent software, firmware, hardware, or a combination of software, firmware, or hardware in conjunction with controlling the system 102. In the case of a software implementation, the module, functionality, or logic represents program code that performs specified tasks when executed on a processor (e.g., central processing unit (CPU) or CPUs). The program code can be stored in one or more computer-readable memory devices (e.g., internal memory and/or one or more tangible media), and so on. The structures, functions, approaches, and techniques described herein can be implemented on a variety of commercial computing platforms having a variety of processors.

The processor 150 provides processing functionality for the system 102 and can include any number of processors, micro-controllers, or other processing systems, and resident or external memory for storing data and other information accessed or generated by the system 102. The processor 150 can execute one or more software programs that implement techniques described herein. The processor 150 is not limited by the materials from which it is formed or the processing mechanisms employed therein and, as such, can be implemented via semiconductor(s) and/or transistors (e.g., using electronic integrated circuit (IC) components), and so forth.

The memory 152 is an example of tangible, computer-readable storage medium that provides storage functionality to store various data associated with operation of the system 102, such as software programs and/or code segments, or other data to instruct the processor 150, and possibly other components of the system 100, to perform the functionality described herein. Thus, the memory 152 can store data, such as a program of instructions for operating the system 102 (including its components), and so forth. It should be noted that while a single memory 152 is described, a wide variety of types and combinations of memory (e.g., tangible, non-transitory memory) can be employed. The memory 152 can be integral with the processor 150, can include stand-alone memory, or can be a combination of both.

The memory 152 can include, but is not necessarily limited to: removable and non-removable memory components, such as random-access memory (RAM), read-only memory (ROM), flash memory (e.g., a secure digital (SD) memory card, a mini-SD memory card, and/or a micro-SD memory card), magnetic memory, optical memory, universal serial bus (USB) memory devices, hard disk memory, external memory, and so forth. In implementations, the system 102 and/or the memory 152 can include removable integrated circuit card (ICC) memory, such as memory provided by a subscriber identity module (SIM) card, a universal subscriber identity module (USIM) card, a universal integrated circuit card (UICC), and so on.

The system 102 includes a communications interface 154. The communications interface 154 is operatively configured to communicate with components of the system 100. For example, the communications interface 154 can be configured to transmit data for storage in the system 102, retrieve data from storage in the system 100, and so forth.

The communications interface 154 is also communicatively coupled with the processor 150 to facilitate data transfer between components of the system 100 and the processor 150 (e.g., for communicating inputs to the processor 150 received from a device communicatively coupled with the system 100). It should be noted that while the communications interface 154 is described as a component of a system 100, one or more components of the communications interface 154 can be implemented as external components communicatively coupled to the system 102 via a wired and/or wireless connection. The system 100 can also include and/or connect to one or more input/output (I/O) devices (e.g., via the communications interface 154), including, but not necessarily limited to: a display, a mouse, a touchpad, a keyboard, and so on.

The communications interface 154 and/or the processor 150 can be configured to communicate with a variety of different networks, including, but not necessarily limited to: ARINC 429; RS-232; RS-422; CAN Bus; ARINC 661; a wide-area cellular telephone network, such as a 3G cellular network, a 4G cellular network, or a global system for mobile communications (GSM) network; a wireless computer communications network, such as a WiFi network (e.g., a wireless local area network (WLAN) operated using IEEE 802.11 network standards); an internet; the Internet; a wide area network (WAN); a local area network (LAN); a personal area network (PAN) (e.g., a wireless personal area network (WPAN) operated using IEEE 802.15 network standards); a public telephone network; an extranet; an intranet; and so on. However, this list is provided by way of example only and is not meant to limit the present disclosure. Further, the communications interface 154 can be configured to communicate with a single network or multiple networks across different access points.

The system 102 includes a touch screen interface, such as an electronic visual display that incorporates a touch panel overlying an electronic display to detect the presence and/or location of a touch within the display area of the screen. For example, the system, includes a display device 112 and a touch interface device 114 that allows an operator to provide input using an instrument such as a finger, a stylus, and so forth.

The display device 112 can include an LCD (Liquid Crystal Diode) display, a TFT (Thin Film Transistor) LCD display, an OLED display, an LEP (Light Emitting Polymer) or PLED (Polymer Light Emitting Diode) display, and so forth, configured to display text and/or graphical information such as graphical interface 104 on a display screen. The display device 112 can be backlit via a backlight such that it can be viewed in the dark or other low-light environments. In embodiments, the display device 112 can be disposed on an instrument panel of the aircraft, a pedestal area of the aircraft, an outboard area of the aircraft, and so forth. In embodiments, the integrated avionics system 102 can include one or more display devices 112 providing differing functionality including, but not limited to: PFD(s), MFD(s), head up display(s) (HUDs), secondary display unit(s) (SDUs) and so forth. In some embodiments, the system 102 includes multiple display devices 112 and corresponding graphical interfaces 104. The number of display devices 112 can be selected based on the type of aircraft and/or size of the cockpit. In some embodiments, the system 102 can include 0 to 10 PFDs, 0 to 20 MFDs, and/or 0 to 3 HUDs. In specific embodiments, the system 102 can include 0 to 6 PFDs, 0 to 16 MFDs, and/or 0 to 2 HUDs. The display device(s) 112 may furnish a general purpose pilot interface to control the aircraft's avionics. For example, the display devices 112 allow the pilots to control various systems of the aircraft such as the aircraft's autopilot system, navigation systems, communication systems, engines, and so on, via the avionics data bus. In implementations, the avionics data bus may include a high speed data bus (HSDB), such as data bus complying with ARINC 429 data bus standard promulgated by the Airlines Electronic Engineering Committee (AEEC), a MIL-STD-1553 compliant data bus, and so forth.

A touch interface device 114 can be coordinated with the display device 112 for entry of data and commands. In embodiments, the operator may use his or her fingers to manipulate images on the display device 112 via the touch interface device 114. The touch interface device 114 can be disposed on the display device 112, external to the display device 112 (e.g., CCD 300, as described with reference to FIGS. 33 through 43), or a combination thereof. In a specific embodiment, the display device 112 is operable both by direct touch received at the display device 112 and by use of the CCD 300.

In one or more implementations, the touch interface device 114 includes a touch surface 116. For example, the touch surface 116 can be a resistive touch screen, a surface acoustic wave touch screen, a capacitive touch screen, an infrared touch screen, optical imaging touch screens, dispersive signal touch screens, acoustic pulse recognition touch screens, combinations thereof, and the like. Capacitive touch screens can include surface capacitance touch screens, projected capacitance touch screens, mutual capacitance touch screens, and self-capacitance touch screens. In implementations, the touch surface 116 is configured with hardware to generate a signal to send to a processor and/or driver upon detection of touch information (e.g., a touch input). As indicated herein, touch inputs include inputs, gestures, and movements where the input contacts the touch surface 116. In a specific embodiment, the touch surface 116 is a multi-touch-capable touch surface that can, for example, support multi-finger gestures, such as two-finger drag, multi-finger taps, rotation, and/or resizing (as described below). It is contemplated that while the touch surfaces 116 disclosed herein are described in reference to detecting touch input, other types of input may be detected such as hover inputs (e.g., inputs, gestures, and movements where the input does not contact the touch surface 116, but is detected proximal to the touch surface 116). In embodiments, the touch interface device 114 can receive touch information from an operator (e.g., user such as a pilot and/or a co-pilot) to interact with the graphical interface 104 displayed on the display screen. In some embodiments, the graphical interface 104 may include both active portions (e.g., areas that are responsive to operator touch information) and non-active portions (e.g., areas that are not responsive to operator touch information). In implementations, buttons, softkeys, keypads, knobs and so forth, may be used for entry of data and commands instead of or in addition to the touch surfaces 116.

In some embodiments, the graphical interface 104 is configured for displaying flight information (e.g., interactive flight-related information 106). The interactive flight-related information 106 can include a plurality of windows 118. For example, the interactive flight-related information 106 can include one or more primary flight windows (PFWs), one or more multifunction windows (MFWs), or a combination thereof. The PFWs may be configured to display primary flight information, such as aircraft attitude, altitude, heading, vertical speed, and so forth. In embodiments, the PFWs may display primary flight information via a graphical representation of basic flight instruments such as an attitude indicator, an airspeed indicator, an altimeter, a heading indicator, a course deviation indicator, and so forth. The PFWs may also display other flight-related information providing situational awareness to the pilot such as terrain information, ground proximity warning information, weather information, and so forth.

In embodiments, The MFWs display interactive flight-related information 106 describing operation of the aircraft such as navigation routes, moving maps, engine gauges, weather radar, terrain alerting and warning system (TAWS) displays, ground proximity warning system (GPWS) displays, traffic collision avoidance system (TCAS) displays, airport information, and so forth, that are received from a variety of aircraft systems via the avionics data bus and/or are self-contained within the display device 112. In some embodiments, the PFW may provide the functionality of an MFW. Where the system 102 includes multiple MFWs, MFWs that control a common systemwide value/state can be cross-filled when multiple instances viewing this value are active substantially simultaneously. Further, the display device 112 may be capable of displaying multiple instances of the same application in multiple MFWs, for example, with no restrictions on the number of the same application that could be displayed substantially simultaneously. In some embodiments, MFWs and/or PFWs shall support display and/or control of third-party applications (e.g., video, hosted applications, ARINC 661, etc.).

Example Display Device Embodiments

Referring now to FIGS. 3 through 16, the display device 112 is configured to display each of the windows 118 in a region of the graphical interface 104. For example, the graphical interface 104 can be divided into a predefined plurality of regions 120, with each of the regions 120 having a predefined size, shape, and/or orientation on the display screen according to a regular grid layout. In some embodiments, the regions can be dynamically configured by the operator. For example, the operator can define the size, shape, and/or orientation of the regions on the display screen.

In embodiments, each of the predefined regions 120 displays a window 118 of interactive flight-related information 106. For example, the display screen can be divided into six predefined regions 120, each of the predefined regions 120 being operable to display a window 118 of interactive flight-related information 106 (e.g., with each window occupying $\frac{1}{6}^{th}$ of the display screen as described with reference to FIG. 3). In other embodiments, the display screen can be divided into four regions (e.g., as described with reference to FIG. 4) or two regions (e.g., as described with reference to FIG. 5). It is contemplated that the display screen may be divided into any number of regions 120 of any orientation that conform to a regular grid layout (e.g., any number of rectangular regions). The number, size, and/or orientation of the predefined regions 120 can be selected based on the size of the display device 112 (e.g. the size of the display screen) or based on operator and/or manufacturer preference. In some embodiments, each predefined region 120 may have a minimum physical size, and thus physically larger displays 112 may be able to support more windows 118.

In embodiments, the operator can select and/or manipulate interactive flight-related information 106 to be displayed via the graphical interface 104 by touch input. For example, an operator may provide a touch input over the touch surface 116 to cause a window selection input to be furnished to the processor 150 as discussed herein. When touch information is received from the touch interface device 114, the processor 150 can utilize the techniques described herein to cause the selected window 118 of interactive flight-related information 106 to be displayed in a predefined region(s) 120. Utilizing the techniques described herein, the operator can efficiently and selectively view desired interactive flight-related information 106 by direct touch without diverting attention from the primary visual field and without the use of auxiliary control tools, reducing heads-down time.

In embodiments, the size and/or location of the windows 118 can be manipulated by the operator (e.g., by touch input) based on the predefined regions 120. The processor 150 will dynamically recreate the window 118 of interactive flight-related information 106 within a selected predefined region(s) 120. Each of the windows 118 can be moved between the predefined regions 120. For example, an operator can make a first selection of a window 118 via touch received at the corresponding predefined region 120 and move the window 118 to a desired predefined region 120 by making a second selection of the desired predefined region 120 via touch input. In some embodiments, the windows 118 are moved by a drag and drop motion (e.g., touching and dragging the selected window 118 from one predefined region 120 to another destination predefined region 120, as described below) of the operator's finger on the touch surface 116. When touch information is received by the processor 150 from the touch interface device 114, the processor 150 will cause the selected window 118 to move from its corresponding predefined region 120 and switch positions with the window 118 occupying the destination predefined region 120. For example, the processor 150 will dynamically recreate the moved window 118 of interactive flight-related information 106 within the destination predefined region(s) 120, and will dynamically recreate the window 118 originally associated with the destination region(s) 120 in the region(s) 120 associated with the moved window 118. In such embodiments, the window 118 of interactive flight-related information 106 is scalable when the window 118 is recreated such that the moved window 118 can take on the size and/or orientation of the destination predefined region 120.

Figure 6:
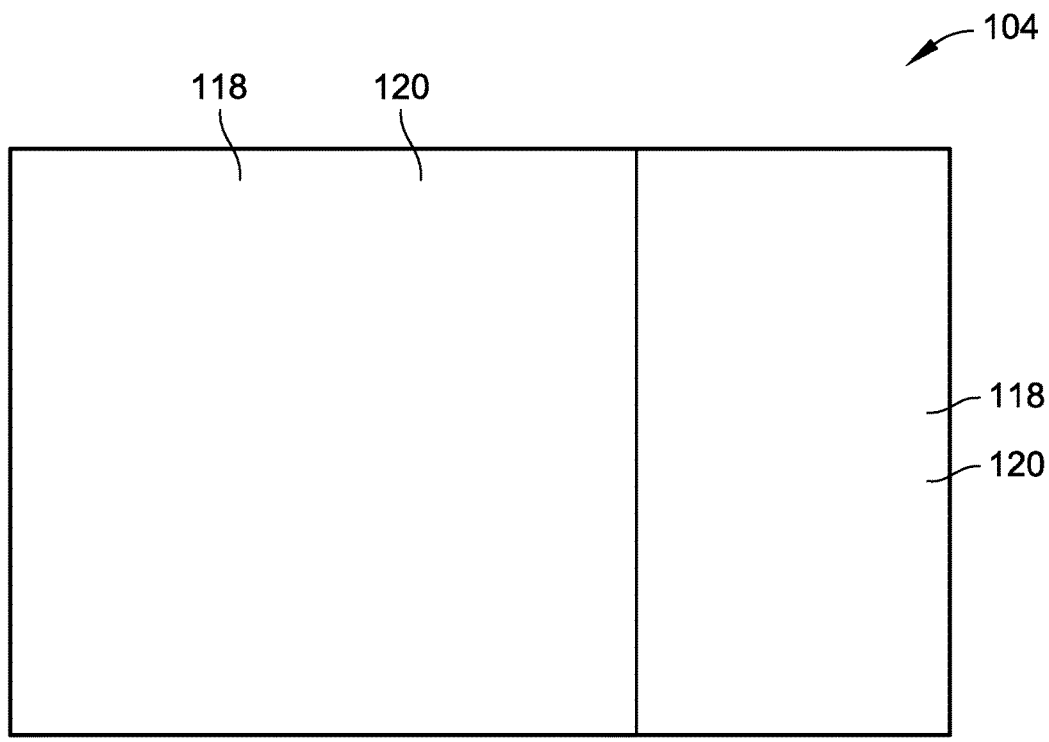
FIG. 6 is a diagrammatic view illustrating another display including a plurality of windows having regions for displaying on a graphical interface of a flight deck system, such as the flight deck system illustrated in FIG. 1, in accordance with embodiments of the present disclosure.
Figure 7:
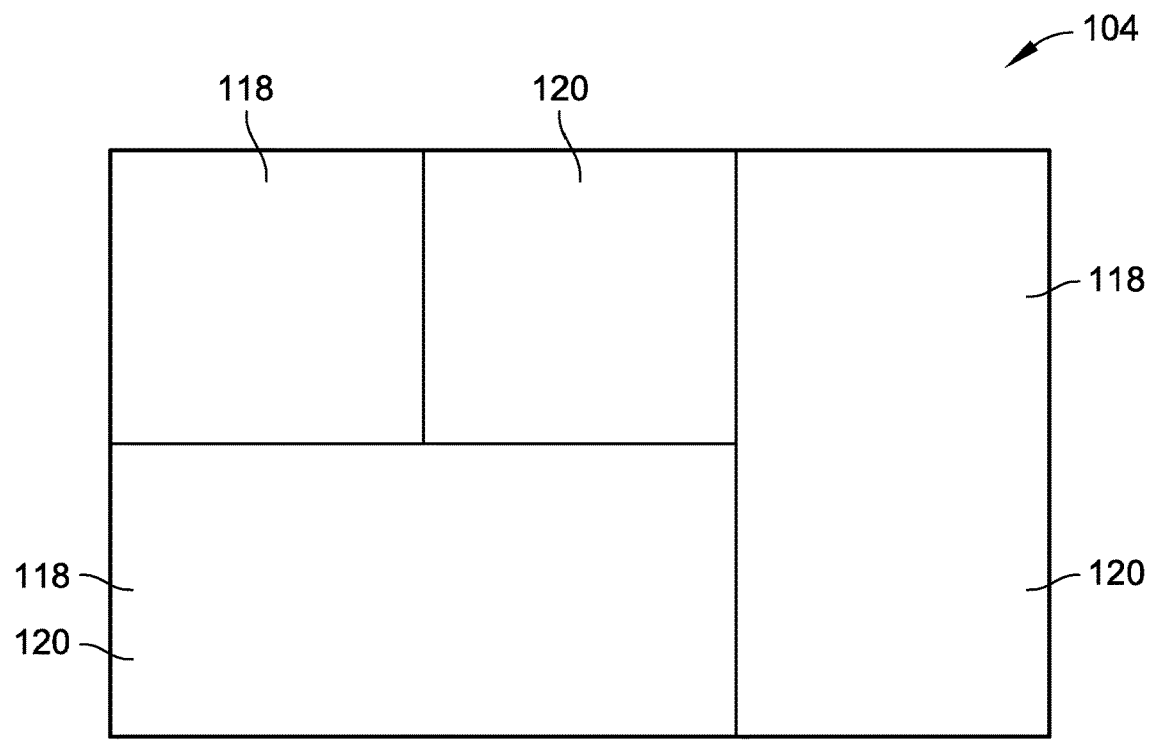
FIG. 7 is a diagrammatic view illustrating another display including a plurality of windows having regions for displaying on a graphical interface of a flight deck system, such as the flight deck system illustrated in FIG. 1, in accordance with embodiments of the present disclosure.

In some embodiments, each window 118 can also be resized (e.g., by a drag motion operator touch input as described below) vertically and/or horizontally to cover one or more of the predefined regions 120 (e.g., as described with reference to FIGS. 6 and 7). For example, horizontally enlarging one of the $⅙^{th}$ windows 118 (e.g., as described with reference to FIG. 3) and vertically enlarging one $⅙^{th}$ windows 118 will result in two windows 118 that each occupy $⅓^{rd}$ of the display screen and two windows 118 that each occupy $⅙^{th}$ of the display screen (e.g., as described with reference to FIG. 7). The windows 118 can also be manipulated by the operator to remove (e.g., cover) unneeded/unwanted windows 118 (e.g., by resizing a first window 118 to cover a predefined region 120 containing a second window 118). For example, a PFW may be resized to occupy the predefined region(s) 120 containing one or more MFWs. In such embodiments, the covered window 118 can be maintained behind the resized window 118 until the resized window 118 is reverted to its original size or resized to a smaller size. In a system 102 with multiple display devices 112, windows 118 can also be moved between display screens of display devices 112 utilizing identical or similar techniques. Thus, in example configurations, window content is maintained even if a window is covered up; windows are kept in their current location as long as possible (e.g., until a user action forces the window to resize or relocate); and/or currently-visible windows are kept visible when possible and kept as large as possible.

Figure 8:
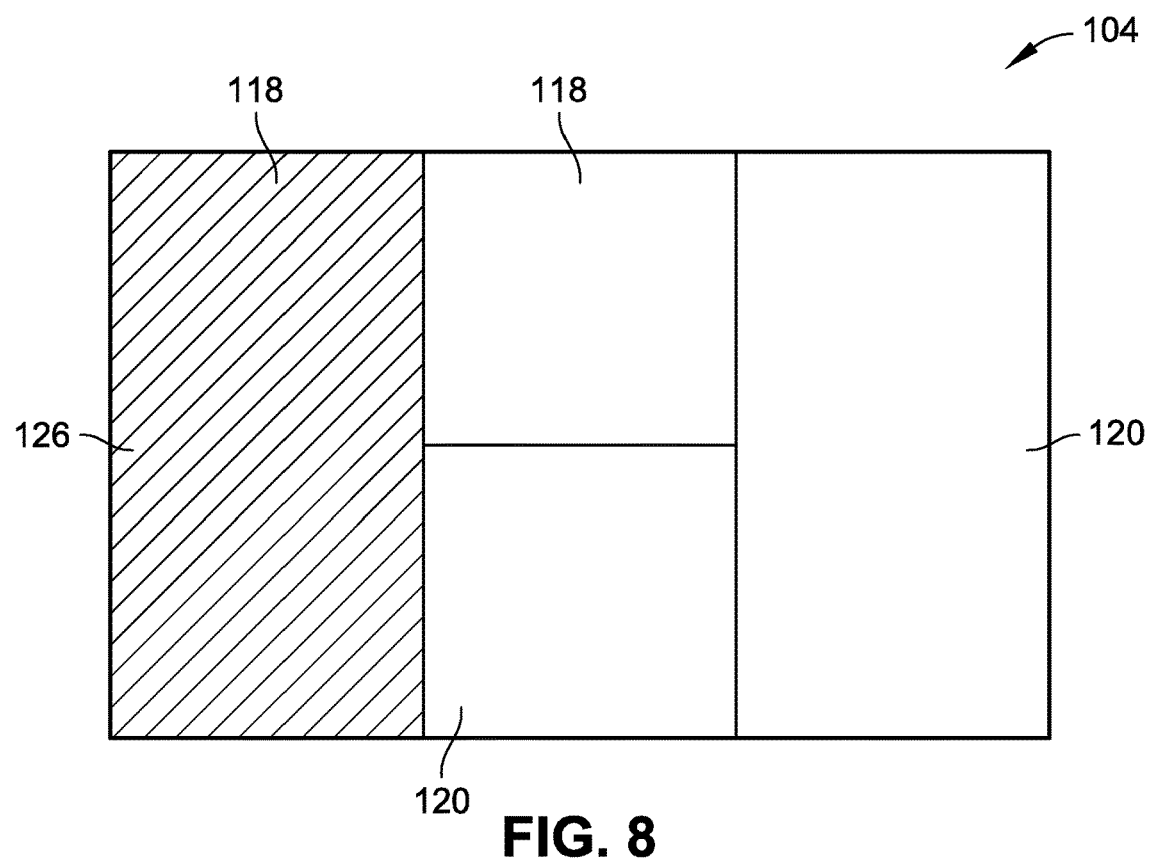
FIG. 8 is a diagrammatic view illustrating a display including a plurality of windows and a primary window having regions for displaying on a graphical interface of a flight deck system, such as the flight deck system illustrated in FIG. 1, in accordance with embodiments of the present disclosure.
Figure 9:
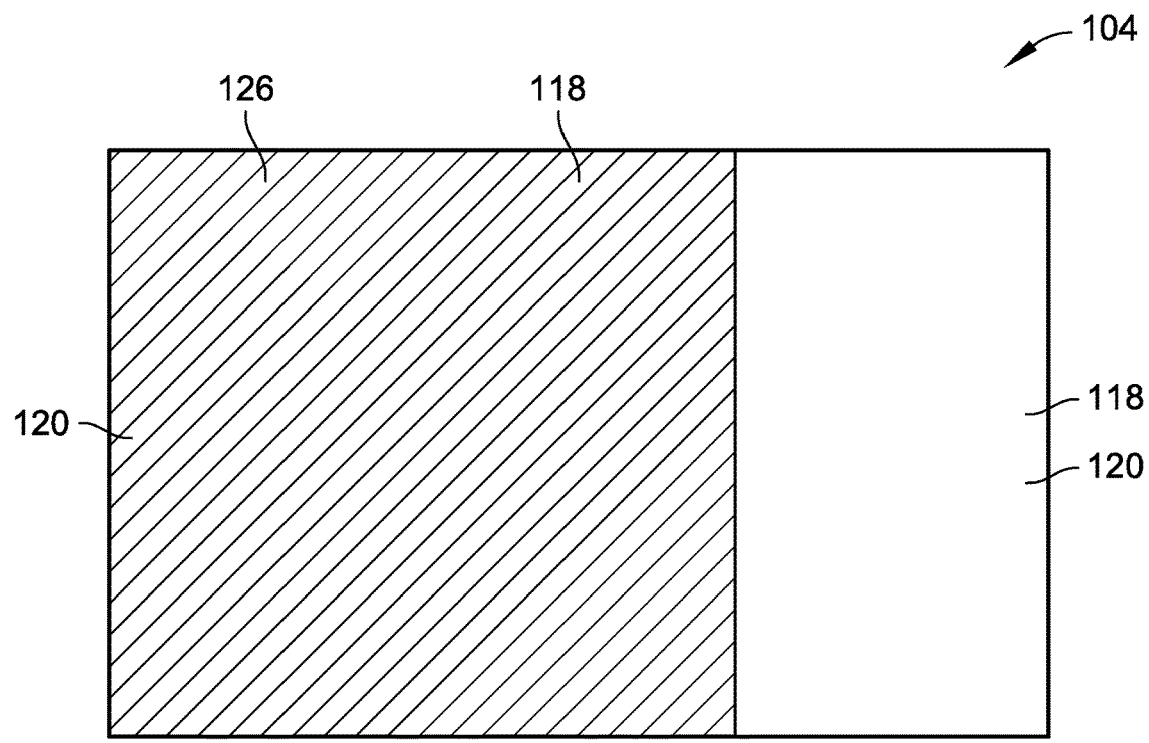
FIG. 9 is a diagrammatic view illustrating another display including a plurality of windows and a primary window having regions for displaying on a graphical interface of a flight deck system, such as the flight deck system illustrated in FIG. 1, in accordance with embodiments of the present disclosure.

Referring now to FIGS. 8 and 9, one or more of the predefined regions 120 may be configured in a locked orientation with fixed content. The processor 150 will cause one or more primary windows 126 to fixedly occupy in a locked orientation a designated predetermined region(s) 120 and or a minimum number of predefined regions 120. In such embodiments, the primary window is not removable from the display screen based on operator selection. The processor 150 will prevent manipulation and/or resizing of other windows 118 in such a way that covers those predefined region(s) 120 occupied by the primary window 126. For example, the processor 150 can prevent moving of a window 118 in response to selection of a predefined region(s) 120 occupied by a primary window 126. Information displayed in a primary window 126 may be preselected based on operator and/or manufacturer preferences. For example, the primary window 126 may contain information that is necessary for operation of the aircraft such as PFW information, engine instrumentation, alert systems, and so forth. The nonremovable primary window functionality prevents the operator from inadvertently removing information that is essential to aircraft operation. In embodiments, the primary window 126 can be resized to cover predefined regions 120 occupied by other windows 118 (e.g., as described with reference to FIG. 9). For example, the primary window 126 can be resized to cover one or more MFWs).

Figure 10:
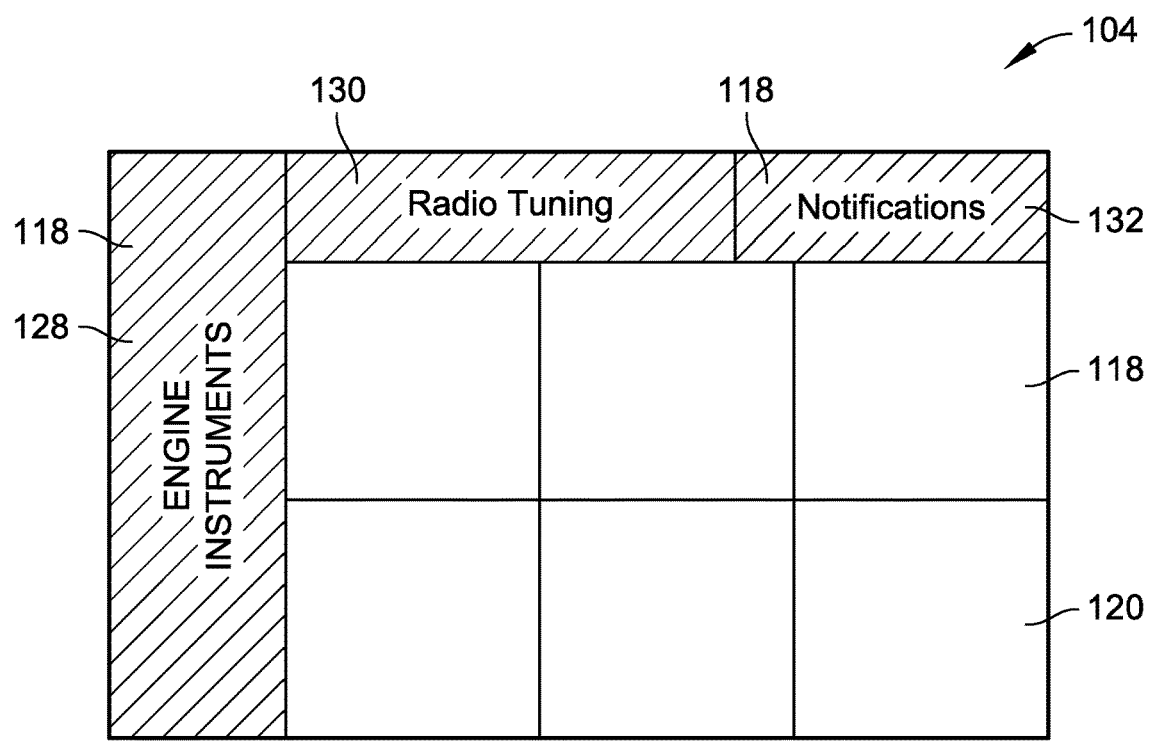
FIG. 10 is a diagrammatic view illustrating another display including a plurality of windows having regions for displaying on a graphical interface of a flight deck system, such as the flight deck system illustrated in FIG. 1, in accordance with embodiments of the present disclosure.
Figure 11:
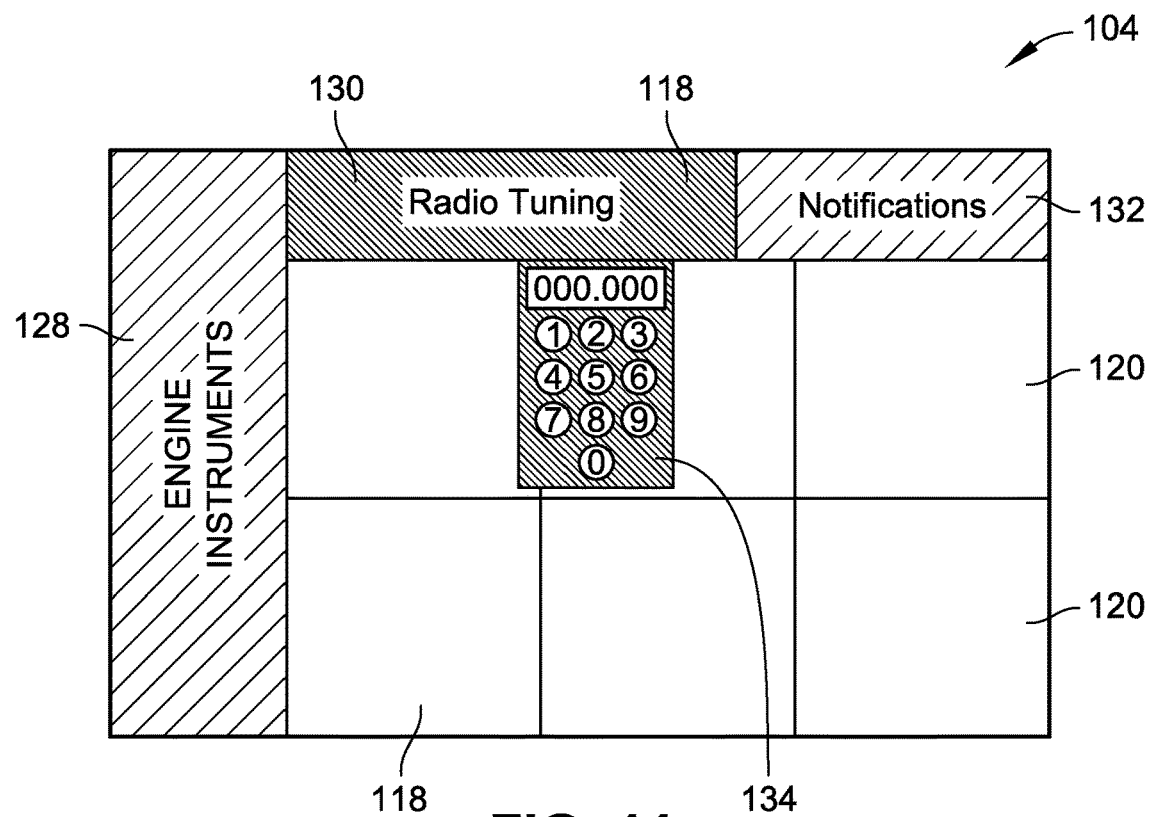
FIG. 11 is a diagrammatic view illustrating a display including a plurality of windows having regions and a popup window for displaying on a graphical interface of a flight deck system, such as the flight deck system illustrated in FIG. 1, in accordance with embodiments of the present disclosure.

Referring now to FIGS. 10 and 11, on or more fixed (e.g., static) windows (e.g., engine instruments window 128, radio tuning window 130, notifications window 132, etc.) can occupy one or more of the predefined regions 120. The processor 150 will cause one or more fixed windows to fixedly occupy a preselected predefined region 120. In such embodiments, the processor 150 will prevent resizing of other windows 118 in such a way that covers (e.g., removes) those predefined region(s) 120 occupied by fixed windows, and will prevent moving and/or resizing of the fixed window. The size, orientation, location, and/or content of fixed windows can be preselected based on manufacturer specifications and/or operator preferences. For example, displayed content can include information that is necessary for or important to the operation of the aircraft. The nonremovable fixed window functionality prevents the operator from inadvertently removing information that is essential to aircraft operation.

In some embodiments, the system 102 may be incapable of scaling and/or orienting the interactive flight-related information 106 to the selected predefined region 120. For example, PFWs and/or MFWs may have some functions and/or applications that are not capable of scaling to all window sizes. In embodiments where the interactive flight-related information 106 cannot be scaled to the desired window 118, the processor 150 may cause the interactive flight-related information 106 to be centered within the window and the unused area of the predefined region 120 may be filled with a graphical texture (e.g., letterboxing), Further, if an application does not natively support a smaller-sized window 118, then the processor 150 may pan and/or zoom the interactive flight-related information 106. If panning and/or zooming is not feasible for an application, then the processor 150 may still allow the function to be selected, but will cause an "error" message to be displayed via the graphical interface 104 indicating that the application cannot be shown in the current window size and to increase window size to use.

Because fixed windows are of a constrained size and orientation, the boundaries of the corresponding predefined region 120 may be too small to display part of the information associated with the fixed window. In such embodiments, the extra content may be displayed on the graphical interface 104 via one or more popup windows 134 (e.g., as described with reference to FIG. 11). For example, when an operator selects (e.g., by touch input) one of the fixed windows, the processor 150 will cause content related to the selected window to be displayed in a popup window 134 that overlaps one or more other windows 118 and their corresponding predefined regions 120. In some embodiments, the popup window 134 includes a touch keypad for data entry by the operator. For example, when the radio tuning window 130 is selected (e.g., touched) by the operator, the processor 150 may open a popup window 134 including a numeric touch keypad for entry of a desired frequency. In other embodiments, the popup window 134 may display a text field for providing a variety of additional information to the operator. For instance, the popup window 134 may include text fields that provides setting information including, but not limited to: radio frequency settings, autopilot settings, navigational settings, and so forth. The popup window 134 may also include text fields that provide electronic messages and/or notifications to the operator. For example, when the notifications window 132 is selected (e.g., touched) by the operator, the processor 150 may open a popup window 134 including a notification for the operator. In some embodiments, a popup window 134 may be closeable by touch input received outside of the popup window 134 but within the corresponding window 118. In addition and/or in the alternative, the popup window 134 may be closable via touch input received at a back button and/or back arrow.

In some embodiments, all popups and/or other state information (e.g., cursor location, page stack, keyboard entry, application settings, etc.) associated with a window 118 of interactive flight-related information 106 are encapsulated within the window 118 to support the ability for the window 118 to be moved to a different predefined region 120 on the display device 112 or onto a different display device 112.

Figure 12:
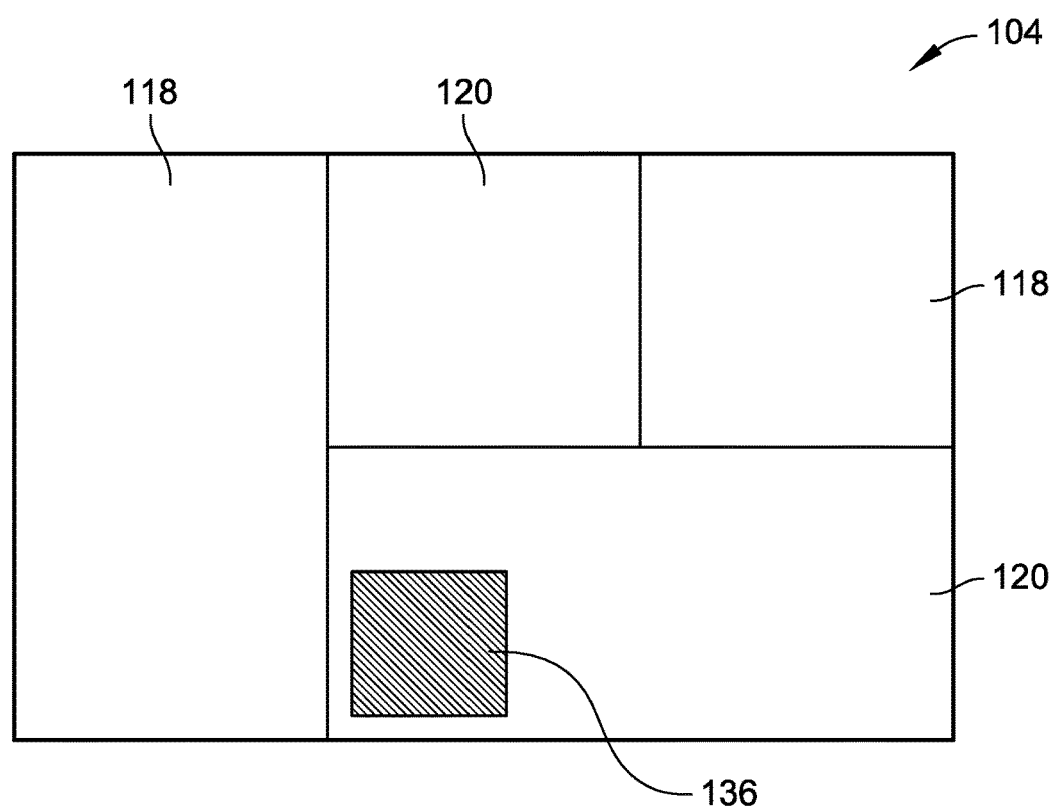
FIG. 12 is a diagrammatic view illustrating a display including a plurality of windows having predefined regions and an inset window for displaying on a graphical interface of a flight deck system, such as the flight deck system illustrated in FIG. 1, in accordance with embodiments of the present disclosure.

Referring now to FIG. 12, one or more inset windows 136 can facilitate the display of information within a window 118. For example, the inset window can contain additional information related to the interactive flight-related information 106 displayed in the window 118. In a specific embodiment, a camera feed is displayed via an inset window 136 with a window displaying a larger map (e.g., moving map).

Figure 13:
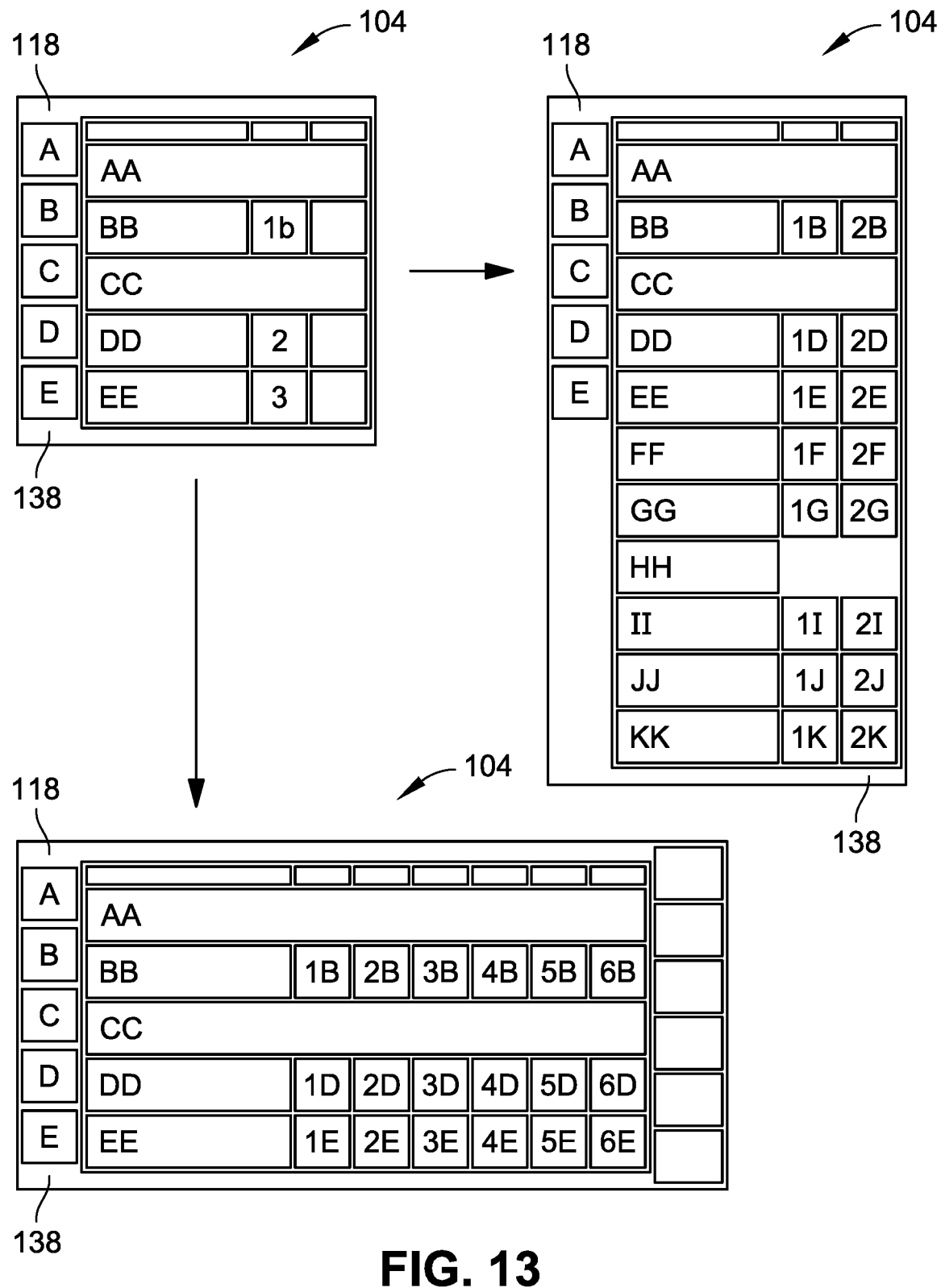
FIG. 13 is a diagrammatic view illustrating another display including flight plan window configurable in one or more orientations for displaying on a graphical interface of a flight deck system, such as the flight deck system illustrated in FIG. 1, in accordance with embodiments of the present disclosure.

Referring now to FIG. 13, additional interactive flight-related information 106 can be displayed as a window 118 is resized according to one of the techniques described above. The processor 150 will dynamically recreate the window 118 of interactive flight-related information 106 to include additional content and/or selectable buttons as the size of the window 118 is expanded to occupy additional predefined regions 120. For example, a flight plan window 138 containing flight plan information can be resized vertically and/or horizontally to include additional flight plan information and/or selectable buttons related to the flight plan.

Referring now to FIGS. 14 and 15, one or more icons 140 can be provided to facilitate manipulation (e.g., resizing and/or movement) of the windows 118. For example, the processor 150 can present, via the graphical interface 104 of the display device 112, a plurality of selectable icons 140, each icon 140 corresponding to one or more of the predefined regions 120. The operator can select a window 118 by touch input via the touch surface 116. In some embodiments, the window 118 can be selected by touch input received at the predefined region(s) 120 corresponding to window 118. In specific embodiments, the window 118 can be selected by touch input received at a selectable icon 140 corresponding to the window 118 (e.g., a window title 148). For example, the operator can make a first selection of a desired window 118 by touch input (e.g., tap and hold) via the touch surface 116 of the window title 148 corresponding to the window 118. Touch input received at the window title 148 can activate a map of selectable icons 140 corresponding to the windows 118. The operator can then move the selected window 122 by touch input (e.g., drag and drop and/or finger tap as described below) via the touch surface 116 to a selected icon 144. Based on the second selection of icon 144 received from the touch interface device 114, the processor 150 will dynamically recreate the selected window 122 of interactive flight-related information 106 within the predefined region(s) 120 corresponding to the selected icon 144 (e.g., as described with reference to FIG. 15). In such embodiments, the selected window 122 of interactive flight-related information 106 is scalable when the window 122 is recreated such that the selected window 122 can take on the size and/or orientation of the destination predefined region 120 corresponding to the selected icon 144.

In some embodiments, each icon 140 has a relative shape on the graphical interface 104 of the display screen commensurate with the shape of the predefined region(s) 120 corresponding to the selected icon 144. For example, the operator can resize the selected window 122 occupying predefined region 120A by selecting the corresponding window title 148 by touch input (e.g., tap and hold) via the touch surface 116 and moving (e.g., drag and drop) the selected window 122 to a rectangular shaped selected icon 144A corresponding to predefined region 120B and 120C. Based on the second selection of icon 144A received from the touch interface device 114, the processor 150 will dynamically recreate the selected window 122 of interactive flight-related information 106 within the predefined region 120B, 120C corresponding to the selected icon 144A.

In some embodiments, each icon 140 has a relative size on the graphical interface 104 of the display screen commensurate with the shape of the predefined region(s) 120 corresponding to the selected icon 144. For example, the operator can change the location of the selected window 122 occupying predefined region 120A by selecting the corresponding window title 148 by touch input (e.g., tap and hold) via the touch surface 116 and moving (e.g., drag and drop) the selected window 122 to a small icon 144B corresponding to single predefined region 120D. Based on the second selection of icon 144B received from the touch interface device 114, the processor 150 will dynamically recreate the selected window 122 of interactive flight-related information 106 within the predefined region 120D corresponding to the selected icon 144B.

Referring still to FIGS. 14 and 15, the techniques described herein can be utilized to resize the windows 118. For example, an operator can move via touch input the selected window 122 occupying a single predefined region 120 to a selected icon 144 corresponding to a plurality of predefined regions 120 (e.g., as described with reference to FIG. 14), and the processor 150 will dynamically recreate the selected window 122 of interactive flight-related information 106, forming a recreated window 124 at an expanded size to occupy the plurality of predefined regions corresponding to the selected icon 144 (e.g., as described with reference to FIG. 15).

Referring still to FIG. 15, the interactive flight-related information 106 can include a plurality of selectable items 108 arrangeable along a selection line 110 having a generally horizontal orientation with respect to the operator when viewing the graphical interface 104. In embodiments, each of the selectable items 108 corresponds to a predesignated control function and/or display widow of flight-related information 106. The content of the selectable items 108 can be selected based on operator and/or manufacturer preferences. The operator can interact with the selectable items 108 via touch input (e.g., finger tap) or by use of a CCD 300 (e.g., as described with reference to FIG. 38 below). In some embodiments, graphical interface 104 can include a menu icon 146 for accessing the plurality of selectable items 108. For example, the operator can access the selectable items 108 by touch input to a menu icon 146. The processor 150 will generate the plurality of selectable items 108 when a touch input is detected on the menu icon 146. In specific embodiments, the menu icon 146 is positioned at the lower corner of a multi-function window (MFW) of the graphical interface 104. In other embodiments, the plurality of selectable items 108 can be accessed by use of the CCD 300 (e.g., as described with reference to FIG. 38 below).

Referring now to FIG. 16, one or more of the windows 118 of the graphical interface 104 can be configured as a window management display. In such configurations, a plurality of selectable icons 140 are displayed in the window 118. The layout of the icons 140 corresponds to the layout of the other display windows 118 of the graphical interface (s) of the integrated avionics system 102. In embodiments, the other display windows 118 can be moved by touch input to the icons 140. The operator can move a window 118 to a desired predefined region 120 by touch input (e.g., drag and drop as described below) to the icons 140 of the window management display. For example, the operator can move the content of the window 118 corresponding to the number 6 icon 140 to the window 118 corresponding to the number 19 icon 140 by dragging the number 6 icon 140 and dropping it into the region occupied by the number 19 icon 140. Based on the touch input received from the touch interface device 114, the processor 150 will dynamically recreate the windows 118 of interactive flight-related information 106 corresponding to the number 6 icon 140 within the predefined region(s) 120 of the window 118 corresponding to the number 19 icon 140. The processor will also dynamically recreate the window management display such that the region occupied by the number 6 icon 140 is occupied by the number 19 icon 140 and vice versa.

In some embodiments, the window management display can facilitate resizing of the windows 118. An operator can move a window 118 occupying a single predefined region 120 to a window 118 that occupies a plurality of predefined regions 120 by moving via touch input (e.g., drag and drop) by dragging a corresponding icon 140 into an adjacent region occupied by another icon 140. For example, number 7 icon 140 can be resized from occupying one predefined region to occupying two predefined regions by dragging number 7 icon 140 into the region occupied by number 8 icon 140. The processor 150 will horizontally enlarge the $1/3^{rd}$ window corresponding to number 7 icon 140, resulting in a $2/3^{rd}$ window and a $1/3^{rd}$ window. In a specific embodiment, a window 118 is resized via a drag input received at the corresponding icon 140, and a tap and hold input received at the corresponding icon 140 activates a move mode permitting the window 118 to be moved to a different location (e.g., by dragging the corresponding icon 140 to a region occupied by another icon 140).

In some embodiments, initiating a touch movement (e.g., a drag, tap and hold, etc.) to an icon 140 will cause the processor 150 to display an outline indicating the new size of the icon 140. On the corresponding display device 112, the processor 150 will dynamically recreate the window 118 of interactive flight-related information 106 corresponding to number 7 icon 140 to occupy expand and occupy the adjacent region 120 occupied by the window 118 corresponding to number 8 icon 140 and covering the window 118 of interactive flight-related information 106 corresponding to number 8 icon. In embodiments, an operator can uncover a window 118 of interactive flight-related information 106 by resizing via touch input an icon 140 occupying multiple regions 120 so that the icon 140 occupies fewer regions. It is also contemplated that the icons 140 can be moved and/or resized without direct touch input by, for example, manipulating the CCD 300.

In some embodiments, the processor 150 will prevent the manipulation and/or resizing of icons 140 in such a way that covers icons 140 corresponding to predefined region(s) 120 occupied by fixed content (e.g., as described with reference to FIGS. 8 and 9 above). The processor 150 may display, via the graphical interface 104, visual indicators for icons 140 that correspond to regions 120 occupied by fixed content. For example, icons 140 corresponding to regions 120 occupied by fixed content may be darkened to indicate that a selected icon 140 cannot be moved to that position.

Still referring to FIG. 16, the graphical interface 104 can further include one or more flight presets 142. In embodiments, each flight preset 142 corresponds to a particular phase of flight (e.g., taxi, takeoff, enroute, approach, landing, etc.). The flight presets 142 function as quick access touch keys to quickly set the layout of the windows 118 to a predetermined configuration for the selected phase of flight. The flight presets 142 can be preconfigured by the operator and/or the manufacturer. The flight presets can allow the operator to quickly configure the layout of the graphical interface 104 to an optimal configuration for a selected phase of flight.

It is to be understood that while manipulation of the windows 118 via direct touch input to the display device 112 is described above, it is also contemplated that the windows can be manipulated using the CCD 300 or other auxiliary control devices. For example, the windows 118 may be manipulated in the ways described above via touch input received on a touch surface of the CCD 300 and/or by input device(s) of the CCD 300.

Example Touch Interface Device Embodiments

Referring now to FIGS. 17 through 30, the integrated avionics system 102 can be configured to distinguish active touch (e.g., an input touch 214, 220) associated with active engagement of the graphical interface 104 (e.g., button selection, gesture, etc.) from a non-active touch (e.g., a stabilization touch 212, 216, 218; an accidental touch; etc.). In embodiments, the processor 150 receives, from the touch interface device 114, a first touch location 212 indicating where a first touch from a portion of the operator's hand 200 and/or arm on the touch surface 116 is detected by the touch interface device 114 (e.g., as described with reference to FIG. 17). In some embodiments, the processor 150 can be configured to designate the first touch location as a stabilization touch 212 based on a variety of predetermined factors related to the timing, surface area, and/or location of the touch. The processor 150 can determine where a touch is detected but is no longer being considered for active engagement with the graphical interface 104 (e.g., button selection, gesture, etc.). For example, the processor 150 can determine that a portion of the operator's hand and/or arm (e.g., palm, wrist, digit, etc.) that is resting on the touch surface 116 is being used for stabilization. In a specific embodiment, the processor 150 may designate the first touch as a stabilization touch 212 when the touch is detected for a predetermined length of time without losing contact with the touch surface 116.

In some embodiments, the processor 150 can also receive from the touch interface device 114, one or more additional locations (e.g., a second touch location 214) indicating where one or more additional touches from one or more other digits (e.g., first digit 202; second digit 204; third digit 206; fourth digit 208; fifth digit 210) of the operator's hand 200 on the touch surface 116 is detected by the touch interface device 114. The processor 150 is configured to designate the first touch as a stabilization touch 212 and the second touch as an input touch 214 based on a variety of predetermined factors related to the timing, surface area, and/or location of the touches. In a specific embodiment, the processor 150 distinguishes a stabilization touch 212 from an input touch 214 based on the time when the touches were detected. The processor 150 can determine a first time indicating when the first touch began to be detected and a second time indicating when the second touch began to be detected. By comparing the first time and the second time, the processor 150 can determine that the first touch is a stabilization touch 212 and the second touch is an input touch 214. For example, the processor 150 can designate the first touch as a stabilization touch 212 and the second touch as an input touch 214 when the first time is prior to the second time. In some embodiments, the processor 150 is configured to compare a current time to the first time indicating when the first touch began to be detected to determine a first amount of time from when the first touch began to be detected. When the first amount of time is greater than a predetermined amount of time, the processor 150 determines that the first touch is a stabilization touch 212. In embodiments, the processor 150 designates the first touch as a stabilization touch when the first amount of time is greater than a predetermined amount of time in the range of 0.01 ms to 25 ms. In specific embodiments, the processor 150 designates the first touch as a stabilization touch 212 when the first amount of time is greater than 5 ms. Because the processor 150 designates the first touch as a stabilization touch 212, the operator can brace against the display device 112 one or more portions of the hand 200 and/or arm (e.g., the palm, wrist, or a digit) without inadvertently making a selection of a selectable button or inadvertently transitioning between windows. The ability to brace against the display device 112 can allow the operator to stabilize themselves and facilitates control of the aircraft during a motion-related aircraft event (e.g., a turbulence event).

In some embodiments, the processor 150 can utilize one or more additional or alternative factors to distinguish a stabilization touch 212 from an input touch 214, including but not limited to: detection of multiple substantially simultaneous touch inputs detected within a predetermined amount of time (e.g., multiple touch inputs detected within an interval of approximately 5 ms or less) on a window and/or display that does not respond to multi-touch input; concurrent detection of multiple button selections in the same window after the predetermined amount of time for a multi-touch gesture (e.g., approximately 5 ms or less) has lapsed; proximity of the first and second touches; and so forth.

In some embodiments, the processor 150 is configured to identify one or more additional stabilization touches. For example, the processor 150 can receive, from the touch interface device 114, a third touch location 216 indicating where a third touch from a digit (e.g., second digit 204) of the operator's hand 200 on the touch surface 116 is detected by the touch interface device 114 (e.g., as described with reference to FIG. 18). Using the techniques described above, the processor 150 can designate the third touch as a second stabilization touch 216 based on the time when the touches were detected. For example, the processor 150 can determine a third time indicating when the third touch began to be detected. By comparing the second time and the third time, the processor 150 can determine that the third touch is a second stabilization touch 214 and the second touch is an input touch 214. For example, the processor 150 can designate the third touch as a second stabilization touch 214 and the second touch as an input touch 214 when the third time is prior to the second time. In some embodiments, the processor 150 is configured to compare a current time to the third time indicating when the third touch began to be detected to determine a third amount of time from when the third touch began to be detected. When the third amount of time is greater than a predetermined amount of time, the processor 150 determines that the third touch is a second stabilization touch 214. In embodiments, the processor 150 designates the third touch as a stabilization touch when the third amount of time is greater than a predetermined amount of time in the range of 0.01 ms to 50 ms. In specific embodiments, the processor 150 designates the third touch as a second stabilization touch 214 when the third amount of time is greater than 5 ms. Because the processor 150 designates the third touch as a second stabilization touch 214, the operator can further brace against the display device 112 with one or more portions of the hand 200 and/or arm (e.g., the palm, wrist, or a digit) without inadvertently making a selection of a selectable button or inadvertently transitioning between windows. The ability to brace against the display device 112 can allow the operator to stabilize themselves and facilitates control of the aircraft during a motion-related aircraft event (e.g., a turbulence event).

In some embodiments, the processor 150 is configured to identify one or more additional input touches (e.g., multi-touch gestures; multi-finger gestures, etc.). In embodiments, the processor 150 can differentiate between multi-touch input touches (e.g., first input touch 214 and second input touch 220; as described with reference to FIG. 20) and stabilization touches 212 based on a variety of factors including but not limited to: a predetermined amount of time between the detection of touches; proximity of the touches; location of the touches; surface area of the touches; and so forth. For example, the processor 150 can receive, from the touch interface device 114, a fifth touch location 220 indicating where a fifth touch from a digit (e.g., first digit 202) of the operator's hand 200 on the touch surface 116 is detected by the touch interface device 114 (e.g., as described with reference to FIG. 20). Using the techniques described above, the processor 150 can designate the fifth touch as a second input touch 220 based on the time when the touches were detected. For example, the processor 150 can determine a fifth time indicating when the fifth touch began to be detected. By comparing the second time and the fifth time, the processor 150 can determine that the second touch is a first input touch 214 and the fifth touch is a second input touch 220. For example, the processor 150 can designate the second touch as a first input touch 214 and the fifth touch as a second input touch 220 when the touches occur within a predetermined amount of time. For example, the processor 150 may designate the second touch as a first input touch 214 and the fifth touch as a second input touch 220 (e.g., multi-touch gesture; multi-finger gesture, etc.) when the touches occur substantially simultaneously (e.g., within a predetermined amount of time of 5 ms or less). Because the processor 150 can distinguish between multiple input touches and stabilization touches, the graphical interface 104 can detect a variety of single-touch and multi-touch gestures, while still allowing the operator to brace against the display device 112.

In some embodiments, once the processor 150 designates a touch as a stabilization touch 212 the touch remains designated as a stabilization touch 212 until the touch is released (e.g., until the digit associated with the touch is removed from the touch surface 116). For example, the processor 150 may continue to identify the touch as a stabilization touch 212 even when the touch is moved onto an active (e.g., responsive to operator touch information) portion of the graphical interface 104. In some embodiments, the processor 150 will continue to designate a touch as a stabilization touch 212 despite a brief removal of the touch from the touch surface 116. For example, the processor 150 may continue to designate the touch as a stabilization touch 212 when the touch is removed for a predetermined amount of time (e.g., 100 s of ms or less). This allows for brief loss of contact between the operator's digit and the touch surface 116, for example, during motion-related aircraft event (e.g., turbulence event).

In some embodiments, the processor 150 can identify a stabilization touch 212 based on the location of the touch. For example, if the touch occurs at a non-active (e.g., not responsive to operator touch information) portion of the graphical interface 104, the processor 150 may designate the touch as a stabilization touch 212.

Referring still to FIGS. 17 through 30, the integrated avionics system 102 can be configured to detect a variety of touch inputs (e.g., button selections, gestures, etc.). For example, the integrated avionics system 102 is configured to detect a variety of single-finger, multi-finger, and or multi-hand touch inputs. It is contemplated that the processor 150 can be configured to distinguish one or more of the multi-finger and/or multi-hand touch inputs described herein from a stabilization touch 212, 216, 218 utilizing the techniques described above and the methods described below (e.g., as described with reference to FIG. 31) for designating input touches and stabilization touches.

Referring now to FIG. 17, the integrated avionics system 102 can be configured to detect single-finger tap gestures and/or multi-finger tap and/or tap and hold gestures. For example, the processor 150 can detect a single-finger tap gesture (e.g., press and release gesture) by receiving from the touch interface device 114 a location indicating where an input touch 214 from a digit (e.g., second digit 204) of the operator's hand 200 on the touch surface 116 is detected by the touch interface device 114. In some embodiments, the processor 150 may similarly detect a multi-finger tap gesture by receiving substantially simultaneously (e.g., within a predetermined amount of time of 5 ms or less) from the touch interface device 114 one or more additional locations indicating where a second touch input from at least one additional digit (e.g., second digit 204) of the operator's hand 200 on the touch surface 116 is detected by the touch interface device 114. In some embodiments, the processor 150 may detect a single-finger and/or multi-finger tap and hold gesture by receiving from the touch interface device 114 a tap gesture lasting for an extended period of time before release. In some embodiments, the processor 150 may detect a single-finger and/or multi-finger double tap gesture by receiving from the touch interface device 114 a first tap gesture and a second tap gesture within a predetermined amount of time (e.g., 500 ms or less), and/or a predetermined proximity between the first tap gesture and the second tap gesture (e.g., the distance between the two digits when touch input is detected on the touch surface 116). Single-finger and/or multi-finger tap and/or double tap gestures can be used, for example, to select a desired window 118, selectable icon 140, or selectable button (e.g., as described above with reference to FIGS. 13-15).

Referring now to FIGS. 19 and 20, the integrated avionics system 102 can be configured to detect single-finger drag gestures and/or multi-finger drag gestures. For example, the processor 150 can detect a single-finger drag gesture by receiving from the touch interface device 114 a location indicating where an input touch 214 from a digit (e.g., second digit 204) of the operator's hand 200 moving over the touch surface 116 without losing contact is detected by the touch interface device 114 (e.g., as described with reference to FIG. 19). In some embodiments, the processor 150 may similarly detect a multi-finger drag gesture by receiving substantially simultaneously (e.g., within a predetermined amount of time of 5 ms or less) one or more additional locations indicating where a second input touch 220 from at least on additional digit (e.g., first digit 202) of the operator's hand 200 moving over the touch surface 116 without losing contact is detected by the touch interface device 114, and based on the locations, determining that the digits 202, 204 are moving over the touch surface 116 in the same general direction (e.g., as described with reference to FIG. 20). Single-finger and/or multi-finger drag gestures can be used, for example, to move a window 118 to a desired predefined region 120 by touch input (e.g., as described above with reference to FIG. 16) to the icons 140. For example, the window 118 and/or the associated selectable icon 140 can be dragged and dropped to the desired predefined region 120.

Referring now to FIGS. 21 and 22, the integrated avionics system 102 can be configured to detect single-finger flick gestures and/or multi-finger flick gestures. For example, the processor 150 can detect a single-finger drag gesture by receiving from the touch interface device 114 a location indicating where an input touch 214 from a digit (e.g., second digit 204) of the operator's hand 200 moving rapidly in a unilateral direction over the touch surface 116 without losing contact is detected by the touch interface device 114 (e.g., as described with reference to FIG. 21). In some embodiments, the processor 150 may similarly detect a multi-finger flick gesture by receiving substantially simultaneously (e.g., within a predetermined amount of time of 5 ms or less) from the touch interface device 114 one or more additional locations indicating where a second input touch 220 from at least one additional digit (e.g., first digit 202) of the operator's hand 200 moving rapidly in a unilateral direction over the touch surface 116 without losing contact is detected by the touch interface device 114, and based on the locations, determining that the digits 202, 204 are moving over the touch surface 116 in the same general direction (e.g., as described with reference to FIG. 22). In some embodiments, the processor 150 can differentiate between a drag gesture and a flick gesture based on the velocity of the finger movement. For example, the processor 150 can detect a flick gesture when the operator moves his digit(s) across the touch surface 116 in a relatively increasing velocity, leaving the touch surface 116 at some point before his digit(s) drops below a predetermined velocity.

Referring now to FIGS. 23 and 24, the integrated avionics system 102 can be configured to detect multi-finger pinch gestures and/or multi-hand pinch gestures. For example, the processor 150 may detect a multi-finger pinch gesture by receiving from the touch interface device 114 a first location indicating where an input touch 214 from a digit (e.g., first digit 202) of the operator's hand 200 moving over the touch surface 116 is detected by the touch interface device 114, receiving substantially simultaneously (e.g., within a predetermined amount of time of 5 ms or less) one or more additional locations indicating where a second input touch 220 from at least on additional digit (e.g., second digit 204) of the operator's hand 200 moving over the touch surface 116 is detected by the touch interface device 114, and based on the locations, determining that the first digit 202 and the second 204 digit are moving towards each other (e.g., in a convergent direction; as described with reference to FIG. 23). In some embodiments, the processor 150 detects a multi-finger pinch gesture when the distance between the detected first location and the detected second location decreases over a predefined amount of time.

In some embodiments, the processor 150 may similarly detect a multi-hand pinch gesture. For example, the processor 150 can receive from the touch interface device 114 a location indicating where an input touch 214 from a digit (e.g., second digit 204) of a first hand 200 of the operator moving over the touch surface 116 is detected by the touch interface device 114, receive substantially simultaneously (e.g., within a predetermined amount of time of 5 ms or less) one or more additional locations indicating where a second input touch 220 from at least one digit (e.g., second digit 204) of a second hand 200 of the operator moving over the touch surface 116 is detected by the touch interface device 114, and based on the locations, determining that the digit 204 of the first hand 200 and the digit 204 of the second hand are moving towards each other (e.g., in a convergent direction; as described with reference to FIG. 24). Multi-finger and/or multi-hand pinch gestures can be used, for example, to provide zoom-in functionality.

Referring now to FIGS. 25 and 26, the integrated avionics system 102 can be configured to detect multi-finger spread gestures and/or multi-hand spread gestures. For example, the processor 150 may detect a multi-finger spread gesture by receiving from the touch interface device 114 a first location indicating where an input touch 214 from a digit (e.g., first digit 202) of the operator's hand 200 moving over the touch surface 116 is detected by the touch interface device 114, receiving substantially simultaneously (e.g., within a predetermined amount of time of 5 ms or less) one or more additional locations indicating where a second input touch 220 from at least one additional digit (e.g., second digit 204) of the operator's hand 200 moving over the touch surface 116 is detected by the touch interface device 114, and based on the locations, determining that the first digit 202 and the second digit are moving away from each other (e.g., in divergent or opposite directions; as described spread reference to FIG. 25). In some embodiments, the processor 150 detects a multi-finger pinch gesture when the distance between the detected first location and the detected second location increases over a predefined amount of time.

In some embodiments, the processor 150 may similarly detect a multi-hand spread gesture. For example, the processor 150 can receive from the touch interface device 114 a second location indicating where an input touch 214 from a digit (e.g., second digit 204) of a first hand 200 of the operator moving over the touch surface 116 is detected by the touch interface device 114, receive substantially simultaneously (e.g., within a predetermined amount of time of 5 ms or less) one or more additional locations indicating where a second input touch 220 from at least one digit (e.g., second digit 204) of a second hand 200 of the operator moving over the touch surface 116 is detected by the is detected by the touch interface device 114, and based on the locations, determine that the digit 204 of the first hand 200 and the digit 204 of the second hand are moving away from each other (e.g., in divergent or opposite directions; as described with reference to FIG. 26). Multi-finger and/or multi-hand spread gestures can be used, for example, to provide zoom-out functionality.

Referring now to FIGS. 27 and 28, the integrated avionics system 102 can be configured to detect single-finger rotate gestures and/or multi-finger rotate gestures. For example, the processor 150 can detect a single-finger rotate gesture by receiving from the touch interface device 114 a location indicating where an input touch 214 from a digit (e.g., second digit 204) of the operator's hand 200 moving in a clockwise or counterclockwise direction over the touch surface 116 without losing contact is detected by the touch interface device 114 (e.g., as described with reference to FIG. 27). In some embodiments, the processor 150 can detect a single-finger rotate gesture where a digit (e.g., second digit 204) rotates around a fixed digit (e.g., first digit 202). For example, the processor 150 can receive from the touch interface device 114 a location indicating where an input touch 214 from a digit (e.g., second digit 204) of the operator's hand 200 moving in a clockwise or counterclockwise direction around a substantially stationary anchoring touch (e.g. first digit 202) without losing contact with the touch surface 116 is detected by the touch interface device 114. In some embodiments, the processor 150 may similarly detect a multi-finger rotate gesture by receiving substantially simultaneously (e.g., within a predetermined amount of time of 5 ms or less) from the touch interface device 114 one or more additional locations indicating where a second touch input 220 from at least one additional digit (e.g., first digit 202) of the operator's hand 200 moving in a clockwise or counterclockwise direction over the touch surface 116 without losing contact is detected by the touch interface device 114, and based on the locations, determining that the digits 202, 204 are moving over the touch surface 116 in the same general clockwise or counterclockwise direction (e.g., as described with reference to FIG. 28). Single-finger and/or multi-finger rotate gestures can be used, for example, to rotate the orientation of a window 118 of the graphical interface 104, and/or to rotate content within a window 118 (e.g., as described with reference to FIGS. 1 through 16 above).

Referring now to FIGS. 29 and 30, the integrated avionics system 102 can be configured to detect single-finger free-form drag gestures (e.g., single-finger path gestures) and/or multi-finger free-form drag gestures (e.g., multi-finger path gestures). For example, the processor 150 can detect a single-finger path gesture by receiving from the touch interface device 114 a location indicating where an input touch 214 from a digit (e.g., second digit 204) of the operator's hand moving over the touch surface 116 in a continuous free-form direction without losing contact with the touch surface 116 is detected by the touch interface device 114 (e.g., as described with reference to FIGS. 29 and 30). In some embodiments, the processor 150 may similarly detect a multi-finger path gesture by receiving substantially simultaneously (e.g., within a predetermined amount of time of 5 ms or less) from the touch interface device 114 one or more additional locations indicating where a second touch input from at least one additional digit of the operator's hand 200 moving over the touch surface 116 in a continuous free-form direction without losing contact with the touch surface 116 is detected by the touch interface device 114, and based on the locations, determining that the digits are moving over the touch surface 116 in the same general free-form direction. Single-finger and/or multi-finger path gestures can be used, for example, to provide handwriting, annotating, and/or highlighting functionality. It is further contemplated the system 102 can recognize previously utilized path gestures (e.g., pattern recognition). For example, historically performed path gestures can be stored by the memory 152 and retrieved by the processor 150 when a substantially identical path gesture is performed by the operator.

Example Process for Operating a Flight Deck System

FIGS. 31A and 31B illustrate an example process 250 for operating a flight deck system to distinguish active touch (e.g., input touches meant for the input of data or otherwise engaging the graphical interface) from non-active touch (e.g., stabilization touch, accidental touch, etc.). As shown in FIG. 31, a first location is received (e.g., via a processor) indicating where a first touch is detected by a touch interface (Block 252). The first touch location represents a position of a first portion of an operator's (e.g., user such as a pilot and/or a co-pilot) hands and/or arms on a touch surface of the display (e.g., as described with reference to FIGS. 17 through 30). Once the first location is received, a first time is determined indicating when the first touch began to be detected (Block 254). A second location is then received indicating where a second touch is detected by the touch interface device (Block 256). The second touch location represents a position of a second portion of an operator's hands and/or arms on the touch surface of the display (e.g., as described with reference to FIG. 18). Once the second location is received, a second time is determined indicating when the second touch began to be detected (Block 258).

Upon determining the respective times when the first and second touches began to be detected, the first touch is determined to be a stabilization touch by comparing the first time and the second time (Block 260). In some implementations, the first touch is determined to be a stabilization touch when the first touch is determined to be prior in time to the second touch (Block 262). In some implementations, a current time can be compared to the first time to determine a first amount of time from when the first touch began to be detected (Block 264). In some implementations, the first touch is determined to be a stabilization touch when the first amount of time is greater than a predetermined amount of time (Block 266). As described above, the first touch can be determined to be a stabilization touch when the first amount of time is greater than a predetermined amount of time in the range of 0.01 ms to 50 ms. In specific implementations, the first touch can be determined to be a stabilization touch 212 when the first amount of time is greater than 5 ms.

Once the first touch is determined to be a stabilization touch, it is designated as a stabilization touch to the touch interface device (Block 268). As described above, designation of the first touch as a stabilization touch indicates that the first touch is no longer associated with active engagement of the graphical interface. The second touch is then designated as an input touch (Block 270). As described above, designation of the second touch as an input touch indicates that the second touch is associated with active engagement of the graphical interface.

In some implementations, a third location is received indicating where a third touch is detected by a touch interface (Block 272). The third touch location represents a position of an additional portion of the operator's hands and/or arms on a touch surface of the display (e.g., as described with reference to FIG. 18). Once the third location is received, a third time is determined indicating when the third touch began to be detected (Block 274).

Upon determining the time when the third touch began to be detected, the third touch is determined to be a stabilization touch by comparing the third time and the second time (Block 276). In some implementations, the third touch is determined to be a stabilization touch when the third touch is determined to be prior in time to the second touch (Block 278). In some implementations, a current time can be compared to the third time to determine a third amount of time from when the third touch began to be detected (Block 280). In some implementations, the third touch is determined to be a stabilization touch when the third amount of time is greater than a predetermined amount of time (Block 282). As described above, the third touch can be determined to be a stabilization touch when the third amount of time is greater than a predetermined amount of time in the range of 0.01 ms to 50 ms. In specific implementations, the third touch can be determined to be a stabilization touch 216 when the third amount of time is greater than 5 ms.

Once the third touch is determined to be a stabilization touch, it is designated as a stabilization touch to the touch interface device (Block 284). As described above, designation of the third touch as a stabilization touch indicates that the third touch is no longer associated with active engagement of the graphical interface. Designating the first and/or third touch as a stabilization touch and the second touch as an input touch allows the operator to brace against display device. The ability to brace against the display device can allow the operator to stabilize themselves and facilitates control of the aircraft during a motion-related aircraft event (e.g., a turbulence event). It is contemplated that one or more additional locations may be received indicating where an additional touch(es) (e.g., fourth touch location, fifth touch location, etc.) is detected. These additional touches can be designated as stabilization touches or input touches using the techniques described above.

Example Cursor Control Device (CCD) Embodiments

Referring now to FIG. 32, the integrated avionics system 102 can be configured to operate with one or more CCDs 300. In some embodiments, the integrated avionics system 102 may be configured to operate without a CCD 300 (e.g., not present or deactivated). Where in use, the CCD 300 can be configured to receive input (e.g., spatial data) from an operator to facilitate operator control of the graphical interface 104. For example, each control CCD 300 can be configured to control, at least, a unique pointer that, using the techniques described herein, can move between any of the displays of the graphical interface 104 and indicate the location(s) where touch inputs and/or multi-touch gestures can take effect. In embodiments, the CCD 300 can aid in operation during a motion-related aircraft event (e.g., turbulence event), allowing the operator a location to steady the operator's hand 310 (e.g., by resting on and/or by gripping portions of the CCD 300) and still be able to access the graphical interface 104 (e.g., possible to avoid needing to use touch interaction with a screen while experiencing a motion-related aircraft event (e.g., turbulence event)).

In some embodiments the integrated avionics system 102 can include multiple CCDs 300. For example, the system 102 can include 0 to 5 CCDs 300. In specific embodiments, the system 102 includes 0 to 2 CCDs. In embodiments where multiple CCDs 300 are used, each CCD 300 can be customized and/or distinguishable for a particular operator or type of operator. For example, the CCD 300 may be limited to controlling pointer movement to only a portion of the available displays (e.g., pilot side control interface device may be limited to use with pilot side display(s) and not extendable to co-pilot screens). In some embodiments, pilot and co-pilot pointers can be different and easily distinguishable, using the techniques described herein, particularly where the pilot and/or co-pilot can access all the screens of a graphical interface 104. Further, in some embodiments, the pointer can be associated with an icon and/or color that is configurable by the operator. As described herein, each CCD 300 can have further control capabilities associated therewith, beyond pointer control.

Referring now to FIGS. 33 through 37, the CCD 300 can include a housing for being gripped by the operator's hand 310. In some embodiments, the housing 302 can be generally longitudinal with a corresponding longitudinal housing axis 304; a housing face (e.g., upper housing face 306); and at least two opposing side housing faces 308 generally parallel to the longitudinal housing axis 304. The upper housing face 306 and the opposing side housing faces 308 can help accommodate the operator's hand 310, with the operator's hand 310 including at least a first digit (e.g., a thumb 312) and a second digit (e.g., a finger 314). The opposing side housing faces 308 can be gripped by opposing digits (e.g., 312, 314) of an operator's hand 310. In some embodiments, the opposing side housing faces 308 can stabilize the operator's hand 310 in a generally side-to-side direction during a motion-related aircraft event (e.g., turbulence event). The opposing side housing faces 308 can also stabilize the operator's hand 310 in a generally upward and/or downward direction during a motion-related aircraft event. The CCD 300 can further include the palm rest 316; the keys 318; the touch surface 322; a knob (e.g., rotary knob 326); and a tactile feature 328.

In some embodiments, the palm rest 316 can be located on the upper face 306 of the CCD 300 (e.g., adjacent and in line with the touch surface 322 and the knob 326) and configured for supporting the operator's hand 310. In an embodiment, the palm rest 316 can stabilize the operator's hand 310 in a generally downward direction during a motion-related aircraft event (e.g., turbulence event).

In some embodiments, the touch surface 322 can be proximal to the palm rest 316 and can be configured to receive touch information from one or more digits (e.g., 312, 314) of an operator's hand 310. In an embodiment, the palm rest 316 and the touch surface 322 can be oriented along the longitudinal housing axis 304. The touch surface 322 can be configured for receiving directional input from the operator's hand 310 (e.g., via one or more digits 312, 314) in a plane generally parallel with the upper face 306 of the CCD 300. In an embodiment, the touch surface 322 can be disposed upon the knob 326. In an embodiment, the touch surface 322 can be a multi-touch-capable touch pad that can, for example, support multi-finger gestures, such as two-finger drag, multi-finger taps, rotation, and/or resizing. The touch surface 322 can also be used to control pointer movement.

In some embodiments, the proximity detector 324 (e.g., as described with reference to FIG. 32) detects when the operator's hand 310 is on or near the housing 302, and/or more generally on or near the CCD 300. In a specific embodiment, the proximity detector can detect when the operator's hand 310 is on or near the palm rest 316. The proximity detector 324 can be communicatively coupled to the processor 150, the processor 150 being configured to selectively provide input from the touch surface 322 based upon a proximity of the operator's hand 310 to the palm rest 324, and/or more generally based upon a proximity of the operator's hand 310 to the housing 302. For example, the processor 150 can differentiate between active touch (e.g., contact on the touch surface 322 in combination with detected hand presence on or near the palm rest 324) and non-active touch (e.g., contact on the touch surface 322 without detected hand presence on or near the palm rest 324). It is to be understood that detection of the operator's hand on or near the palm rest 316 is offered by way of example only and is not meant to be restrictive of the present disclosure. In other embodiments, the proximity detector 324 may detect other hand placements associated with the CCD 300. For example, the proximity detector 324 may detect the position of a specific digit 312, 314 or plurality of digits. Such proximity detection can, for example, involve sensing the operator's hand 310 on the palm rest 316, one or more of the operator's fingers 314 in contact with and/or in motion on the touch surface 322 and/or the keys 318, and/or the operator's thumb 312 in contact with one of the various input devices 330-340 described below. The proximity detector 324 may involve one or more sensors and may detect one or more of, for example, pressure, motion, or capacitance to confirm the operator's presence relative to the CCD 300.

In some embodiments, the proximity detector 324 operates to wholly or partially control functionality of the pointer of the CCD 300. For example, the proximity detector 324 can allow the pointer to be removed from the graphical interface 104 when the operator is not using the CCD 300. The pointer associated with the CCD 300 can become visible when the operator's hand 310 is sensed to be near and/or on the proximity detector 324. Various other factors can be used in controlling a visibility of a pointer of the CCD 300, some of which involve proximity detection as described above. For example, if an operator's hand 310 remains on the control interface device 300, the pointer can time out after a defined period of touch surface 322 inactivity, such as 10 seconds, 20 seconds, or a period set by the operator and/or the manufacturer. In an embodiment, if the operator's hand 310 is removed from the CCD 300 and/or taken out range of the proximity detector 324, the pointer can time out after a set period (e.g., 3 seconds, 5 seconds, or a period set by the operator and/or the manufacturer). In an embodiment, upon a user losing contact with the CCD 300, the pointer may first display an attention-getting animation (e.g., a bloom) prior to timing out. Such time out functionality helps to ensure that the CCD 300 is responsive only to active touch.

Still referring to FIGS. 33 through 37, a rotary knob 326 can be disposed beneath the touch surface 322. The rotary knob 326 can be configured to receive rotation input from the operator's hand 310 in a plane generally parallel with the upper face 306 of the CCD 300. The rotary knob 326 can be, for example, in the range of 2.5 inches to 4 inches in diameter. In a specific embodiment, the rotary knob 326 is about 3 inches in diameter.

In embodiments, the rotary knob 326 can operate to wholly or partially control functionality of the pointer of the CCD 300. For example, the rotary knob 326 may also be rotated to move the pointer between objects and/or data fields, including within or between group of objects/data fields, on the display(s) of the graphical interface 104. In some embodiments, the rotary knob 326 can include a knob focus function. For example, when the rotary knob 326 is rotated such that the pointer is within the visible proximity of an object (e.g., tabs, data fields, etc.) on the graphical interface 104, the processor 150 can cause the graphical interface 150 to highlight the object with an indicator (e.g., a visible indicator such as color). Where the objects are formed as interactive tabs, rotational movement of the rotary knob 326 such that knob focus is moved to a selected tab causes the processor 150 to activate the tab, allowing for selection of tab elements within the tab via further rotation of the knob 326. When the rotary knob 326 is used to move a knob focus between objects, the pointer can be removed from previously highlighted objects. In some embodiments, the knob focus function can be configured to a specific display (e.g., selected by the operator and/or manufacturer) of the graphical interface 104. For example, the rotary knob 326 can move knob focus between windows and/or objects within the selected display. In other embodiments, the rotary knob 326 can move knob focus between multiple displays of the graphical interface 104. In an embodiment, the pointer and/or knob focus can be removed from the graphical interface 104 when the rotary knob 326 is stationary (e.g., the operator is not using the CCD 300). For example, if the rotary knob 326 is stationary (e.g., no rotation), the pointer and/or knob focus can time out after a set period (e.g., 3 seconds, 5 seconds, or a period set by the operator and/or the manufacturer). In some embodiments, the rotary knob 326 may have a push activation function (e.g., directly and/or via the touch surface 322 supported thereby), facilitating a control equivalent to a direct tap (e.g., mouse click) of that control. It is to be understood that while a rotary knob 326 is shown in FIGS. 33 through 37, in other embodiments the control interface device 100 may not include a rotary knob 326. For example, similar functionality may be provided by other components of the control interface device 300 such as the touch surface 322 and/or other control components described below. In other embodiments, the control interface device 300 may not include a touch surface 332, and similar functionality may be provided by other components of the control interface device 300 such as the rotary knob 326 or other control components described below.

Still referring to FIGS. 33 through 37, one or more keys 318 are disposed proximate to the touch surface 322. With respect to the CCD 300, the keys 318 can be context specific (e.g., "smart") keys, or may be configurable or preconfigured for a desired application and/or airframe. In some embodiments, the keys 318 may be keys that provide mechanical switch activation underneath them. In some embodiments, the keys 318 can be associated with quick access icons on a display (as to be described in further detail below). In some embodiments, the keys 318 may be in the form of projected capacitance (PCAP) touch sensors. The keys 318 can be disposed in the form of a key line 320 (e.g., a first line). In some embodiments, the key line 320 can be located forward of the touch surface 322 and distal from the palm rest 316 (i.e., opposite side of the touch surface 322 relative to the palm rest 316). With respect to the key line 320, the key line 320 may be aligned linearly or in an arc that generally approximates a linear segment. In an embodiment, the key line 320 can have a generally perpendicular orientation (e.g., 85-95 degrees; or 89-91 degrees) with respect to the longitudinal housing axis 304. In an embodiment, the key line 320 can be generally bisected by the longitudinal housing axis 304 (e.g., half the keys on either side; half the keys, plus or minus one, on either side; half the keys, plus or minus two, on either side), for example, for promoting easy access to all the keys 318. In embodiments, the key line 320 is positioned such that each of the keys 318 are accessible by one or more of the operator's digits (e.g., thumb 312; finger 314).

In embodiments, the keys, individually or as a group, can have one or more tactile features 328 (e.g., bumps, protrusions) associated therewith for instilling a sensation in the operator when using the keys 318. For example, at least one key 318 can have at least one tactile feature 328 formed thereon (e.g., bump or protrusion) or therein (e.g., a concave surface). Such tactile features 328 can facilitate locating the separate keys and/or determining a desired hand placement relative to the keys 318 based solely on touch. In some embodiments, the tactile features 328 can be located between adjoining keys 318, aiding in the discrete keys or buttons 318 to be readily distinguished from one another. In some embodiments, the tactile features 328 can promote locating of the keys 318 by muscle memory. These tactile features 328 can reduce the need to look at the keys 318, thereby reducing heads-down time (e.g., time which an operator spends with attention diverted away from the primary visual field and towards auxiliary control tools).

Still referring to FIGS. 33 through 37, the CCD 300 can further include one or more input devices configured to receive touch, finger, and/or hand movement inputs. In an embodiment, the additional hand-implemented input devices may be in the form of one or more input buttons or wheels (e.g., 330-340). For example, the CCD 300 can include one or more of a thumb wheel 330, a volume wheel 332, a push-to-talk button 334, a push-to-command button 336, a back button 338, or a menu button 340. Some or all of such input devices 330-340 may be positioned on one or both sides (e.g., relative to the longitudinal housing axis 304) of the housing 302 (e.g., right or left hand dedicated; or set for operation by either hand). Where some or all input devices 330-340 are available on each side, in some embodiments, it is possible to choose to make just one of any duplicate set of the input devices 330-340 "live" or active at a given time.

In an embodiment, the thumb wheel 330 (e.g., a wheel actuated by the operator's thumb 312) can be positioned on a side housing face 306 region proximate to both the palm rest 316 and the touch surface 322. The thumb wheel 330 can be used for data entry and/or range or zoom adjustment. In some embodiments, the thumb wheel 330 can, for example, be used for data entry of values that can be dialed in via the thumb wheel 330. For example, the thumb wheel 330 can be used for data entry in hot data fields where data field contents can be edited via the thumb wheel 330 without the use of further data fields (e.g., popup data entry windows). Examples of hot data fields include, but are not necessarily limited to: selected heading, selected speed, selected altitude, barometer setting, map range, volume, lists of sequential values, and so forth.

In embodiments, the thumb wheel 330 can operate to wholly or partially control functionality of the pointer and/or the knob focus function of the CCD 300. For example, when a thumb wheel 330 is used to edit a hot data field, the pointer can be removed, except on maps that are in a pan mode. On maps that are in pan mode, while the map range is being edited with the thumb wheel 330, if the pointer is visible just before changing the range, the pointer can remain displayed until it times out. In some embodiments, the thumb wheel 330 can operate to wholly or partially control functionality of the knob focus function described above. In embodiments, if the thumb wheel 330 is stationary (e.g., no rotation), the pointer and/or knob focus can time out after a set period (e.g., 3 seconds, 5 seconds, or a period set by the operator and/or the manufacturer). In specific embodiments, both the thumb wheel 330 and the rotary knob 326 must remain stationary for the pointer and/or the knob focus to time out. When the knob focus has timed out, further manipulation of the thumb wheel 330 can reactivate knob focus (e.g., restore knob focus to the last object of focus).

The volume wheel 332 can be in the form of another thumb-actuated wheel and may be located, for example, next to the push-to-talk button 334 on the side housing face 306 carrying the thumb wheel 330. The volume wheel 332 can be used for audio control. In some embodiments, the volume wheel 332 can create a different tactile sensation (e.g., texture, wheel size, wheel angle) relative to the thumb wheel 330 to facilitate distinguishing thereof based on touch alone. In some embodiments, the volume wheel 332 can be optimized for volume entry (e.g., wheel size and/or sensitivity (e.g., volume change/change in angle of wheel)).

The push-to-talk button 334 can, for example, be disposed between the thumb wheel 330 and the volume wheel 332 on a side housing face 306. The push-to-command button 336 can be used to facilitate reception and/or transmission of vocal input. The push-to-command button 336 can be located generally above the push-to-talk button 334 and proximate to both the palm rest 316 and the touch surface 322 (e.g., in an angular gap therebetween). The push-to-command button 336 can be used to activate a command sequence. The push-to-talk button 334 and the push-to-command button 336 may create a different tactile sensation (e.g., shaped and/or textured differently) to permit differentiation by touch (in addition to positioning).

In some embodiments, the CCD 300 can further include the back button 338 and/or the menu button 340 on a given side housing face 308. In some embodiments, the back button 338 and/or the menu button 340 can be positioned below the rotary knob 326 and/or the touch surface 322. The back button 338 can perform a "BACK" function, which is similar to or equivalent to pressing a BACK arrow on a touchscreen, for example. The menu button 340 can be used to display an application-context specific menu, when applicable. The menu button 340 can, for example, provide the same function as touching a touchscreen menu button in the lower left corner of an application window.

Referring now to FIG. 38, The CCD 300 can be configured to communicate with the graphical interface 104 via the processor 150. For example, the CCD 300 can be communicatively coupled with the processor 150 which is operatively coupled with the graphical interface 104 for displaying interactive flight-related information 106 (e.g., aircraft data, runway approach, flight mapping, relative aircraft position (e.g., altitude, pitch, yaw, etc.), weather report, etc.). The interactive flight-related information 106 can include a plurality of selectable items 108 arrangeable along a selection line 110 (i.e., a second line). In some embodiments, the selection line 110 has a generally horizontal orientation with respect to the operator when viewing the graphical interface 104. The spatial data received from the operator can be used by the processor 150 to manipulate the interactive flight-related information 106 displayed on the graphical interface 104 by consistently mapping each one of the plurality of keys 318 arranged along the key line 320 (e.g., the first line as described with reference to FIG. A) to a corresponding one of the plurality of selectable items 108 displayed along the second line 110 of the graphical interface 104 when a key selection is made by the operator so that the operator associates the plurality of keys 318 with corresponding positions of the plurality of selectable items 108. That is, the key line 320 can correspond one-to-one with the second line 110 of the graphical interface 104.

In some embodiments, the keys 318 can be configured to provide the functionality similar or equivalent to dedicated "quick access keys" (e.g., physical buttons with physical labels providing shortcuts to commonly used functions or pages). The keys 318 can further allow for software-configurable flexibility without physical labels, being able to match with corresponding selectable items 108 associated with a graphical interface 104 (e.g., a display screen). When a finger 314 is rested on a key 318, a modal popup can be displayed on the graphical interface 104, indicating the function of each selectable item 108 and/or the selectable item 108 corresponding to the respective key 318. For example, the CCD 300 can communicate with the processor 150 to cause an indication (e.g., a visual indicator such as color) of the selectable item 108 corresponding to the key 318 to be displayed on the graphical interface 104. In some embodiments, when multiple keys have a finger 314 resting on them, corresponding selectable items 108 can be highlighted using different visual indicators to show which of the one or more keys 318 have a finger 314 resting on them. In some embodiments, a selectable items 108 can be highlighted using a visual indicator corresponding to the last touched key 318. In embodiments where multiple CCDs 300 are used, each CCD 300 can be associated with unique visual indicators (e.g. highlighting with a different visual indicator for pilot and copilot). When a chosen key 318 is pressed down, the CCD 300 can communicate with the processor 150 to activate the control corresponding to the selected item 108 (e.g., when the mechanical switch positioned beneath the chosen key 318 is actuated).

In some embodiments, the keys 318 can be mapped to a static function. In other embodiments, the keys 318 may operate under software control, and have the flexibility to be customized, for example, based on design and human factors evaluations, as well as manufacturer's preferences. In still other embodiments, a combination of static function keys 318 and customizable keys 318 may be utilized (e.g., providing similar or equivalent functionality to a combination of hard keys and softkeys).

The functionality offered by the touch-surface graphical interface 104 and the keys 318 can allow the operator to quickly and accurately select a desired function without shifting attention away from the display, thereby reducing heads-down time. The operator can also make selections under circumstances where it may be difficult to physically access the graphical interface 104 (e.g., situations where the operator is unable to provide a touch input to the touch surface 116), such as during a during a motion-related aircraft event (e.g., turbulence event). Besides being reachable by the keys 318, the related menu of selectable items 108 can be accessed by touching a lower corner of any multi-function window (MFW) of the graphical interface 104 (e.g., as described with reference to FIG. 15). Thus, the operator can access the menu of selectable 108 items in a variety of ways, which can provide increased ability to control the aircraft 100 under a variety of circumstances.

It is to be understood that the functionality offered by the touch-surface graphical interface 104 and the control elements of the CCD 300 can purposefully be redundant, allowing information access by a variety of means, allowing for personal preference or the possibility of a partial system outage. It is to be further understood that CCD 300 may improve ergonomics and/or reduce fatigue of the operator.

Referring now to FIGS. 39 through 43, another embodiment of a CCD 300 is shown. The CCD 300 includes housing for being gripped by the operator's hand 310. In some embodiments, the housing 302 includes a hand grip 342; a housing face (e.g., lower housing face 344); and at least two opposing side housing faces 308. The hand grip 342 and the opposing side housing faces 308 can help accommodate the operator's hand 310, with the operator's hand 310 including at least a first digit (e.g., a thumb 312), a second digit (e.g., a finger 314), and a third digit (e.g., a finger 346). The hand grip 342 can be gripped by one or more digits (e.g., 314, 346) to stabilize the operator's hand 310 in a generally upward, downward, and/or side-to-side direction during a motion-related aircraft event (e.g., turbulence event). In some embodiments, the proximity detector 324 (e.g., as described with reference to FIG. 32) detects when the operator's hand 310 is on or near the hand grip 342, and/or more generally on or near the housing 302 and/or the CCD 300.

In some embodiments, the CCD 300 further includes the keys 318; the touch surface 322; and/or a knob (e.g., rotary knob 326). Many features (e.g., keys 318, touch surface 322, rotary knob 326, input devices 330-340 etc.) of the CCD 300 are analogous to those described with reference to FIGS. 33 through 38 above. Unless otherwise described with reference to FIGS. 40 through 43 below, these analogous features interact as described above (e.g., with reference to FIGS. 33 through 38). More generally, the operation of the CCD 300 is analogous to the operation described above (e.g., with reference to FIGS. 33 through 38), unless otherwise described with reference to FIGS. 40 through 43 below.

In some embodiments, the touch surface 322 and/or the rotary knob 326 are disposed proximal to the hand grip 342 and can be configured to receive touch information from one or more digits (e.g., finger 314; finger 346) of the operator's hand 310. In a specific embodiment, the touch surface 322 and/or rotary knob 326 are positioned below the hand grip 342 on a side face 308.

Still referring to FIGS. 39 through 43, one or more keys 318 are disposed proximate to the hand grip 342. The keys 318 can be disposed in the form of a key line 320 (e.g., a first line; as described with reference to FIG. 33). In some embodiments, the key line 320 is located below the hand grip 342 on a side face 308. The key line 320 may be aligned linearly or in an arc that generally approximates a linear segment. In embodiments, the key line 320 is positioned such that each of the keys 318 are accessible by one or more of the operator's digits (e.g., thumb 312; finger 314). In a specific embodiment, the key line 320 is positioned such that all of the keys 318 are accessible by the thumb 312 of the operator.

Still referring to FIGS. 39 through 43, the CCD 300 can further include one or more input devices configured to receive touch, finger, and/or hand movement inputs. For example, the CCD 300 can include one or more of a thumb wheel 330, a volume wheel 332 (not shown), a push-to-talk button 334, a push-to-command button 336, a back button 338, or a menu button 340. Some or all of such input devices 330-340 may be positioned on one or both sides of the hand grip 342 (e.g., right or left hand dedicated; or set for operation by either hand). It is further contemplated that some or all of such input devices 330-340 may be positioned on one or both of the side faces 308.

It is to be understood that while the CCD 300 shown in FIGS. 39 through 43 is configured for use by a right-handed operator, one or more of the touch surface 322, rotary knob 326 keys 318, and/or input devices 330-340 may be disposed on the opposing side of the CCD 300 to accommodate a left-handed operator. In embodiments, the shape of the hand grip 342 can be configured for a left-handed operator.

Generally, any of the functions described herein can be implemented using hardware (e.g., fixed logic circuitry such as integrated circuits), software, firmware, manual processing, or a combination thereof. Thus, the blocks discussed in the above disclosure generally represent hardware (e.g., fixed logic circuitry such as integrated circuits), software, firmware, or a combination thereof. In the instance of a hardware configuration, the various blocks discussed in the above disclosure may be implemented as integrated circuits along with other functionality. Such integrated circuits may include all of the functions of a given block, system, or circuit, or a portion of the functions of the block, system, or circuit. Further, elements of the blocks, systems, or circuits may be implemented across multiple integrated circuits. Such integrated circuits may include various integrated circuits, including, but not necessarily limited to: a monolithic integrated circuit, a flip chip integrated circuit, a multichip module integrated circuit, and/or a mixed signal integrated circuit. In the instance of a software implementation, the various blocks discussed in the above disclosure represent executable instructions (e.g., program code) that perform specified tasks when executed on a processor. These executable instructions can be stored in one or more tangible computer readable media. In some such instances, the entire system, block, or circuit may be implemented using its software or firmware equivalent. In other instances, one part of a given system, block, or circuit may be implemented in software or firmware, while other parts are implemented in hardware.

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A flight deck system for an aircraft, the flight deck system comprising:
    a display device for providing a graphical interface for displaying flight-related information to an operator, the flight-related information including a plurality of windows, the display device configured for displaying the plurality of windows within a plurality of regions, each one of the plurality of regions having a predefined shape and orientation on the display screen according to a grid layout;
    a touch interface device coordinated with the display device for receiving touch information from the operator and allowing the operator to interact with the graphical interface displayed on the display screen; and
    a processor communicatively coupled with the touch interface device and operatively coupled with the display device, the processor configured to:
        receive, from the touch interface device, a first selection of a window of the plurality of windows of flight-related information to be moved to one or more of the plurality of regions of the display screen;
        present, via the display device, a plurality of icons to the operator, each one of the plurality of icons corresponding to one or more of the plurality of regions of predefined shape and orientation on the display screen;
        receive, from the touch interface device, a second selection of an icon of the plurality of icons; and
        dynamically recreate the selected window of flight-related information within the one or more of the plurality of regions of predefined shape and orientation on the display screen corresponding to the selected icon.

2. The flight deck system as recited in claim 1, wherein each one of the plurality of icons has a relative size on the display screen commensurate with the one or more of the plurality of regions of predefined shape and orientation on the display screen corresponding to the second selection.

3. The flight deck system as recited in claim 1, wherein each one of the plurality of icons has a relative location on the display screen commensurate with the one or more of the plurality of regions of predefined shape and orientation on the display screen corresponding to the second selection.

4. The flight deck system as recited in claim 1, wherein at least one of the plurality of windows of flight-related information comprises a primary window that may not be removed from the display screen in response to the second selection.

5. The flight deck system as recited in claim 4, wherein the primary window occupies a minimum number of regions within the plurality of regions of predefined shape and orientation on the display screen.

6. The flight deck system as recited in claim 4, wherein the primary window occupies a locked orientation within the plurality of regions of predefined shape and orientation on the display screen.

7. The flight deck system as recited in claim 1, wherein the selected window of flight-related information is scalable when the selected window is recreated within the one or more of the plurality of regions of predefined shape and orientation on the display screen corresponding to the second selection.

8. A method of operating a flight deck system for an aircraft, the method comprising:
providing, via a display device, a graphical interface for displaying interactive flight-related information to an operator, the flight-related information including a plurality of windows;
displaying the plurality of windows within a plurality of regions, each one of the plurality of regions having a predefined shape and orientation on the display screen according to a grid layout;
receiving, from a touch interface device coordinated with the display device, touch information from the operator allowing the operator to interact with the graphical interface displayed on the display screen;
receiving, from the touch interface device, a first selection of a window of the plurality of windows of flight-related information to be moved to one or more of the plurality of regions of the display screen;
presenting, via the display device, a plurality of icons to the operator, each one of the plurality of icons corresponding to one or more of the plurality of regions of predefined shape and orientation on the display screen;
receiving, from the touch interface device, a second selection of an icon of the plurality of icons; and
dynamically recreating the selected window of flight-related information within the one or more of the plurality of regions of predefined shape and orientation on the display screen corresponding to the selected icon.

9. The method as recited in claim 8, wherein each one of the plurality of icons has a relative size on the display screen commensurate with the one or more of the plurality of regions of predefined shape and orientation on the display screen corresponding to the second selection.

10. The method as recited in claim 8, wherein each one of the plurality of icons has a relative location on the display screen commensurate with the one or more of the plurality of regions of predefined shape and orientation on the display screen corresponding to the second selection.

11. The method as recited in claim 8, wherein at least one of the plurality of windows of flight-related information comprises a primary window that may not be removed from the display screen in response to the second selection.

12. The method as recited in claim 11, wherein the primary window occupies a minimum number of regions within the plurality of regions of predefined shape and orientation on the display screen.

13. The method as recited in claim 11, wherein the primary window occupies a locked orientation within the plurality of regions of predefined shape and orientation on the display screen.

14. The method as recited in claim 8, further comprising scaling the selected window of flight-related information when the selected window is recreated within the one or more of the plurality of regions of predefined shape and orientation on the display screen corresponding to the second selection.

15. A flight deck system for an aircraft, the flight deck system comprising:
a display device for providing a graphical interface for displaying interactive flight-related information to an operator, the flight-related information including a plurality of windows, the display device configured for displaying the plurality of windows within a plurality of regions, each one of the plurality of regions having a predefined shape and orientation on the display screen according to a grid layout;
a touch interface device coordinated with the display device for receiving touch information from the operator and allowing the operator to interact with the graphical interface displayed on the display screen; and
a processor communicatively coupled with the touch interface device and operatively coupled with the display device, the processor configured to:
receive, from the touch interface device, a first selection of a window of the plurality of windows of flight-related information to be moved to one or more of the plurality of regions of the display screen;
present, via the display device, a plurality of icons to the operator, each one of the plurality of icons corresponding to one or more of the plurality of regions of predefined shape and orientation on the display screen, each one of the plurality of icons having a relative location on the display screen commensurate with the one or more of the plurality of regions of predefined shape and orientation on the display screen;
receive, from the touch interface device, a second selection of an icon of the plurality of icons; and
dynamically recreate the selected window of flight-related information within the one or more of the plurality of regions of predefined shape and orientation on the display screen corresponding to the selected icon.

16. The flight deck system as recited in claim 15, wherein each one of the plurality of icons has a relative size on the display screen commensurate with the one or more of the plurality of regions of predefined shape and orientation on the display screen corresponding to the second selection.

17. The flight deck system as recited in claim 15, wherein at least one of the plurality of windows of flight-related information comprises a primary window that may not be removed from the display screen in response to the second selection.

18. The flight deck system as recited in claim 17, wherein the primary window occupies a minimum number of regions within the plurality of regions of predefined shape and orientation on the display screen.

19. The flight deck system as recited in claim 17, wherein the primary window occupies a locked orientation within the plurality of regions of predefined shape and orientation on the display screen.

20. The flight deck system as recited in claim 15, wherein the selected window of flight-related information is scalable when the selected window is recreated within the one or more of the plurality of regions of predefined shape and orientation on the display screen corresponding to the second selection.

* * * * *